United States Patent
Adjakple et al.

(10) Patent No.: US 12,231,996 B2
(45) Date of Patent: Feb. 18, 2025

(54) RADIO VEHICLE SIDELINK DISCOVERY

(71) Applicant: InterDigital Patent Holdings, Inc., Wilmington, DE (US)

(72) Inventors: Pascal M. Adjakple, Great Neck, NY (US); Qing Li, Princeton Junction, NJ (US); Joseph M. Murray, Schwenksville, PA (US); Guodong Zhang, Woodbury, NY (US); Michael F. Starsinic, Newton, PA (US); Zhuo Chen, Claymont, DE (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 539 days.

(21) Appl. No.: 17/289,802

(22) PCT Filed: Oct. 31, 2019

(86) PCT No.: PCT/US2019/059123
§ 371 (c)(1),
(2) Date: Apr. 29, 2021

(87) PCT Pub. No.: WO2020/092742
PCT Pub. Date: May 7, 2020

(65) Prior Publication Data
US 2021/0400448 A1    Dec. 23, 2021

Related U.S. Application Data

(60) Provisional application No. 62/805,027, filed on Feb. 13, 2019, provisional application No. 62/753,757, filed on Oct. 31, 2018.

(51) Int. Cl.
*H04W 4/40* (2018.01)
*H04W 48/16* (2009.01)

(52) U.S. Cl.
CPC ............. *H04W 4/40* (2018.02); *H04W 48/16* (2013.01)

(58) Field of Classification Search
CPC ......... H04W 4/40; H04W 48/16; H04W 4/80; H04W 8/005; H04W 92/18
See application file for complete search history.

(56) References Cited

U.S. PATENT DOCUMENTS

| | | |
|---|---|---|
| 2013/0322297 A1 | 12/2013 | Dominguez |
| 2014/0269658 A1 | 9/2014 | Sadasivam et al. |

(Continued)

FOREIGN PATENT DOCUMENTS

| | | |
|---|---|---|
| CN | 105188045 A | 12/2015 |
| CN | 105190348 A | 12/2015 |

(Continued)

OTHER PUBLICATIONS

Third Generation Partnership Project (3GPP), "Study on Enhancement of 3GPP Support for 5G V2X Services", Technical Specification Group Services and System Aspects; Release 15, 3GPP TR 22.886 V15.1.0, Mar. 2017, 58 pages.

(Continued)

*Primary Examiner* — Jae Y Lee
*Assistant Examiner* — Aixa A Guadalupe Cruz
(74) *Attorney, Agent, or Firm* — Flaster Greenberg, P.C.

(57) ABSTRACT

A discoverer user equipment sends a discovery announcement to a discoveree user equipment via a sidelink service. The announcement includes criteria for a service sought by discoverer. The discoveree assesses the announcement and may respond to the discoverer. The discovery announcement may be a target search discovery announcement or a self-advertisement discovery announcement, and may be unicast, groupcast, or broadcast. The discoverer and discoveree may perform synchronization in support of V2X sidelink com- (Continued)

munication and may collect driving information pertaining to vehicles associated with the discoverer and discoveree, respectively, such as driving intention, positioning, and environment information. The discoverer may request an authorization for the discovery announcement, and the request may include the driving information. The information in the announcement and the response may include discoverer and discoveree service, platform, and radio capabilities, source identifiers, driving information, radio measurements, group identifiers, and protocol configuration parameters.

18 Claims, 42 Drawing Sheets

(56) References Cited

U.S. PATENT DOCUMENTS

| | | | |
|---|---|---|---|
| 2016/0150390 | A1 | 5/2016 | Chen et al. |
| 2016/0212780 | A1 | 7/2016 | Stojanovski |
| 2016/0242019 | A1 | 8/2016 | Vanderveen et al. |
| 2017/0064534 | A1 | 3/2017 | Loehr et al. |
| 2018/0227726 | A1 | 8/2018 | Futaki |
| 2020/0229006 | A1* | 7/2020 | Chen ................ H04B 7/0695 |
| 2021/0153062 | A1* | 5/2021 | Zhang ............... H04W 40/246 |
| 2021/0153094 | A1 | 5/2021 | Freda et al. |
| 2021/0258764 | A1* | 8/2021 | Zhang ................ H04W 72/20 |
| 2021/0315032 | A1* | 10/2021 | Hu ...................... H04W 72/20 |

FOREIGN PATENT DOCUMENTS

| | | |
|---|---|---|
| CN | 105282688 A | 1/2016 |
| CN | 106464715 A | 2/2017 |
| CN | 107431907 A | 12/2017 |
| CN | 107690832 A | 2/2018 |
| CN | 108029001 A | 5/2018 |
| JP | 2016-514866 A | 5/2016 |
| KR | 20150132389 A | 11/2015 |
| KR | 10-2017-0053573 A | 5/2017 |
| WO | 2017/017887 A1 | 2/2017 |
| WO | 2017/024546 A1 | 2/2017 |
| WO | 2017/041353 A1 | 3/2017 |
| WO | 2017/052690 A1 | 3/2017 |
| WO | 2017/071137 A1 | 5/2017 |
| WO | 2018/066876 A1 | 4/2018 |

OTHER PUBLICATIONS

Third Generation Partnership Project (3GPP), "Enhancement of 3GPP Support for V2X Scenarios", Technical Specification Group Services and System Aspects, Stage 1, Release 16, 3GPP TS 22.186 V16.0.0, Sep. 2018, 16 pages.

Bingyi et al., "Data Uplink Strategy in Mobile Cloud Service Based Vehicular Ad Hoc Network", Computer Study and Development, Apr. 15, 2016, vol. 53, No. 4, pp. 811-823. (English abstract only).

CATT, "Discovery Procedure and Connection Setup Procedure in NR Sidelink", 3GPP TSG-RAN WG2 Meeting #103bis, R2-1813731, Oct. 2018, pp. 1-4.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 3GPP TS 36.300 V15.3.0, Sep. 2018, pp. 3.

* cited by examiner

RADIO VEHICLE SIDELINK DISCOVERY

CROSS-REFERENCE TO RELATED APPLICATIONS

This application is the National Stage Application of International Patent Application No. PCT/US2019/059123 filed Oct. 31, 2019, claims the benefit of U.S. Provisional Application No. 62/753,757, filed Oct. 31, 2018, and U.S. Provisional Application 62/805,027, filed Feb. 13, 2019, both titled "Radio Vehicle Sidelink Discovery," the content of which are hereby incorporated by reference in their entirety.

BACKGROUND

This disclosure pertains to vehicle sidelink radio communications, such as those described in, for example: 3GPP TR 22.886, Study on enhancement of 3GPP Support for 5G V2X Services; (Release 15), V15.1.0; 3GPP TS 22.186, Enhancement of 3GPP support for V2X scenarios; Stage 1 (Release 15), V16.0.0; 3GPP TR 23.734, Study on enhancement of 5GS for Vertical and LAN Services; (Release 16), V16.0.0; 3GPP TS 23.286, Application layer support for V2X services; Functional architecture and information flows; (Release 16), V0.3.0; and 3GPP TS 23.502, Procedures for the 5G System; Stage 2; (Release 15), V15.4.1.

SUMMARY

This disclosure describes, inter alia: provisioning for V2X Discovery; group management and discovery control at the V2X higher layer; group management and discovery control at an AS layer; and L23 Radio Configuration in support of V2X Discovery and V2X data Transmission.

A Self-Advertising Discovery model may include the option of monitoring a V2X UE to autonomously elect to initiate V2X communication toward the announcing UE, or to join a group that the announcing UE belongs to and establish group cast or multicast communication toward the announcing UE without first matching a report to the V2X control function or other network entities.

A Target Search Discovery model may include the discovering UE or the target search announcing UE, may transmit specific information of interest about discoveree UE, but also potentially information about discoverer UE.

Triggers may be used for self-advertising announcement, target search announcement, or response to discovery messages.

Rules for mapping a discovery message to a PSDCH or PSSCH based on discovery message size or discovery message type may be used, e.g., for periodic versus aperiodic, discovery message latency requirement, discovery message reliability requirement, discovery message transmission range requirement, or discovery message reception range requirement.

Content of discovery message may be tailored to assist transmitter or receiver to decide on whether subsequent V2X communication should unicast, groupcast, or broadcast based.

A MAC sublayer configuration may be adjusted for discovery, e.g., to support mapping of the discovery message to the PSDCH, PSSCH or PSMCH. A PDU's formats and parameters may be adjusted for performing an SL-DCH data transfer/reception This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1:
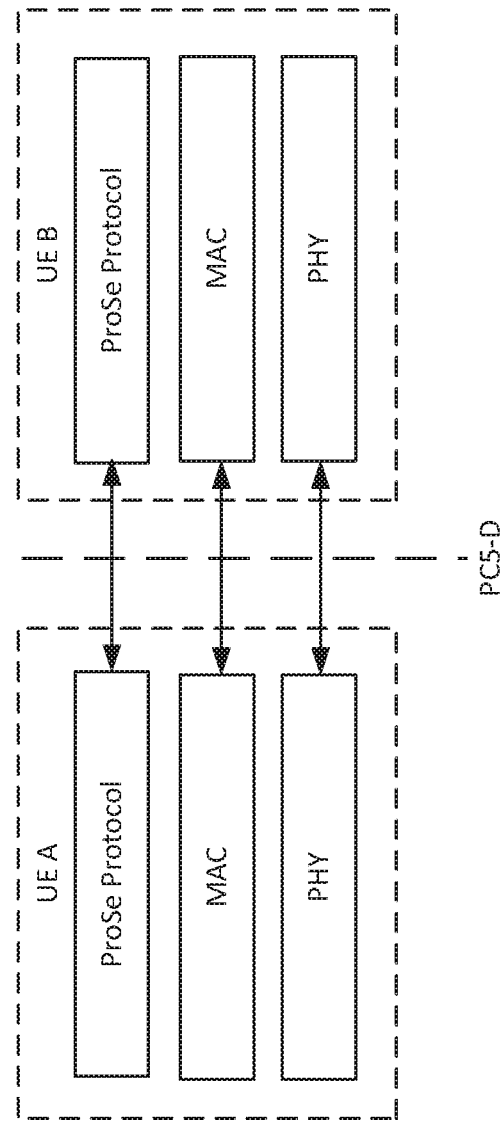
FIG. 1 illustrates an example PC5 interface for sidelink discovery.

The term "procedure" generally refers to methods of performing operations to achieve ends. The term "procedure" is used in place of "method" to avoid confusion with special meanings of the term "method" in the context of M2M and IoT applications. The steps described for procedures are often optional, and potentially may be performed in a variety of ways and in a variety of sequences. Hence, herein the term "procedure" should not be interpreted as referring to a rigid set and sequence of steps, but rather as a general methodology for achieving results that may be adapted in a variety of ways.

Many of the acronyms used herein are described in Table 1 of the Appendix.

Discovery in LTE D2D Sidelink

In LTE, D2D sidelink discovery is defined as the procedure used by the UE supporting sidelink discovery to discover other UE(s) in its proximity, using E-UTRA direct radio signals via PC5. Sidelink discovery is supported both when the UE is served by E-UTRAN and when the UE is out of E-UTRA coverage. There are two types of D2D sidelink Direct Discovery: open and restricted. Open discovery occurs where there is no explicit permission that is needed from the UE being discovered, whereas restricted discovery only takes place with explicit permission from the UE that is being discovered.

A ProSe Direct Discovery can be a stand-alone service enabler that could, for example, use information from the discovered UE for certain applications in the UE that are permitted to use this information (e.g. "find a taxi nearby", "find me a coffee shop"). Additionally, depending on the information obtained, the ProSe Direct Discovery can be used for subsequent actions, e.g. to initiate ProSe Direct Communication. The ProSe Direct Discovery may also be for public safety use, involving primarily the UE-to-Network Relay Discovery function and the determination of ProSe communication capable UEs that are in communication range (e.g., "Group Member Discovery").

Two discovery models are defined in LTE; discovery Model A and discovery Model B. Model A defines two roles for the participating UEs; the announcing UE which announces certain information that could be used by UEs in proximity that have permission to discover, and the monitoring UE which monitors certain information of interest in proximity of announcing UEs. In this model, the announcing UE broadcasts discovery messages at pre-defined discovery intervals, and the monitoring UEs that are interested in these messages read and process them. In this model, the announcing UE broadcast information about itself, advertising its presence ("I am here") and services it offers. Both open and restricted discovery types are supported by Model A.

The discovery model B also defines two roles for the participating UEs; the discoverer UE which transmits a request containing certain information about what it is interested to discover and to determine whether a discoveree UE can offer certain services, and the discoveree UE which receives the request message is able to respond with some information related to the discoverer's request. This model can be summarized as "who is there", or "are you there", since the discoverer UE sends information about other UEs. Only restricted discovery type is supported by Model B.

Higher layers above the access stratum handle authorization for announcement and monitoring of discovery messages. Content of a discovery message is transparent to an Access Stratum (AS) and no distinction in the AS is made for sidelink discovery models and types of sidelink discovery. However, higher layers inform whether the sidelink discovery announcement is related to public safety or non-public safety discovery. Higher layers also inform whether the discovery announcement/monitoring is related to the ProSe UE-to-Network Relay discovery or other public safety discovery. In order to perform synchronization, the UE(s) participating in announcing of discovery messages may act as a synchronization source by transmitting a SBCCH and a synchronization signal based on the resource information for synchronization signals provided in SIB19. The control plane protocol stack over direct link PC5 interface for discovery is illustrated in the FIG. 1. The MAC layer receives the discovery message from the upper layer (ProSe Protocol). The IP layer is not used for transmitting the discovery message. There are two types of resource allocation for discovery message announcement; UE autonomous resource selection, and network scheduled resource allocation. In either scheme, the MAC layer determines the radio resource to be used for announcing the discovery message received from an upper layer. The MAC layer builds the MAC PDU carrying the discovery message and sends the MAC PDU to the physical layer for transmission in the determined radio resource. No MAC header is added. The transmission is connectionless, and broadcast based.

Discovery procedure is used to identify a specific UE in order to initiate one-to-one communication, or to identify specific group of UEs in order to initiate one-to-many communication. A UE does not establish and maintain a logical connection to receiving UEs prior to one-to-many a sidelink communication. A higher layer establishes and maintains a logical connection for one-to-one sidelink communication, including ProSe UE-to-Network Relay operation.

Source Layer-2 ID and Destination Layer-2 ID may be used for sidelink communication and V2X sidelink communication. Source Layer-2 ID identifies the sender of the data in sidelink communication and V2X sidelink communication. The Source Layer-2 ID is 24 bits long and is used together with Destination Layer-2 ID and LCID for identification of the RLC UM entity and the PDCP entity in the receiver.

Destination Layer-2 ID identifies the target of the data in sidelink communication and V2X sidelink communication. For sidelink (non-V2X) communication, the Destination Layer-2 ID is 24 bits long and is split in the MAC layer into two bit strings. One bit string is the LSB part (8 bits) of Destination Layer-2 ID and forwarded to physical layer as Group Destination ID. This identifies the target of the intended data in sidelink control information and is used for filtering of packets at the physical layer. The second bit string is the MSB part (16 bits) of the Destination Layer-2 ID and is carried within the MAC header. This is used for filtering of packets at the MAC layer.

For V2X sidelink communication, Destination Layer-2 ID is not split and is carried within the MAC header.

Non-Access Stratum signaling is required for group formation and to configure Source Layer-2 ID, Destination Layer-2 ID, and Group Destination ID in the UE. These identities are either provided by a higher layer or derived from identities provided by the higher layer. In case of groupcast and broadcast, the ProSe UE ID provided by the higher layer is used directly as the Source Layer-2 ID and the ProSe Layer-2 Group ID provided by the higher layer is used directly as the Destination Layer-2 ID in the MAC layer. In case of one-to-one communications, the ProSe UE ID provided by the higher layer is used directly as the Source Layer-2 ID or the Destination Layer-2 ID in the MAC layer. In case of V2X sidelink communication, the higher layer provides Source Layer-2 ID and Destination Layer-2 ID.

Discovery in a NR V2X Sidelink

SA1 has identified four major advanced V2X use case groups: vehicles platooning; extended sensors; advanced driving; and remote driving. See 3GPP TR 22.886, Study on enhancement of 3GPP Support for 5G V2X Services; (Release 15), V15.1.0, and 3GPP TS 22.186, Enhancement of 3GPP support for V2X scenarios; Stage 1 (Release 15), V16.0.0.

Vehicle platooning enables the vehicles to dynamically form a group traveling together. All the vehicles in the platoon receive periodic data from the leading vehicle in order to carry on platoon operations. This information allows the distance between vehicles to become extremely small (e.g., the gap distance translated to time can be very low (sub second)). Platooning applications may allow the vehicles following to be autonomously driven.

Extended Sensors enable the exchange of raw or processed data gathered through local sensors or live video data among vehicles, RSUs, devices of pedestrians, and V2X application servers. The vehicles can enhance the perception of their environment beyond what their own sensors can detect and have a more holistic view of the local situation. High data rate is one of the key characteristics.

Advanced Driving enables semi-automated or fully-automated driving. Greater inter-vehicle distance is assumed. Each vehicle and/or RSU shares data obtained from its local sensors with vehicles in proximity, thus allowing vehicles to coordinate their trajectories or maneuvers. In addition, each vehicle shares its driving intention with vehicles in proximity. The benefits of this use case group are safer traveling, collision avoidance, and improved traffic efficiency.

Remote Driving enables a remote driver or a V2X application to operate a remote vehicle for those passengers who cannot drive by themselves, or remote vehicles located in dangerous environments. For a case where variation is limited and routes are predictable, such as public transportation, driving based on cloud computing can be used. High reliability and low latency are the main requirements.

Each of the above use case groups may require some form of discovery of a specific group of UEs; a platooning lead UE, a relay-UE, or a UE with specific V2X application or capability. It is believed the 3GPP system may enable discovery and communication between UEs supporting the same V2X application. For example, considering dynamic ride sharing, such use case enables a vehicle to advertise willingness to share capacity with another road user, and for a pedestrian to indicate intent to travel in a ride share. This type of discovery is not type critical. A UE supporting a V2X application will be able to establish direct unicast communication with another such UE based on discovery results. Similarly, the 3GPP system may enable a UE supporting a V2X application to discover another UE supporting a V2X application that can offer access to the network. For example, considering tethering via vehicle, such use case enables a vehicle to provide network access to occupants, pedestrians, etc. Another use case for enabling access to the network is the relay-UE scenario. We expect this type of discovery to not be time critical.

Regarding vehicle platooning requirements, the following discovery related use cases may be considered. Platoon discovery by a vehicle interested in joining the platoon; this type of discovery is not time critical. Platoon discovery by other vehicles outside the platoon and not interested in joining the platoon. When a platoon is formed and operational, a vehicle which does not belong to the platoon should be aware of the existence of the platoon, otherwise the vehicle may move into the middle of the platoon and disrupt the operation of the platoon. Thus, the platoon should be known to other vehicles beyond the communication range among vehicles of the same platoon. This form of discovery might not be time critical. Furthermore, within a platoon, it will be possible to support grouping of up to five UEs for a group of UEs supporting V2X application, implying a requirement to support platoon subgroup discovery. Also, for vehicle platooning, it may be possible to support reliable V2V communications between a specific UE supporting V2X applications and up to 19 other UEs supporting V2X applications, and therefore the UE may support platoon lead discovery. This discovery may not be time critical. It may also be possible to support discovery by platoon member UEs regarding change of the platoon lead of an existing platoon. We anticipate this discovery might be time critical.

Another example of discovery use case relates to Automated Cooperative driving, collective perception of environment, and Cooperative collision avoidance. Cooperative driving allows a group of vehicles to automatically communicate to enable lane changing, merging, passing among vehicles of the group, and inclusion/removal of vehicles in the group, to improve safety and fuel economy. With collective perception of environment, vehicles can exchange real time information (based on vehicle sensor information or sensor data from a capable UE-type RSU) between each other in the neighbor area. Both traffic types (periodic and event driven) can exist at the same time. The discovery of surrounding vehicles and their intent is therefore required. These family of use cases may require rapid discovery (e.g., time critical discovery).

In an NR, discovery may be periodic, or event based. The NR discovery may be either Model A based discovery, or Model B based discovery, as in LTE. Similarly, NR discovery may be open discovery, as in LTE, or restricted discovery, as in LTE. RAN2 has started discussion on NR V2X and it is anticipated that typical overall NR V2X communication steps may consist of the following: V2X Sidelink synchronization, V2X sidelink discovery, V2X session establishment, V2X radio configuration, V2X sidelink transmission, and V2X session release.

Identifying a Network Slice

A network slice is identified with an S-NSSAI (Single Network Slice Selection Assistance Information). The S-NSSAI consists of a Slice/Service Type (SST) and a Slice Differentiator (SD).

An NSSAI is a collection of S-NSSAI's. There are 3 types of NSSAI's.

The Configured NSSAI is the NSSAI that the UE is configured to use. The UE may have a different configured NSSAI in each PLMN. The configuration may include instructions for how to map the configured NSSAI to the HPLMN configured NSSAI. The Requested NSSAI is provided to the network by the UE at registration. The network will use it to determine what network nodes should serve the UE and what network slices the UE should be allowed to connect to.

At the completion of registration, the network provides the UE with an Allowed NSSAI. The Allowed NSSAI is a list of slices that the UE is allowed to access.

Non Public Networks

3GPP TR 23.734, Study on enhancement of 5GS for Vertical and LAN Services (Release 16), V16.0.0, introduced the concept of Non-public networks in 5G.

A Non-public network is a network that is intended for non-public use. A Non-public network ID (NPN-ID) identifies a non-public network. The NPN-ID supports two assignment models. Locally managed NPN-IDs are assumed to be chosen randomly at deployment time to avoid collisions (and may therefore not be unique in all scenarios). Universally managed NPN-IDs are managed by a central entity, and are therefore assumed to be unique.

A gNB broadcasts NPN-ID(s) in the SIB to identify the non-public networks the cell provides access to.

Closed Access Groups

A cell may only be accessible to certain groups of UEs. The group of UEs that may access the cell are called a Closed Access Group (CAG). A SIB includes a CAG indication identifying the cell as a Closed Access Group cell. The SIB also includes CAG ID(s) to indicate what CAG(s) may access the cell.

Terminology and Use Cases

A UE may interact with a V2X Application Server. A UE may interact with more than one V2X Application Server. For example, a UE may interact with a Local V2X Application Server which is geographically close to the UE and is associated with a particular geographic region, and a second V2X Application Server which is associated with a second geographic region. For example, the UE may interact with a V2X Application Server that is associated with particular part of a road, and a second V2X Application Server that is associated with an entire PLMN. A geographic region may be identified by a GEO ID.

Higher Layer Applications in a UE may communicate with a V2X Application Server. The concepts disclosed herein may equally be applied in a variety of scenarios, such as: interaction between a V2X Application Specific Client and a V2X Application Specific Server; interaction between a V2X Application Enabler Client and a V2X Application Enabler Server; interaction between a Location Management Client and a Location Management Server; interaction between a Group Management Client and a Group Management Server; interaction between a Configuration Management Client and a Configuration Management Server; interaction between an Identity Management Client and an Identity Management Server; interaction between a Key Management Client and a Key Management Server; and interaction between a Network Resource Management Client and a Network Resource Management Server.

V2X Services may be identified by a V2X Service Identity (V2X service ID) as defined in 3GPP TS 23.286, Application layer support for V2X services; Functional architecture and information flows; (Release 16), V0.3.0.

A V2X Group ID is defined in reference TS 23.286 as "a globally unique identifier within the V2X service that represents a set of V2X users and the corresponding V2X UE. The set of V2X users may belong to the same or different V2X service provider. It indicates the V2X application server where the group is defined."

Example Challenges

To enable unicast and groupcast communication, there is the need to define procedures to allow a UE to discover other UEs in proximity, which are interested in the same V2X service and would like to share certain content. As also discussed in the background, in LTE sidelink (SL) V2X and LTE D2D, the RAN protocols were designed mainly considering broadcast types of service, including D2D proximity discovery. Therefore, no discovery procedure was really designed at the RAN layer to aid the discovery of UE pairs or group of UEs or a group lead (e.g., platoon lead).

RAN impacts in support of LTE D2D ProSe discovery are quite limited, since the content of a discovery message is transparent to the AS layer, and there is no different handling in the AS for the two discovery models described above. The discovery message is delivered in a MAC PDU solely consisting of a MAC SDU with no header and with a fixed TBS of 232 bits. The UE is provided by higher layers with link layer L2 identities, e.g., layer-2 addresses to use for future sidelink communications.

Group Management and Discovery at an Upper Layer (Above the AS)

Assuming group management and discovery is performed at the higher layer, enhancements are needed to aid higher layers to establish unicast/groupcast communications, considering the higher complexity of the V2X framework compared with the ProSe framework, and, most importantly, the advanced NR V2X requirements in terms QoS and radio capabilities. For example, the UE has the interest to discover another UE at the application layer, but if the radio layer characteristic at the UE does not meet the QoS requirements (e.g., communication range) of the possible connection or established connection, or the UE capabilities of UEs involved in the possible unicast/groupcast communication do not match, it would be meaningless to establish such a connection. Consider the case where the higher layer of the UE broadcasts information to nearby UEs on the service of interest, high layer UE identifications, and so on, to identify the interested nearby receiver UEs. Upon identifying the interested receivers for unicast and groupcast sidelink communications, the interested UEs may exchange the radio-related information which is needed to set up the unicast and groupcast sidelink communications and to meet the desired QoS performances. Information is exchanged between the AS and the upper layer to aid the selection of a target UE or a group of target UEs among a set of discovered candidate UEs or discovered candidate groups of UEs, and solutions for such information exchanges need to be designed. Solutions for which layer makes the selection of a UE among the set of discovered candidate UEs or which layer makes the selection of a group of UE among a set of discovered candidate groups of UEs need to be devised. Furthermore, triggers and rules for group formation, group dismissal, election of group head (e.g., platoon lead), change of group head, and discovery of such events by group members need to be considered.

Group Management and Discovery at Access Stratum

In D2D, group communication is supported, and group management is handled in the application layer. The ProSe Layer-2 Group ID is contained as destination ID in the sidelink MAC subheader in each packet. The ProSe Layer-2 Group ID is pre-configured in the UE or provisioned via the PC3 interface from the ProSe Function.

For Vehicle Platooning, vehicles of the same platoon share necessary information required to support the platoon operations (e.g., distance between vehicles, relative speed, updates from RSU, etc.). When the vehicles are traveling on the road, they are able to dynamically form a platoon. The platoon manager is responsible for platoon management. The manager should update, in real-time, surrounding traffic data reported by group members and report it to the RSU. At the same time, the platoon manager should receive, in real-time, the RSU messages which include road conditions and traffic information far from their location and share them with platoon members. All the platoon members may also share the information within the group through V2V. As evidenced by this, in NR V2X, it appears the V2X communication group is formed dynamically by vehicle UEs nearby (e.g., with the same direction, speed, or destination). And one vehicle UE in the group acts as the group manager which reports traffic data reported by group members to the RSU, as well as receives messages from the RSU and relays them to group members. In ProSe D2D, while group formation is also based on proximity, it is not as dynamic, as it doesn't involve UEs on the move, which might appear or disappear in a much more dynamic manner. Because the dynamicity of group formation and dismissal is much faster than in ProSe D2D, group management handled in the AS layer could also be considered as an alternative to group management above the AS layer.

V2X Radio Configuration

Discovery procedure is used to identify specific UEs in order to initiate one-to-one communication, or to identify specific groups of UEs in order to initiate one-to-many communication. Once a UE or group of UEs of interest is discovered, the access stratum resources, including radio channels and protocol stack resources, need to be configured in support of the communication. While the upper layer above the access stratum may indicate to the access stratum QoS related information and whether a communication should be unicasted, groupcasted, or broadcasted, access stratum specific rules and criteria may need to be designed in deciding whether a communication should be carried out connectionlessly or in a connection-oriented manner.

Models of discovery that may be used for V2X include self-advertisement discovery and target search discovery.

The self-advertisement discovery is similar to the LTE D2D sidelink model A discovery, and defines two roles for the participating UEs; the announcing UE advertises information about itself, such as its service capability, including its service offering, supported V2X applications, its group membership, etc., and information that could be used by UEs in proximity that have permission to discover, and the monitoring UE which monitors certain information of interest in proximity of announcing UEs, such as existence of a platoon lead, existence of a UE or group of UE with specific V2X service capability and service offering or V2X applications. In this model, it is also proposed that monitoring UEs, with the right authorization credentials, may also autonomously elect to respond to the announcing UE, or may autonomously elect to initiate V2X communication toward the announcing UE or to join a group that the announcing UE belongs to, and establish groupcast or multicast communication toward the announcing UE without first matching a report to the V2X control function or other network entities.

In this model, the announcing UE transmits discovery messages at pre-defined discovery intervals or in an aperiodic event-based manner. The discovery message may be transmitted in unicast, groupcast, or multicast manner (e.g., if the UE is already part of a group, the UE may group cast a self-advertisement discovery message to other UEs within the group). Both open and restricted discovery types are supported by the self-advertisement discovery model.

The target discovery is similar to the LTE D2D sidelink model B discovery, and also defines two roles for the participating UEs; the discoverer UE or the target search announcing UE, which transmits a request containing certain information such as V2X applications of interest, groups of interest, service capability, service platform capability, radio capability about what it is interested to discover, and to determine whether a discoveree UE can offer certain service, and the discoveree UE which receives the request message and is able to respond with some information related to the discoverer's request. The target search announcing UE may also advertise information about itself and search information described above for self-advertisement discovery model. The discoveree, or the target search monitoring UE, may respond with information about itself, such as supported V2X application, groups of interest, service capability, service platform capability, radio capability, etc. In this model, the announcing UE may also transmit discovery messages at pre-defined discovery intervals, or in an aperiodic event-based manner. The discovery message may be transmitted in unicast, groupcast, or multicast manner (e.g., if the UE is already part of a group, the UE may group cast a target search discovery message to other UEs within the group). Restricted discovery type is the primary supported discovery type by the self-advertisement discovery model. However, open discovery type may also be supported by this model. For example, if the target search is aimed at the UEs already part of a group that the announcing UE has joined and is part of, then a target search towards a member of the group may not necessarily need to be a restricted target search. UEs involved in this model of V2X discovery may be platoon lead UE, group lead, or any UE or group of UEs, for example UE with specific capability, whether it is application or service layer capability, network layer capability, or transport capability, including radio capability.

In this disclosure we will use NAS, V2X NAS, V2X upper layer, and V2X higher layer interchangeably. The terms NB, eNB, and gNB will also be used interchangeably.

Provisioning for V2X Discovery and V2X Communication

Figure 2A:
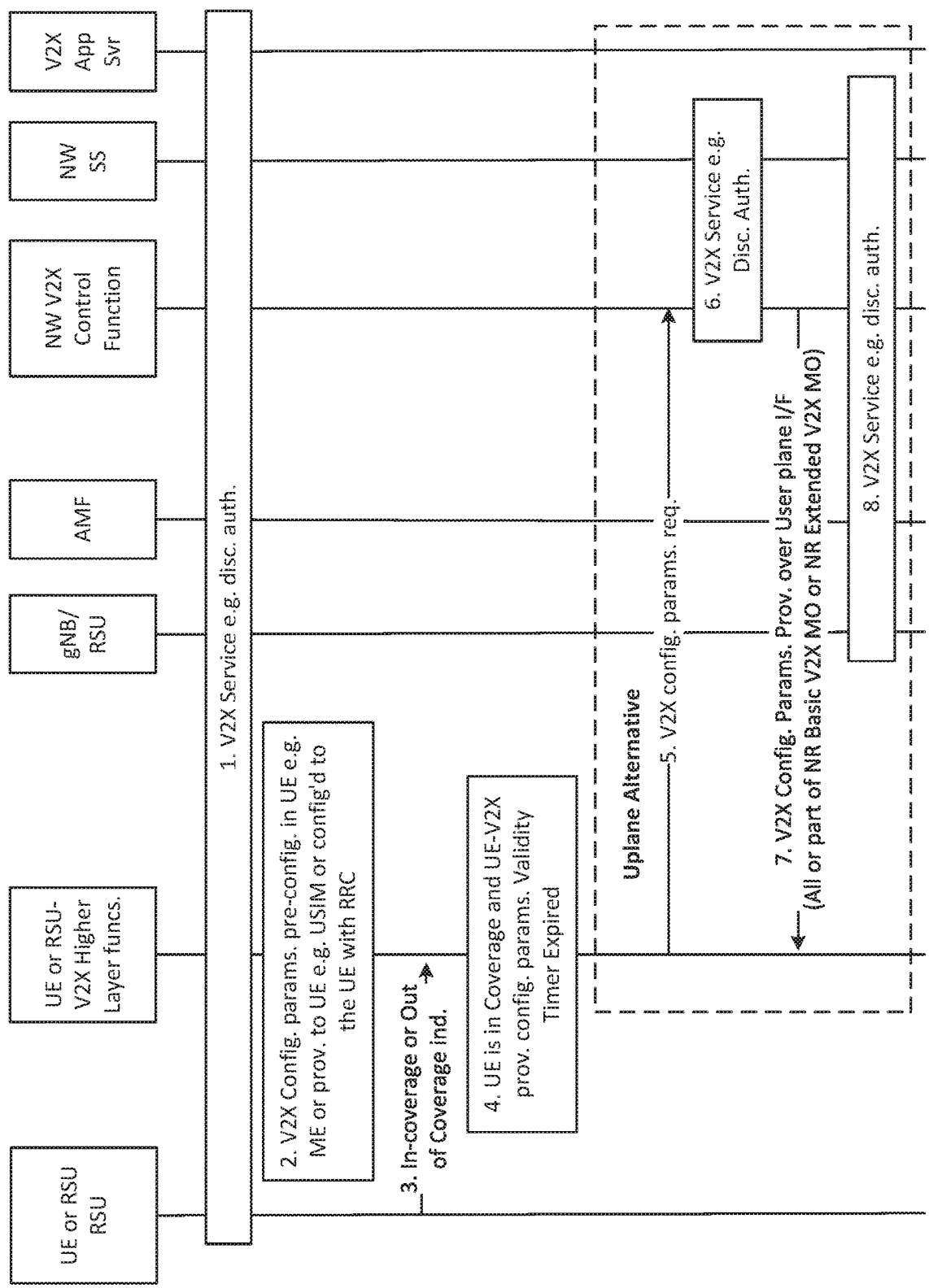
FIGS. 2A and 2B show a call flow of a first part of an example V2X service provisioning and authorization.
Figure 2B:
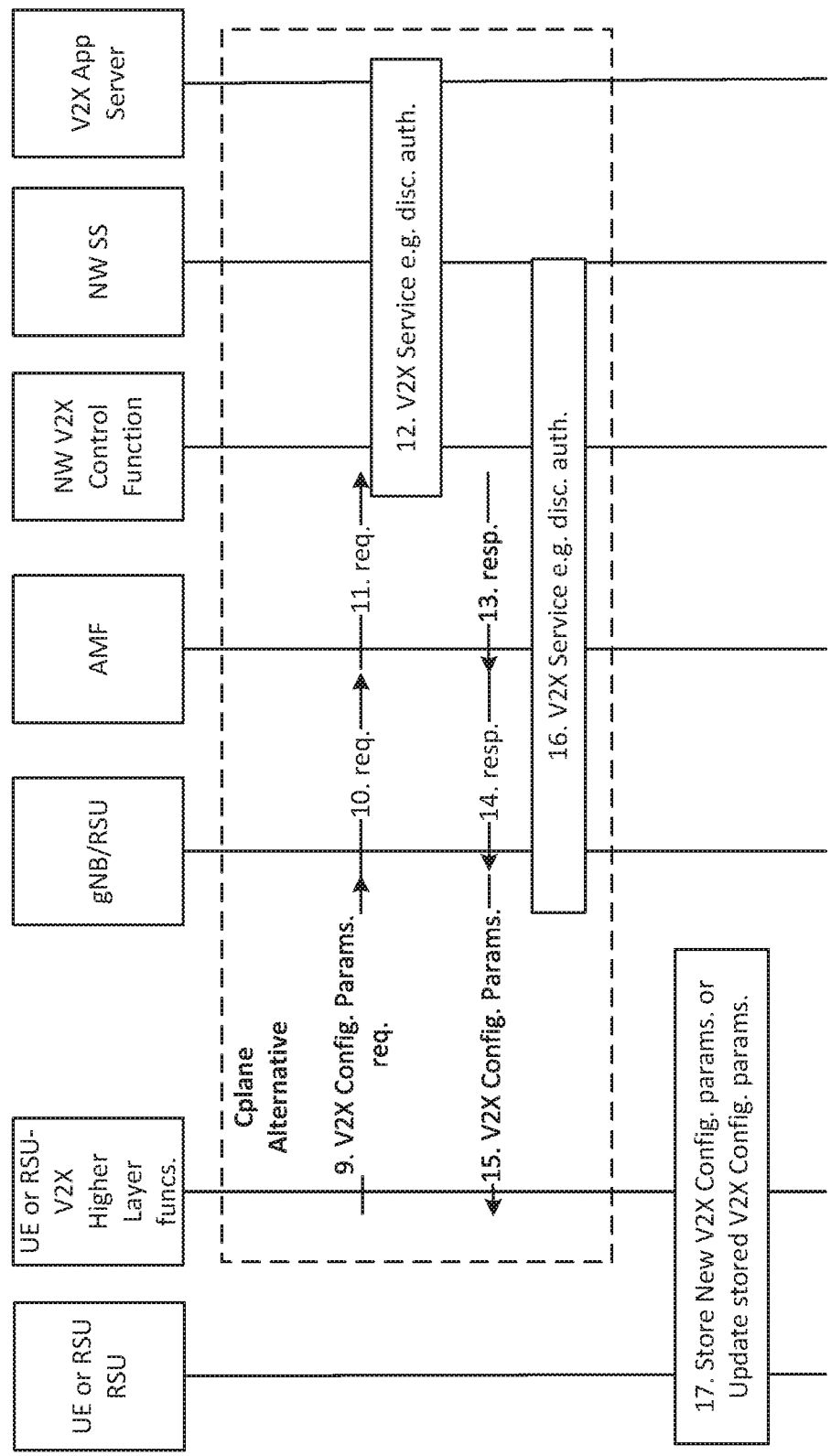
Figure 3:
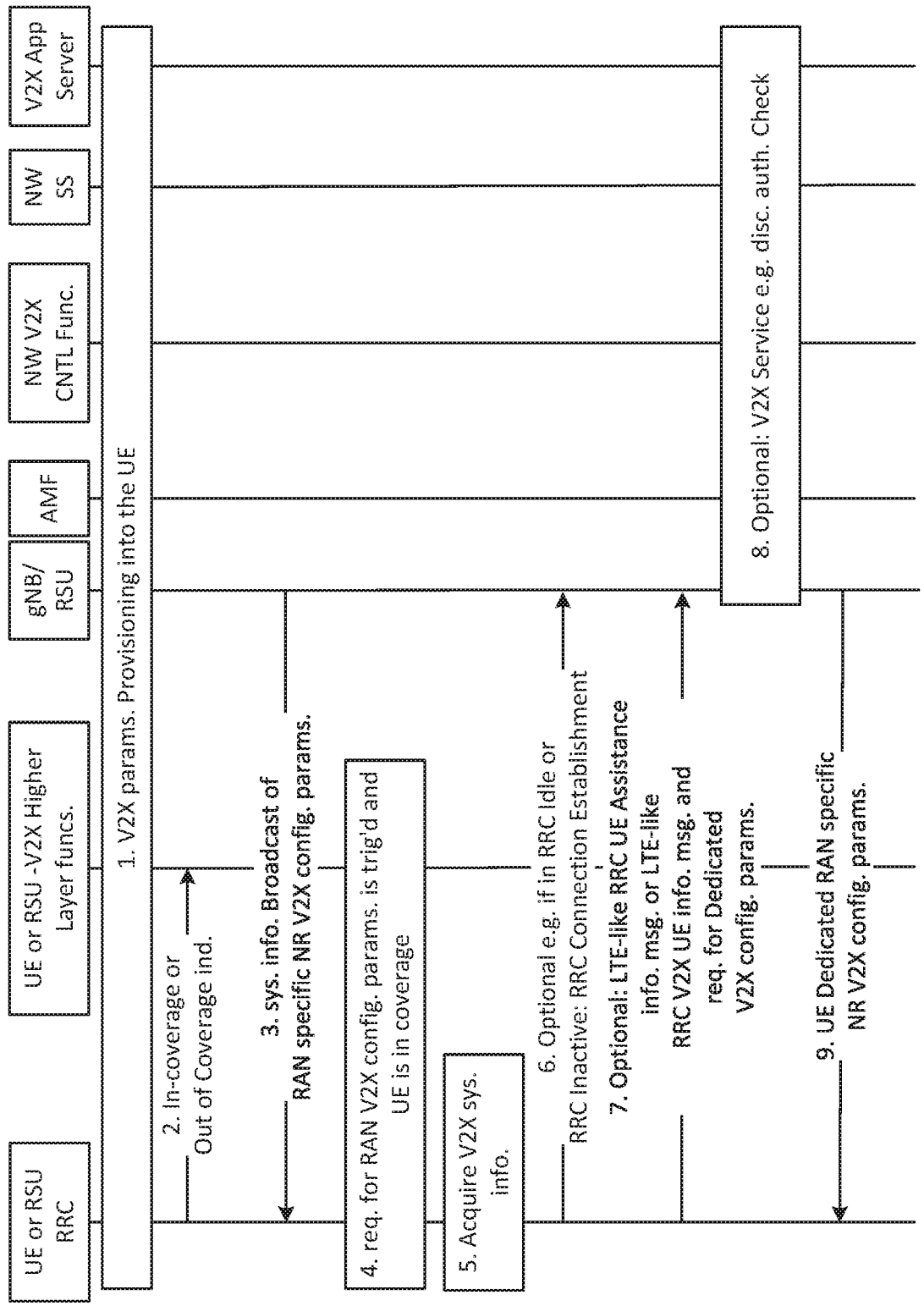
FIG. 3 shows a call flow of a second part of an example V2X service provisioning and authorization.

An example of V2X provisioning procedure that might be used to configure the UE, V2X communication policy and configuration parameters, and particularly V2X discovery policy and configuration parameters, is depicted in FIGS. 2A, 2B, and 3. Few architecture options are proposed. In one option, the discovery policy is provided to the UE over user plane bearers. In another alternative, the discovery policy may be provided to the UE over the control plane bearers. Both configuration methods may co-exist in the UE. The UE may negotiate with the network which provisioning method to use. Such negotiation may require signaling of the UE's capability by the UE to the network, and the signaling of the network's capability by the network to the UE. Depending on the UE's capability, the V2X communication (e.g., V2X discovery policy and configuration parameters) may be provisioned into the UE using only user plane bearer or control planer, or both the user plane and the control plane bearer (e.g., a UE in coverage of Wi-Fi only may only be provisioned with V2X parameters by the network through user plane, while the UE under cellular network coverage may be provisioned over user plane or over control plane). An example of V2X policy configuration may include one or more of the following: list of authorized PLMNs for V2X discovery self-advertisement announcement and validity timer; list of authorized PLMNs for monitoring of V2X discovery self-advertisement and validity timer; list of authorized connectivity type (e.g., GSM, E-UTRAN, NR, Wi-Fi) and validity timer; list of authorized PLMNs for V2X restricted discovery self-advertisement announcement and validity timer; list of authorized PLMNs for restricted monitoring of V2X discovery self-advertisement and validity timer; list of authorized PLMNs for V2X restricted discovery target search announcement and validity timer; list of authorized PLMNs for restricted monitoring of V2X target search announcement and validity timer; list of authorized PLMNs for response to V2X restricted discovery target search announcement and validity timer; list of authorized PLMNs for monitoring of response to restricted V2X target search announcement and validity timer.

An example of other discovery configuration parameters may include one or more of the following: group parameters; group member discovery parameters; platoon lead discovery parameters; group lead discovery parameter; discovery capability parameters; platform capability parameters; supported application parameters; discovery message to QoS mapping parameters; discover frequency carrier configuration and mapping to discovery message; frequency carrier to QoS (e.g., PPPP and PPPR) mapping parameters; resource pool configuration for out-of-coverage usage, geographical validity area and mapping to discovery messages; allowed RATs and mappings to discovery messages; allowed transmission profiles and mapping to discovery messages; allowed reception profiles and mapping to discovery messages; allowed subcarrier spacing and mapping to discovery messages; allowed BWP and mapping to discovery message; and discovery message prioritized bit rate and mapping to discovery messages.

Provisioning for V2X Discovery and V2X Communication

As shown in Step 4 of FIG. 2A, the expiration of a validity time may trigger the UE to send a request to the network for V2X Configuration Parameters. However, other events at the UE may also trigger the UE to send a request to the network for V2X Configuration Parameters.

For example, a number of events may alternatively occur in Step 4, such as: the UE detecting that it is leaving or entering a geographical area; the UE detecting that the quality of the connection to a Local V2X Application Server is degrading, or is about to degrade, based on the UE's planned route; the UE detecting that an NPN is within range (e.g., reception of an NPN-ID in a SIB); the UE detecting a CAG ID in an SIB; the UE connecting to a NPN; and the user of a UE entering information in a GUI that is associated with the UE (e.g., using a GUI to indicate a new driver).

When a triggering event occurs, and the UE is configured to use the user plane embodiment, Step 5 will occur, and the user plane embodiment of FIG. 2A will begin. Step 5 may represent a Configuration Management Client on the UE, and may send a V2X UE Configuration Request. The request may include the V2X UE ID and may also include a variety of information, such as: a geographical area identifier (GEO ID); a list of NPN IDs that are detected as visible to the UE (e.g., detected in a SIB); the identity of an NPN to which the UE is connected; a CAG ID that is associated with the UE's NPN connection; a User Identity that identifies the driver, or controller, of the vehicle, e.g., a User Identity that has been provided via GUI; V2X Service IDs of services the UE desires to use; and a V2X Group ID that represents the users that are associated with the UE.

In a user plane embodiment, Step 5 may be sent via an IP based PDU Session. The PDU Session may have been previously established by the UE on a network slice. The S-NSSAI of the network slice may have an SST value that indicates the V2X services and the DDN that is associated with the PDU Session may have been configured in the UE for the purpose of communicating with the Configuration Management server. The message may be addressed to the Configuration Management Server. The Configuration Management Server may authorize the request in Step 6 and reply to the Configuration Management Server in Step 7. As shown in FIG. 2A, the reply of Step 7 may include a Management Object (MO) that is used to configure the UE for V2X communication. The MO may include a variety of information, such as: the identity of V2X Application Servers; NPN-IDs; CAG-IDs; available V2X Service IDs; and unavailable V2X Service IDs.

The MO may be configured to indicate what geographical area with which the above information is associated. For example, the MO may be configured to indicate that a particular V2X Application Server is available in a particular area, that the UE may reach it via a particular NPN-ID, and that the UE is part of a particular CAG-ID.

The Reply may further indicate what NSSAIs and DDNs may be used to reach the services.

The method of FIG. 2A continues in FIG. 2B. When a triggering event occurs, and the UE is configured to use the control plane embodiment, Step 9 will occur, and the control plane embodiment of FIG. 2B will begin. In a control plane embodiment, Steps 9, 10, and 11 may represent a NAS (e.g., a UE Policy Provisioning Request) message that is sent from the UE to the AMF and is forwarded by the AMF to the PCF. The request may include the same information elements that were earlier proposed to be part of the V2X UE Configuration Request. When the message is received by the PCF, the UE Policy Delivery Procedure of 3GPP TS 23.502, Procedures for the 5G System; Stage 2; (Release 15), V15.4.1, will be triggered. The policies that are delivered to the UE will include the MO that is described in the previous paragraph.

Alternatively, the UE's request to the V2X Application Server may be sent via the user plane, and the V2X Application Server may trigger control plane delivery of policies to the UE by invoking an NEF API. The NEF API invocation may allow the V2X Application Server to provide the UE ID and Policy Information to the PCF.

Upon receiving the updated MO configuration, the UE will store and update its V2X configuration as shown in Step 17 of the FIG. 2B.

Solutions for Group Management and Discovery at an Upper Layer

In this class of solutions, the decision for announcement or monitoring of the V2X discovery messages is controlled by the upper layers above the Access Stratum (AS). Furthermore, the decision for request for authorization, to announce discovery message, to monitor discovery message, or to respond to discovery message is controlled by the upper layers above the AS.

V2X Discovery Authorization, Announcement, & Response Parameters Determination

Figure 4A:
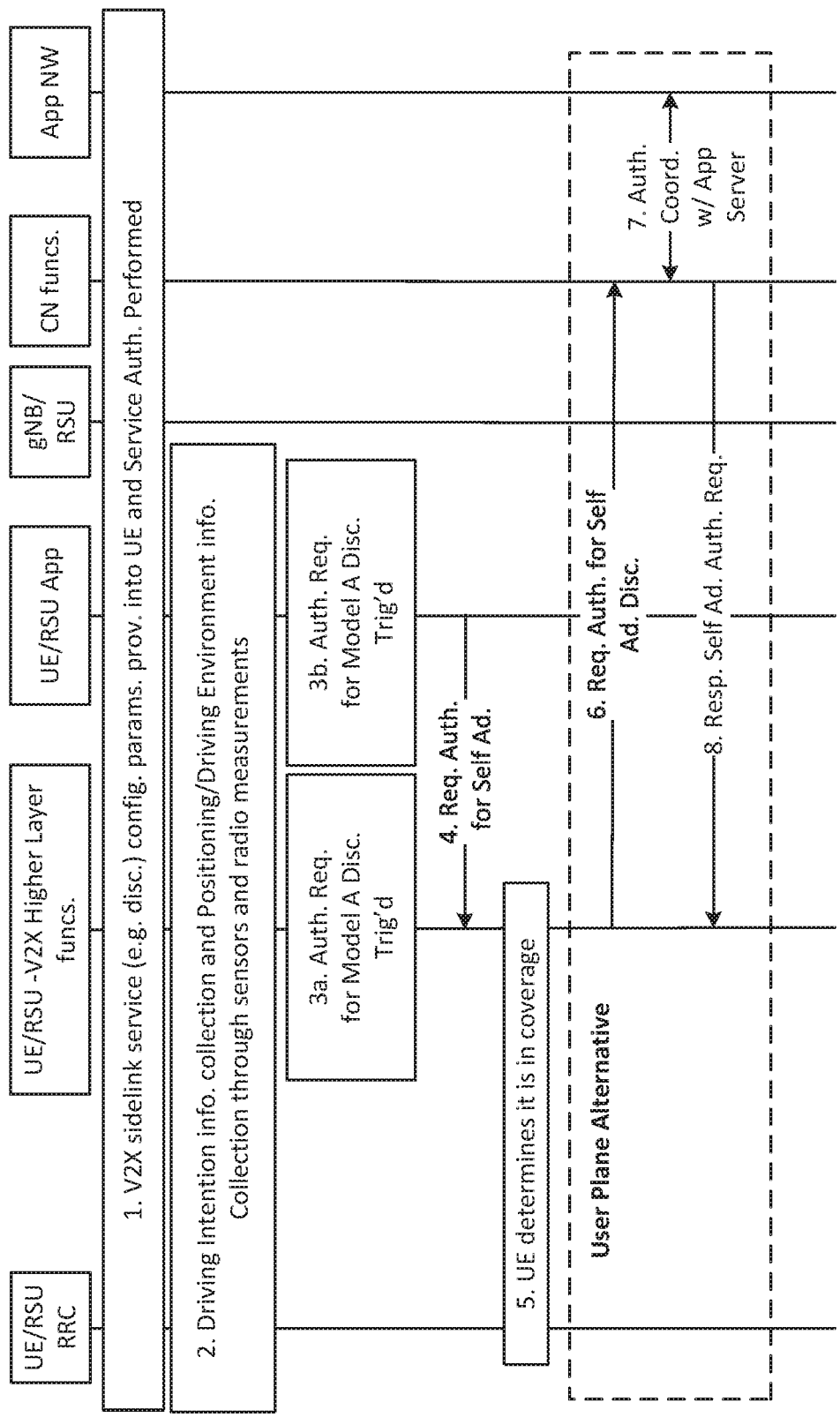
FIGS. 4A and 4B show a call flow of a second part of an example request for V2X self-advertisement discovery announcement—in coverage.
Figure 4B:
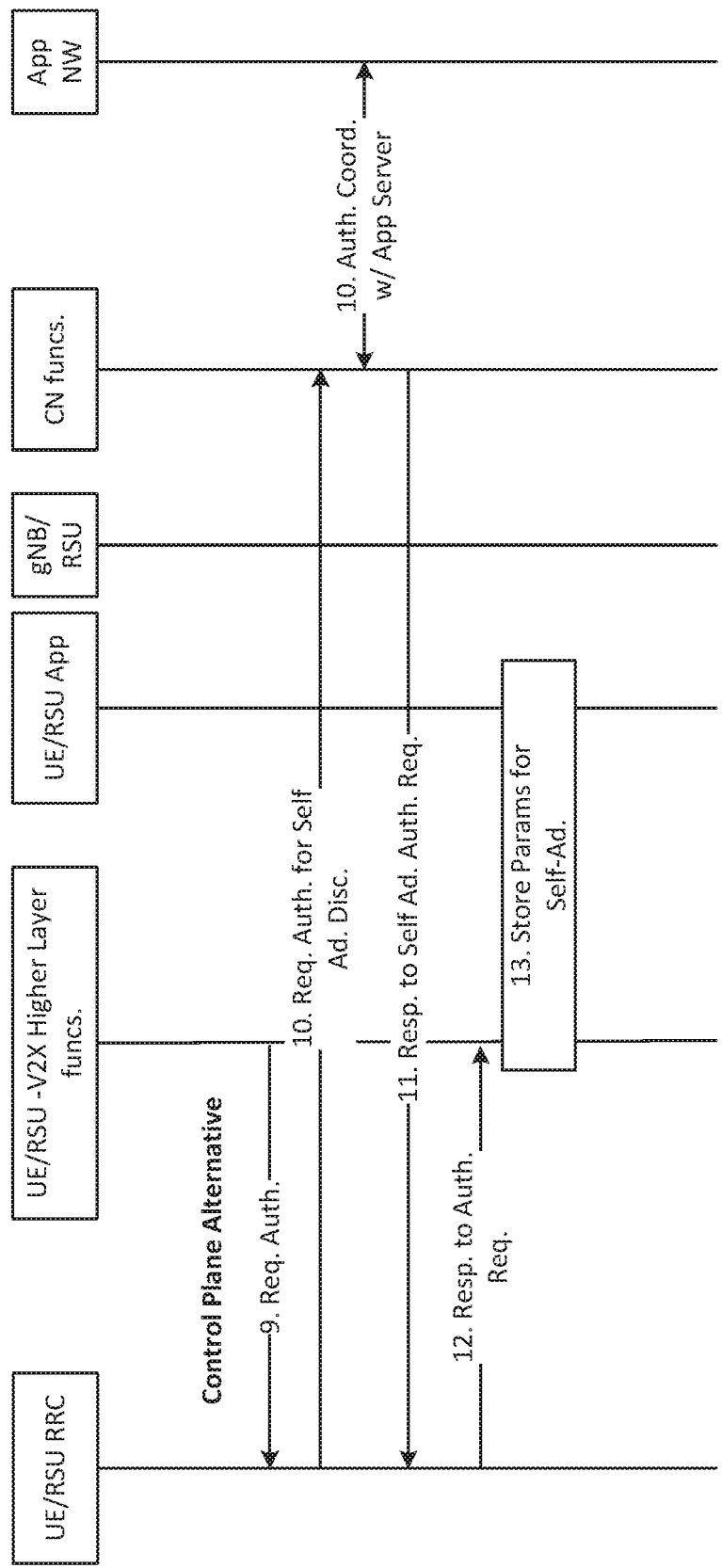
Figure 5:
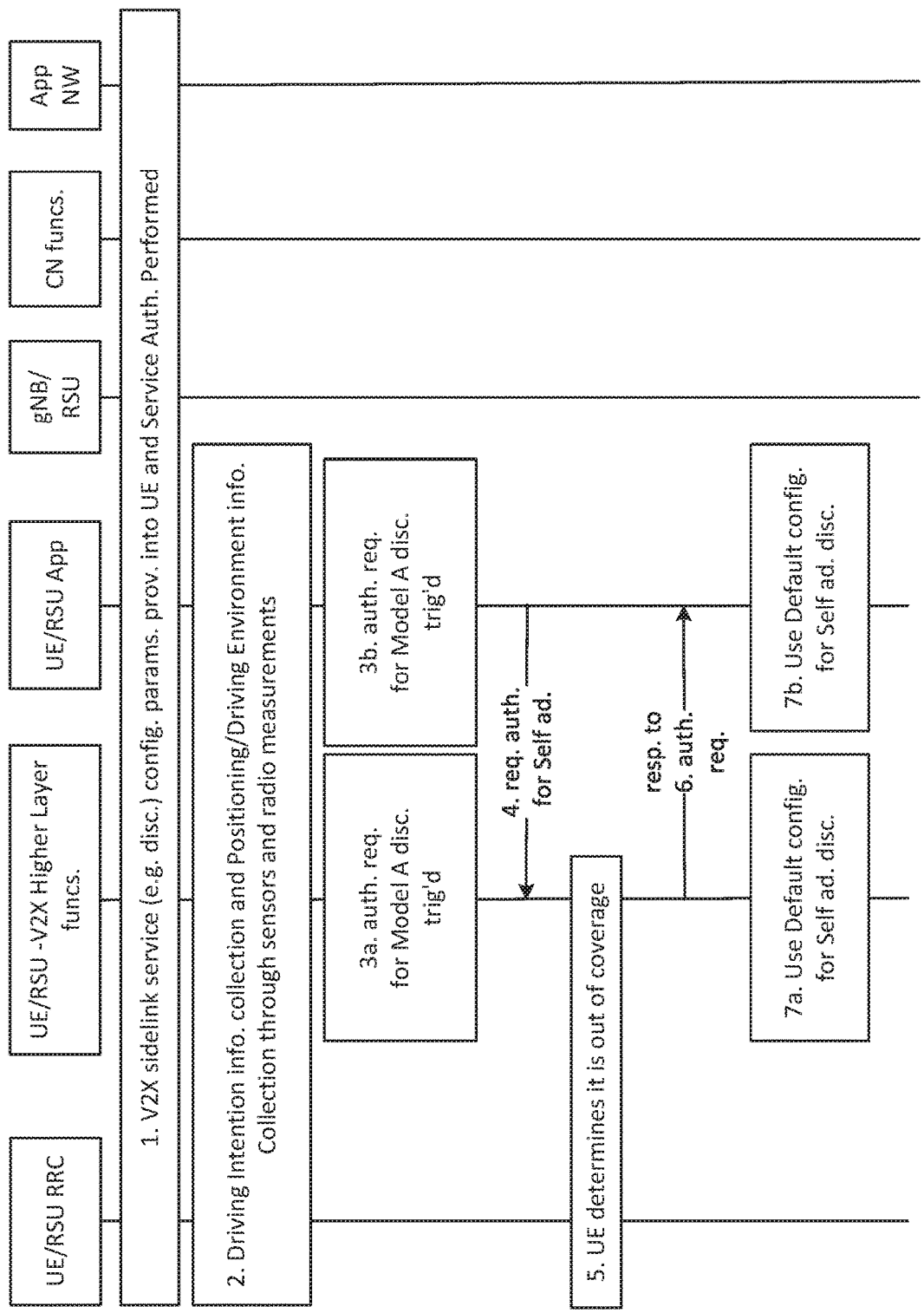
FIG. 5 shows a call flow of a second part of an example request for V2X self-advertisement discovery announcement—out of coverage.

An example of procedures for request for authorization to perform announcement of self-advertisement discovery message when in-coverage or out-of-coverage are captured in FIGS. 4A-B and FIG. 5 respectively. When discovery procedure is triggered by the upper layers, authorization and parameters for the specific instance of the discovery the UE is about to engage in may need to be coordinated and confirmed with the network when in coverage, otherwise fallback default policy and configuration parameter when out-of-coverage is used.

In step 1, the UE is provisioned with policy and configuration parameters for V2X sidelink communication (e.g., V2X sidelink discovery self-advertisement). The UE is authorized for V2X communication (e.g., V2X sidelink discovery self-advertisement).

In step 2, the UE collects driving intentions information, positioning information, and driving environment information through sensors. The UE performs radio measurements. Such measurements may include radio quality related measurements such as RSRP and RSSI (e.g., in RRC idle or RRC inactive state). Additionally in RRC connected, the UE may collect measurements such as RSRQ and CQI. The UE may also collect load information and congestion related information, such as Channel Busy Ratio (CBR) or Channel Occupancy Ratio (CR). The UE may be configured to perform information collection including radio measurement as a continuous background process. The collection of information including radio measurements may be periodic, with configured one or more time intervals. The UE may also collect event-based information, including radio measurements.

In step 3, an authorization request for self-advertisement discovery is triggered. Example of triggers may be one or more of the following: expiry of the validity timer of the policy or configuration parameters; request from the application; the UE becomes a group lead or platoon lead; the UE ceases to become a group lead or platoon lead; joining a group; leaving a group; user request or change in user setting; change in size of group; group maximum size; group can no longer accept new member; group can accept new member, etc.

In step 4, the upper layer above the AS constructs the authorization request self-advertisement message and submits it to the AS for transmission.

In step 5, the UE determines it is in coverage. This may be based on in-coverage threshold configurations.

Steps 6 through 12 include the transmission of the request and response are exchanged between the UE and the network over either the control plane or the user plane.

In step 13, the UE stores the response message in its internal database, including policy and parameters for self-advertisement discovery.

The steps for authorization request for self-advertisement discovery in out-of-coverage is similar to that of in-coverage. However, the UE exchanges no message with the network. The V2X NAS layer and the application layer exchange stored default configuration parameters in support of the discovery procedure.

Figure 6A:
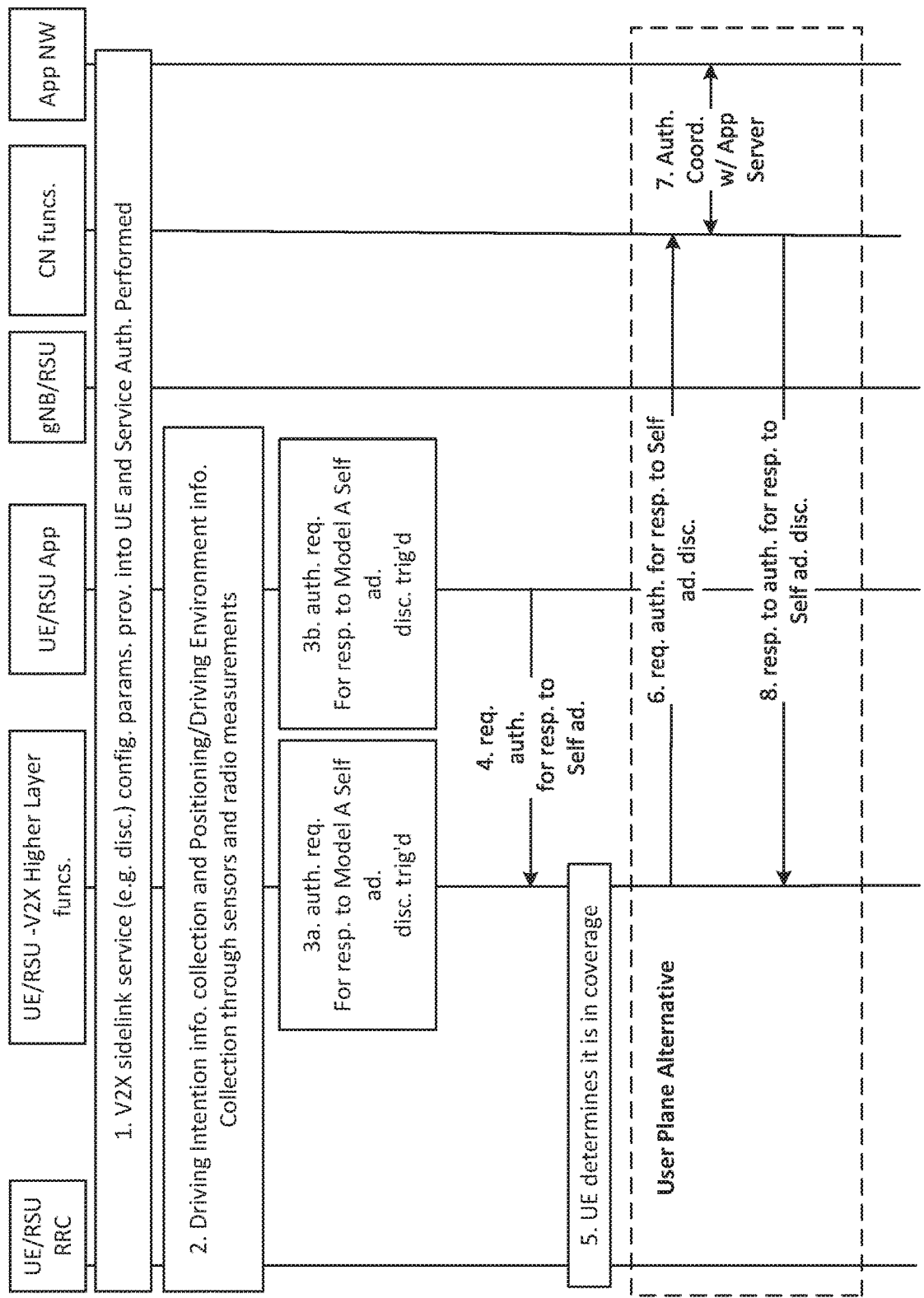
FIGS. 6A and 6B show a call flow of a second part of an example request for response to V2X self-advertisement discovery announcement—in coverage.
Figure 6B:
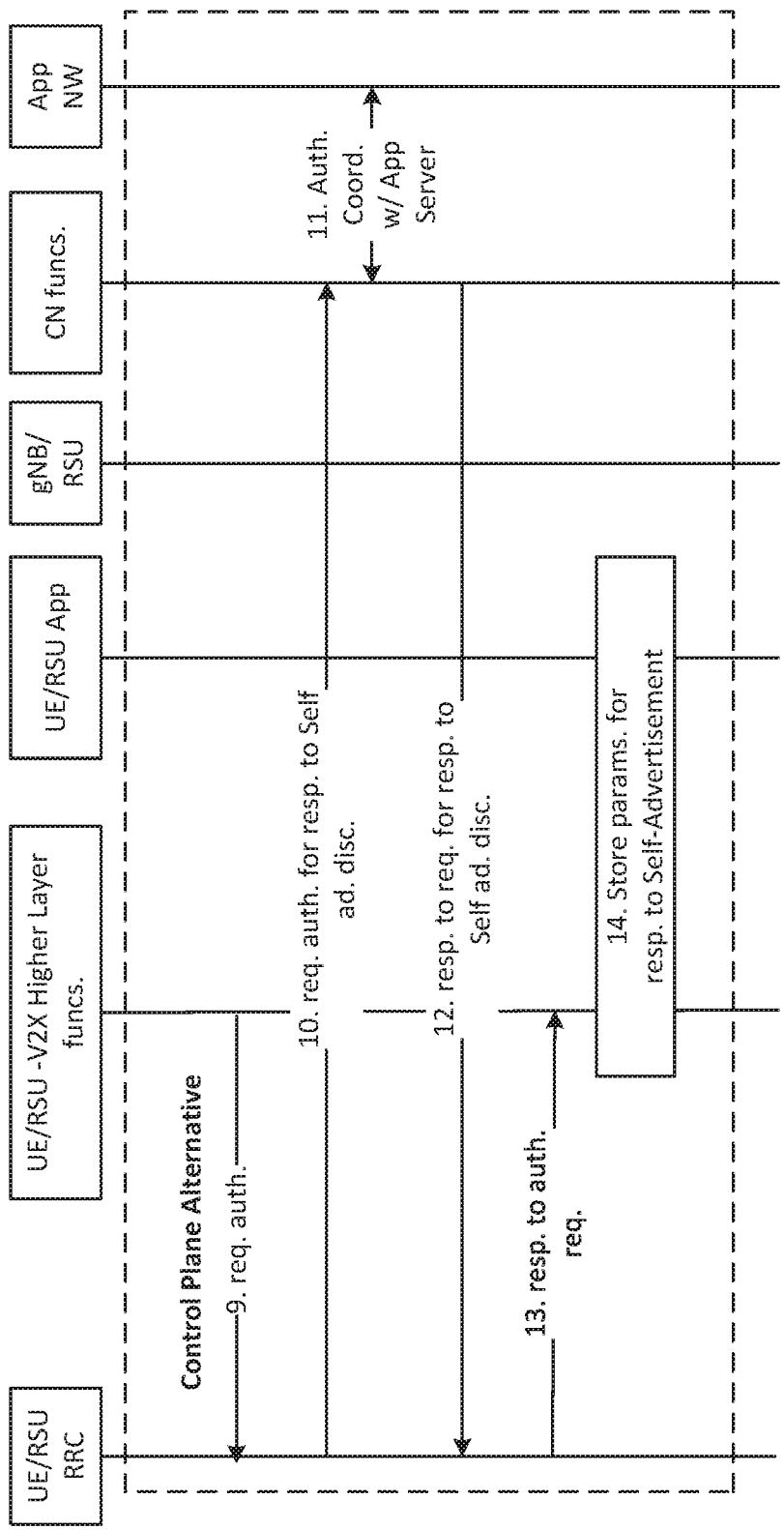
Figure 7:
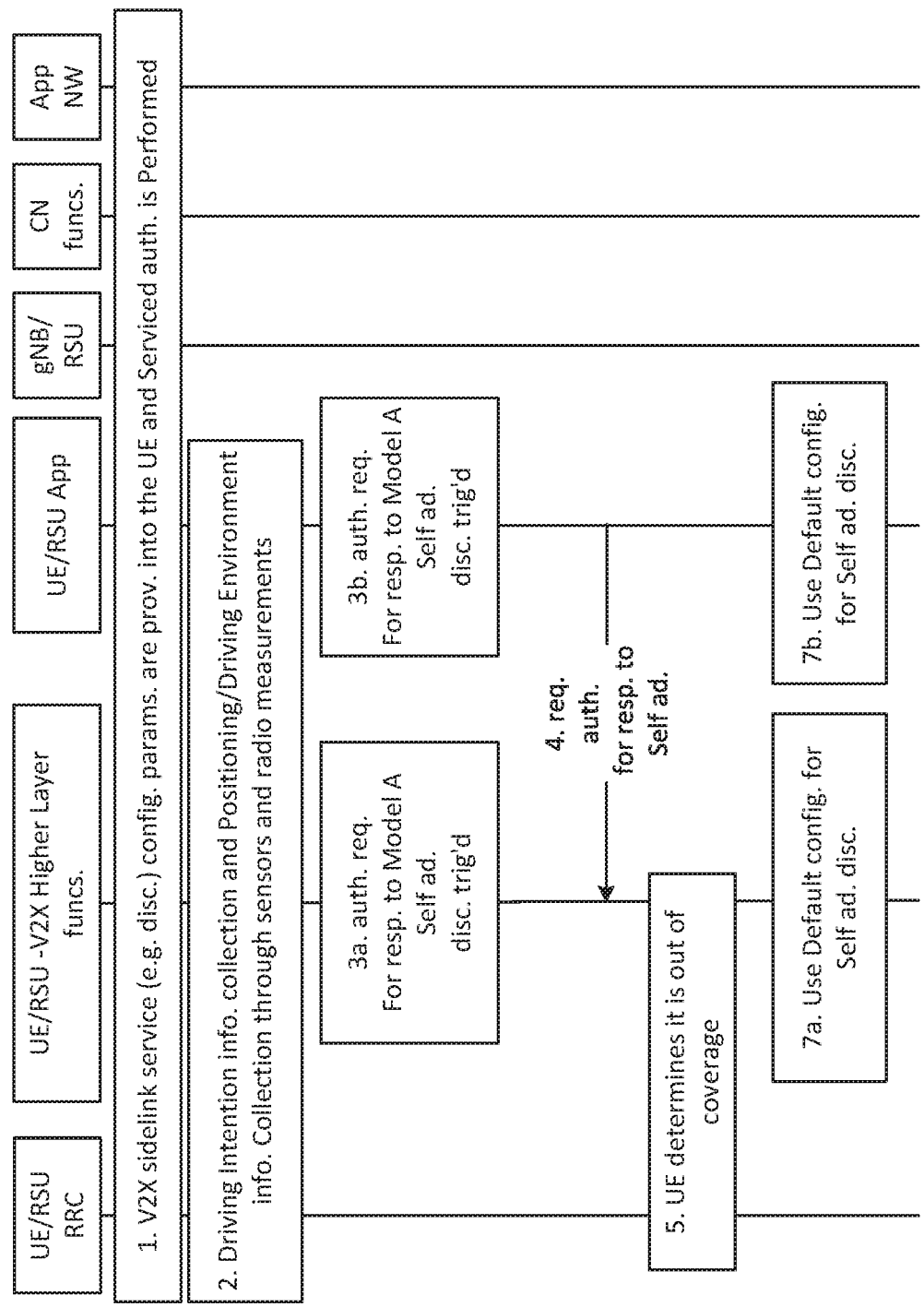
FIG. 7 shows a call flow of an example request for response to V2X self-advertisement discovery announcement—out of coverage.

Examples of procedures for request for authorization to respond to announcement of self-advertisement discovery message when in coverage are captured in FIGS. 6A and 6B. An example out-of-coverage is shown in FIG. 7. When response to discovery announcement is triggered by the upper layers, authorization and parameters for the specific instance of the discovery response the UE is about to engage in may need to be coordinated and confirmed with the network when in coverage, otherwise fallback default policy and configuration parameter when out-of-coverage is used.

Figure 8A:
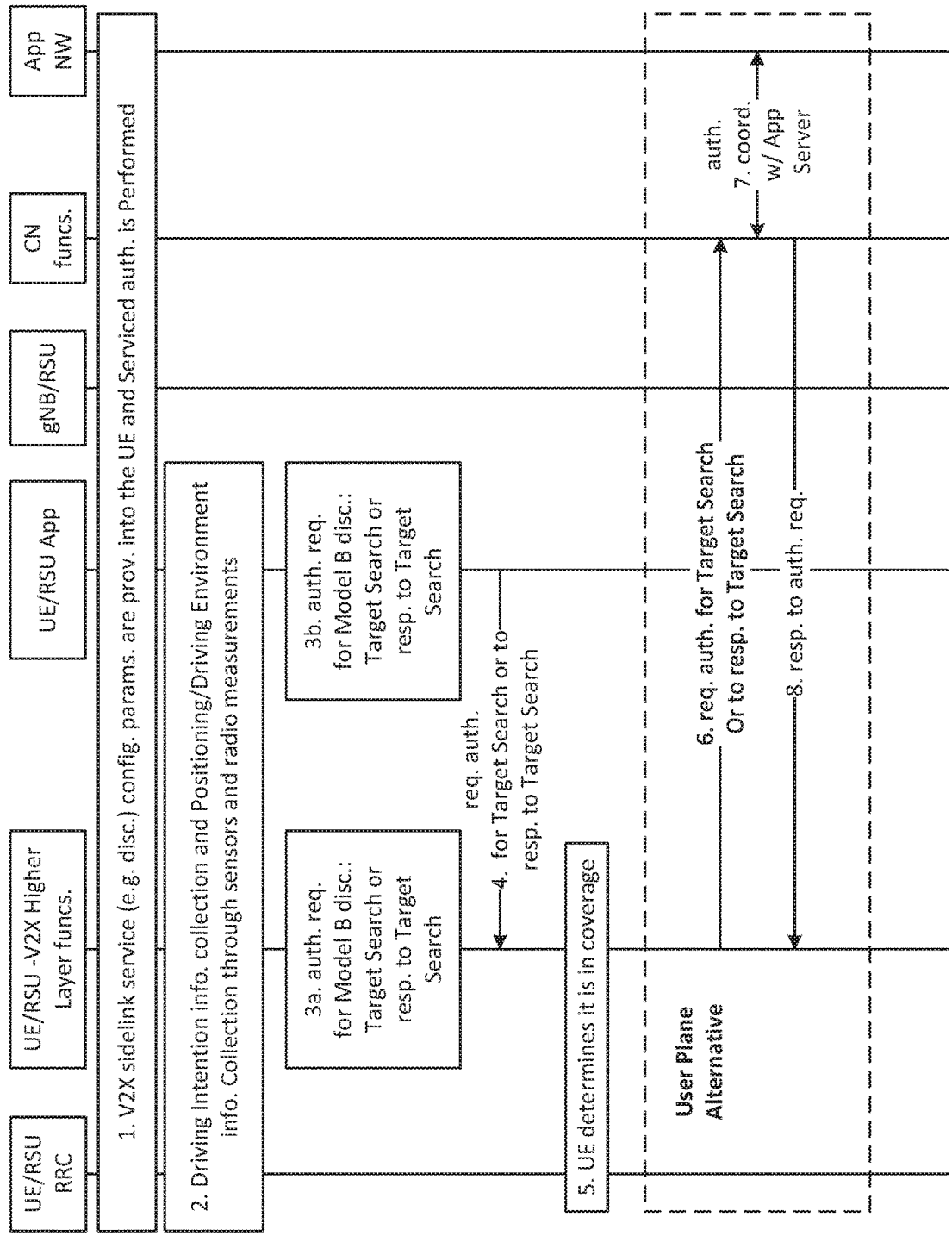
FIGS. 8A and 8B show a call flow of an example request or request for response for V2X target search discovery announcement—in coverage.
Figure 8B:
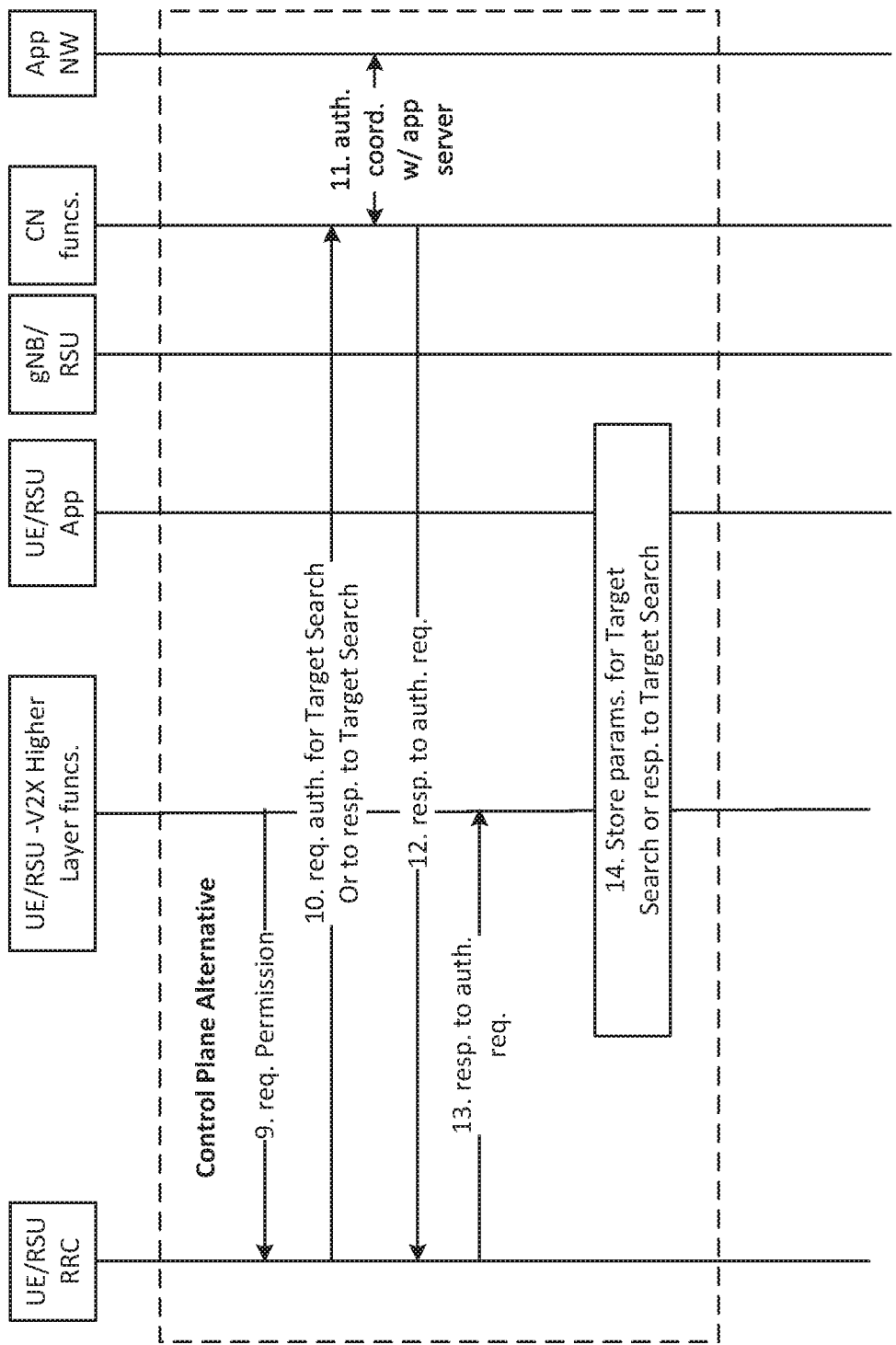
Figure 9:
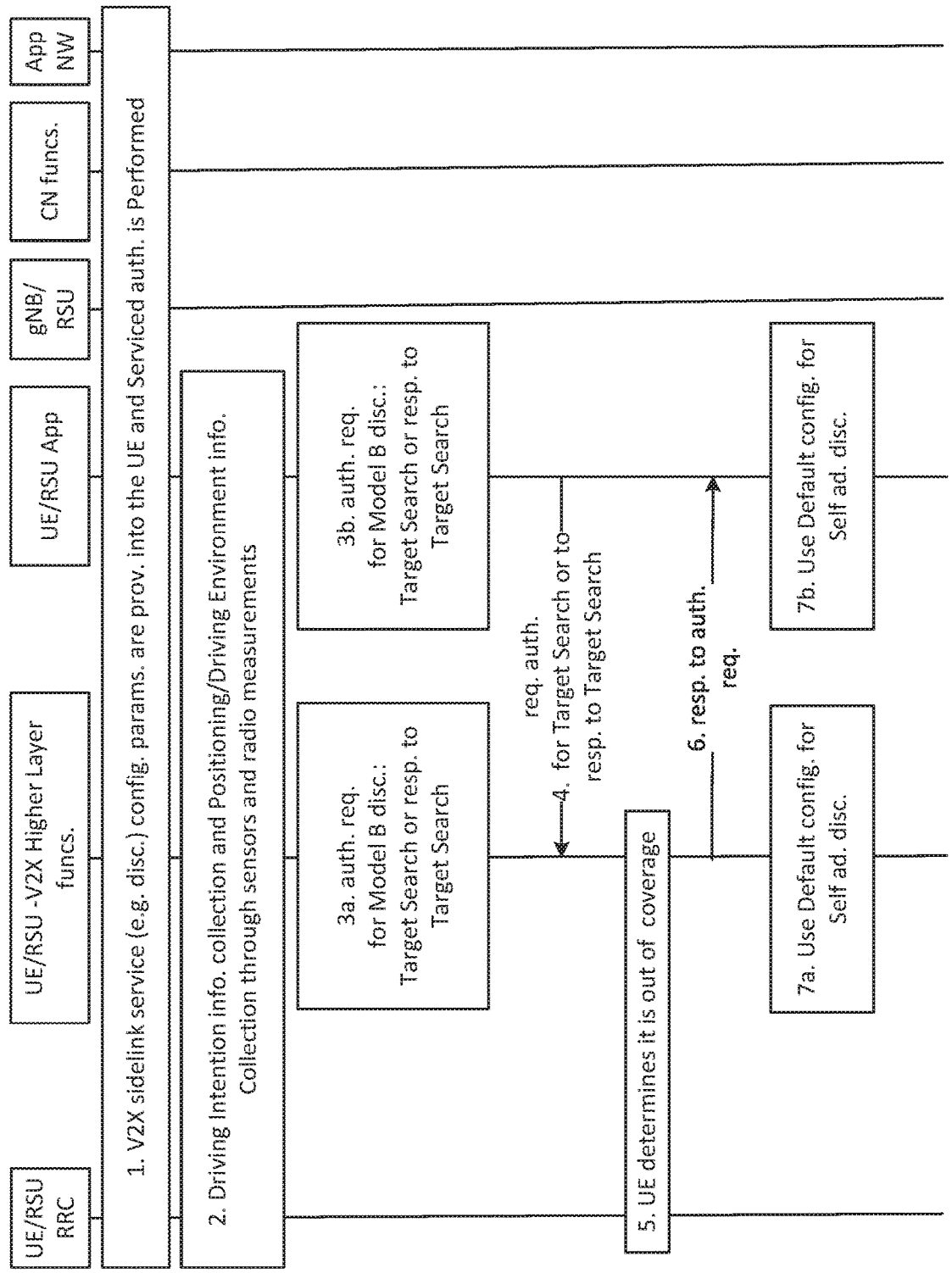
FIG. 9 shows a call flow of an example request or request for response for V2X target search discovery announcement—out of coverage.

Examples of procedures for request for authorization to perform target search discovery announcement when in coverage are captured in FIGS. 8A and 8B. An out-of-coverage is shown in FIG. 9. When request for target search discovery announcement is triggered by the upper layers, authorization and parameters for the specific instance of the target search discovery the UE is about to engage in may need to be coordinated and confirmed with the network when in coverage, otherwise fallback default policy and configuration parameter when out-of-coverage is used. FIGS. 8A-B and FIG. 9 also apply to request for authorization to respond to target search discovery announcement message.

V2X Self Advertising Discovery

Figure 10A:
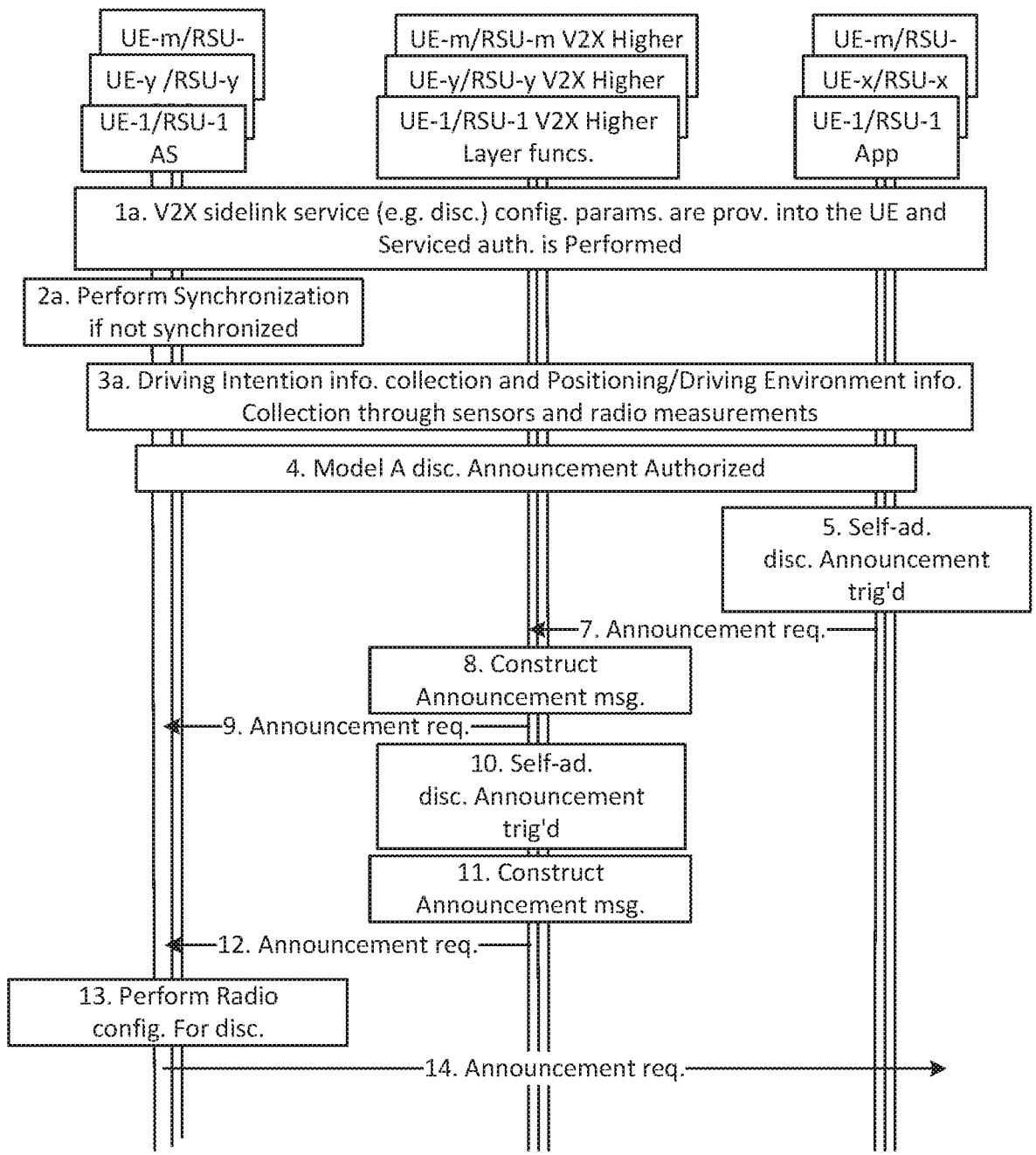
FIGS. 10A and 10 B show a call flow of an example announcement for self-advertisement discovery over sidelink.
Figure 10B:
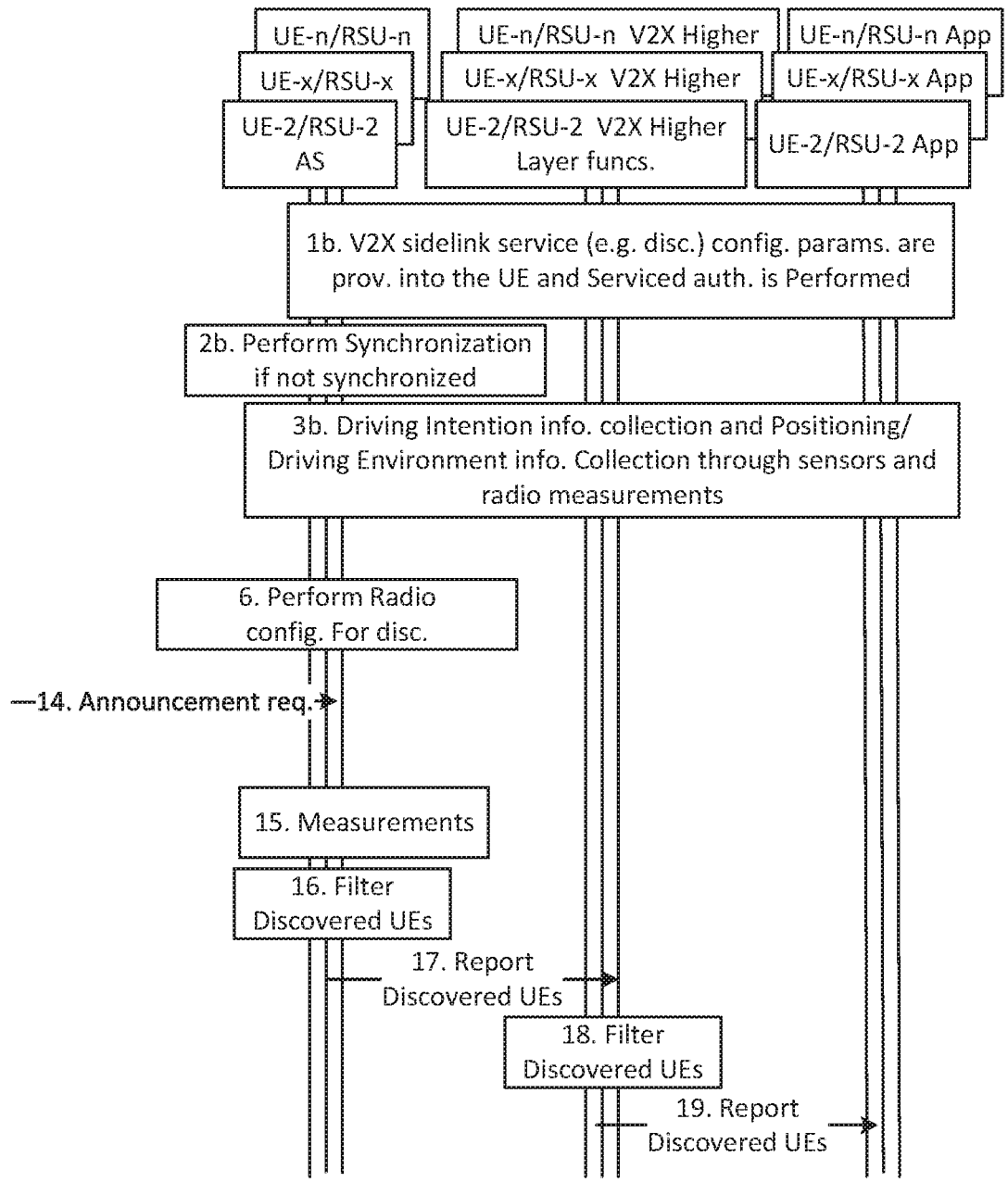

Procedure of self-advertisement discovery announcement over sidelink interface is illustrated in FIGS. 10A and 10B.

In step 1a through step 4, the involved UEs have performed all the necessary steps up to and including completion of authorization for self-advertisement discovery announcement for the discovery message transmitting UE.

In step 5, a self-advertisement discovery announcement is triggered at the application layer.

In step 6, the AS of Potential UEs in proximity are configured to monitor self-advertisement discovery message. Radio configuration for monitoring the UE is described herein in reference to FIGS. 13 and 14.

In step 10, the V2X NAS may also autonomously trigger self-advertisement discovery announcement, potentially with assistance information from the application layer.

In step 13, the AS configure the radio for the transmission of self-advertising discovery message. Radio configuration for transmission of self-advertisement discovery message is described herein in relation to FIG. 14.

In step 16 and step 18, filtering of discovered announcing UEs may be performed in the AS layer or in the V2X higher layer function (e.g., V2X NAS). Examples of parameters used for filtering are described herein in relation to FIG. 14.

V2X Target Search Discovery

Figure 11A:
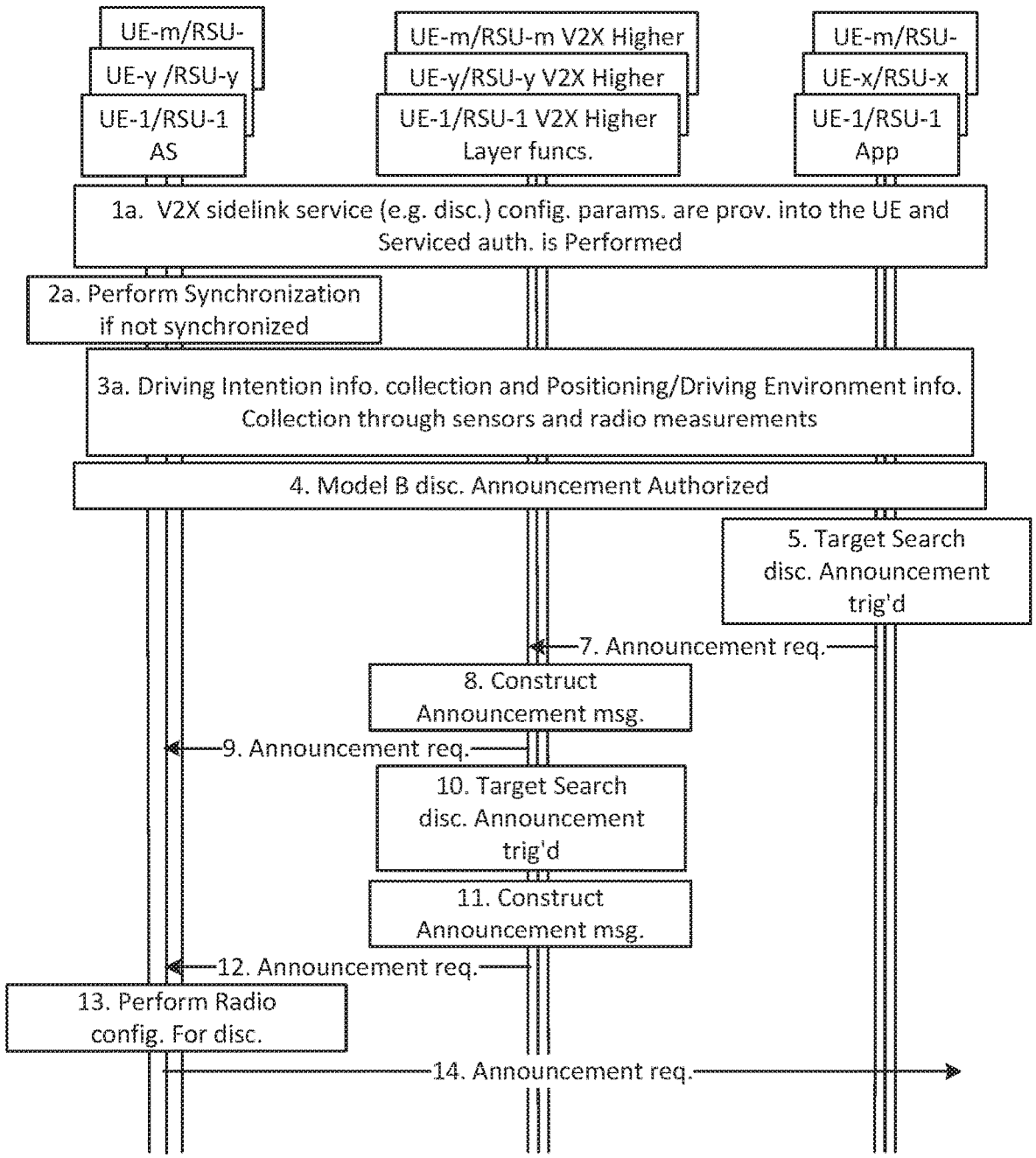
FIGS. 11A and 11 B show a call flow of an example announcement for target search discovery over sidelink.
Figure 11B:
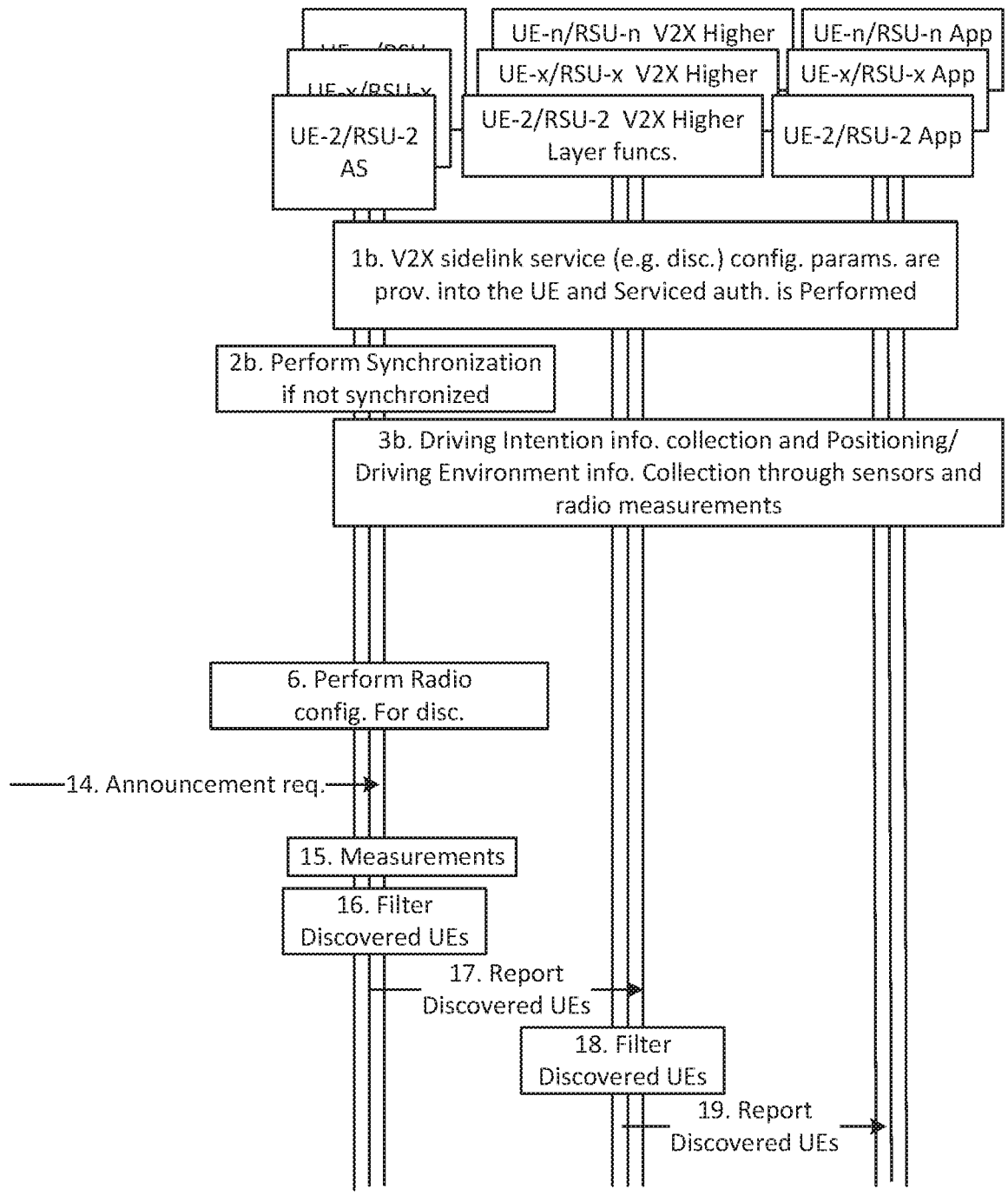

Procedure for target search discovery announcement over sidelink interface is illustrated in FIGS. 11A and 11B. The main steps are similar to that of self-advertisement discovery over sidelink. Details of transmit radio configuration and received radio configuration for target search discovery announcement are described herein in relation to FIG. 14.

Figure 12A:
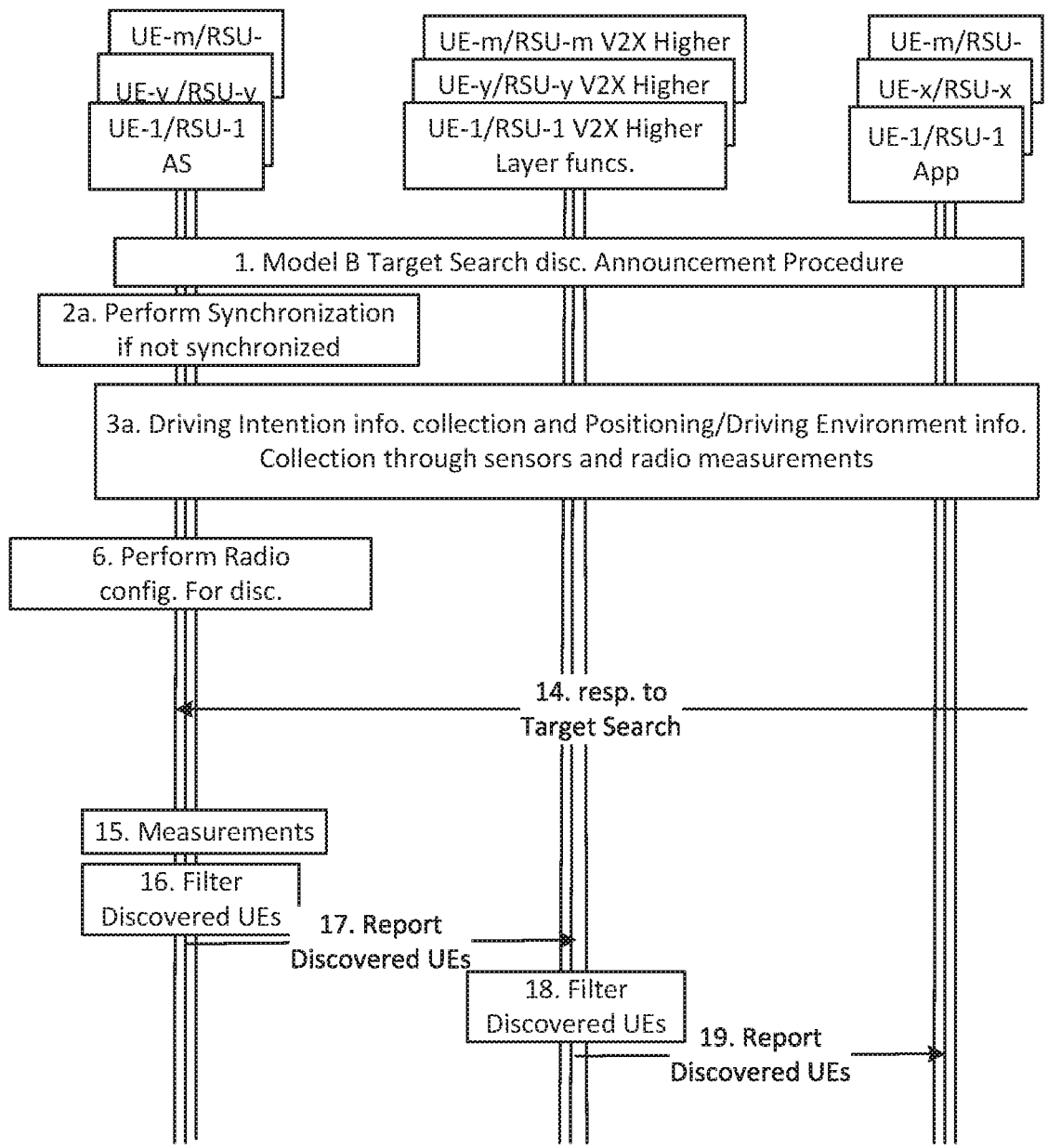
FIGS. 12A and 12 B show a call flow of an example response to target search discovery over sidelink.
Figure 12B:
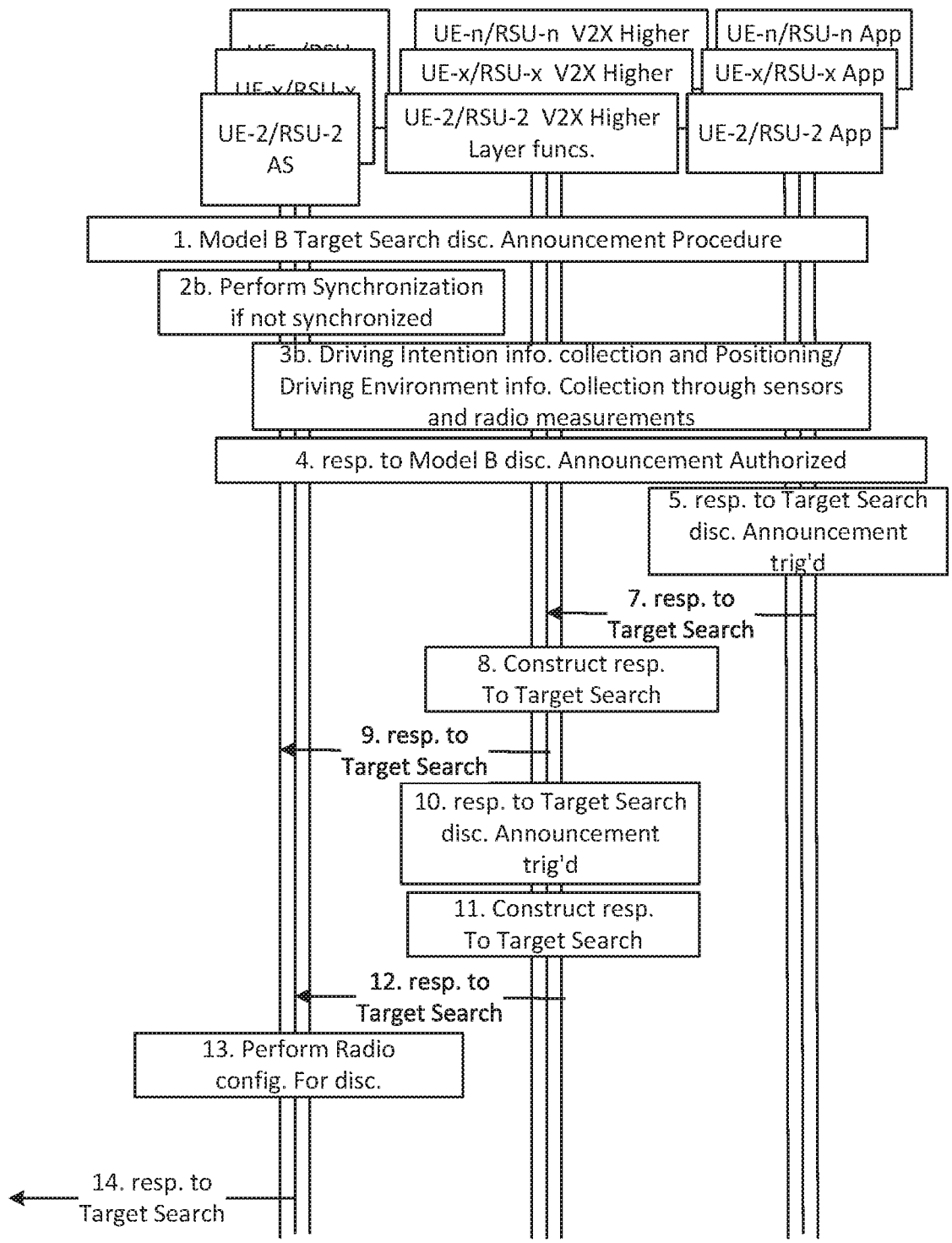

Procedure for response to target search discovery announcement over sidelink interface is illustrated in FIGS. 12A and 12B.

In step 1a through step 4, the involved UEs have performed all the necessary steps up to and including completion of authorization for response to target search self-discovery announcement by a responding UE to self-advertisement discovery message.

In step 5, a response target search discovery announcement is triggered at the application layer.

In step 6, the AS of the discoverer UE that transmits target search discovery announcement configures its receiver radio to monitor discovery response messages from discoveree UEs. Radio configuration for monitoring of response to discovery messages is described herein in reference to FIGS. 13 and 14.

In step 10, the V2X NAS may also autonomously trigger a response to target search discovery announcement, potentially with assistance information from the application layer.

In step 13, the AS of the discoveree UE configures its transmit radio for the transmission of response to target search discovery message. Radio configuration for transmission of response to target search discovery message are described herein in relation to FIG. 14.

In step 16 and step 18, filtering of discovered discoveree UEs may be performed in the AS layer or in the V2X higher layer function (e.g., V2X NAS). Examples of parameters used for filtering are described herein in relation to FIG. 14.

Solutions for Group Management and Discovery in Access Stratum

For group management and discovery in access stratum, the decision for announcement or monitoring of the V2X discovery message is controlled by the Access Stratum (AS). Furthermore, the decision for request for authorization, to announce discovery message, to monitor discovery message, or to respond to discovery message is controlled by the AS. This may be the case for V2X groups which form, and UEs joining or leaving the groups are very dynamic in nature. As an example, platoon groups may fall in this category. Solution ideas are described herein in relation to FIGS. 4-12, including decisions and triggering of discovery announcements, or response to discovery announcements, are controlled by the AS with assistance information from the upper layers above the AS.

Solutions for V2X Radio Configuration for Discovery

The radio configuration solutions for the V2X radio configuration for discovery needed in support of the sidelink self-advertising discovery procedure or target search discovery procedure are described herein in relation to FIGS. 10-12, for example.

Transmit Radio Configuration for Discovery

Figure 13:
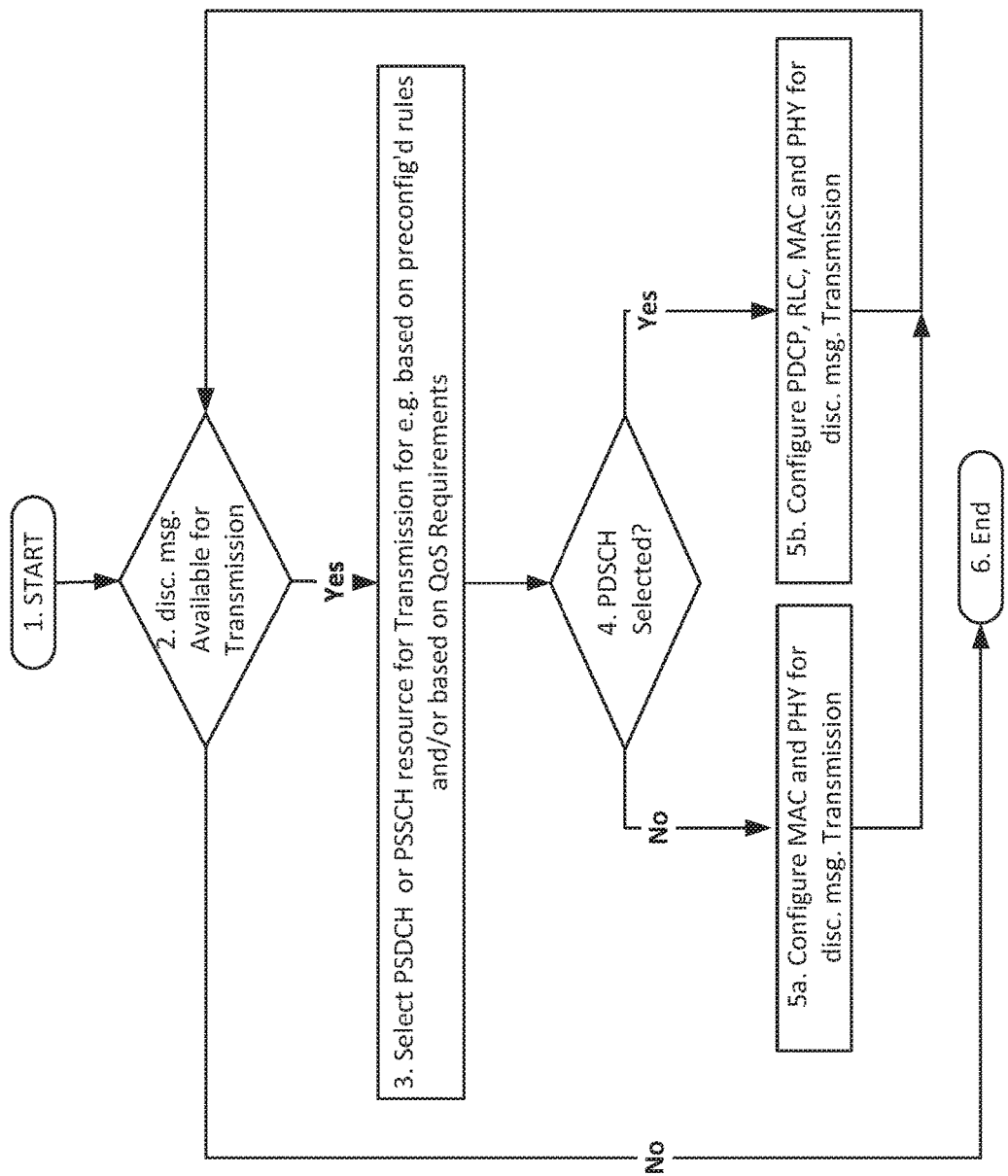
FIG. 13 is a flow diagram of an example overview of sidelink transmit radio configuration for V2X discovery message transmission.

A high-level illustration of the radio configuration steps for discovery message transmission is provided in FIG. 13.

The solutions described herein assume the following steps have been executed and the input information described below is available at the UEs involved in the self-advertisement discovery or target search discovery.

The UE is provisioned with V2X communication parameters, including policy and configuration parameters for transmission of V2X discovery messages as described herein (e.g., in relation to FIGS. 2 and 3), for discovery in-coverage and in out-of-coverage. The UE has performed discovery authorization procedures for the specific instance of discovery procedure the UE is about to engage in. For example, the discovery procedure may be an LTE Model A-like discovery procedure where the UE may be engaged in transmission of self-advertising discovery messages or engage in monitoring of self-advertising discovery messages. As described in self-advertising procedure of the example in FIGS. 10A and 10B, the UE engaged in self-advertisement discovery may be a platoon lead or an RSU, a UE advertising itself so other UEs or groups of UEs in proximity, with interest in the information it is advertising (e.g., specific V2X application, such as ride-sharing), may initiate sidelink communication toward this UE, or a UE monitoring self-advertisement from other UEs so it can discover group lead or platoon leads in its proximity or UE with specific application or service capability in its vicinity. The discovery procedure may also be an LTE Model B like discovery procedure where the UE performed target search discovery as described in relation to FIGS. 11A, 11B, 12A, and 12B. In this procedure the UE engage in a discovery may make announcement in search for a specific UE or group of UEs, or the UE engaged in the discovery procedure may be responding as a discoveree to a target search announcement from a discoverer or may by a UE or group of UEs monitoring target search announcement for.

In support of radio configuration in the Access Stratum (AS) for V2X discovery message transmission, the upper layer may provide one or more of the following types of information to the Access Stratum.

Self-Advertising Discovery Announcement

For self-advertising discovery announcements, QoS information of the session(s) or candidate session(s) to be established after discovery. The QoS information may include one or more of the following: payload (bytes); transmission rate (message/sec); maximum end-to-end latency (ms); Reliability (%); data rate (Mbps); minimum required communication range (meters); per packet priority (e.g., Prose Per Packet Priority (PPPP)); per packet reliability (e.g., Prose Per Packet Reliability (%)); or QoS Flow ID. The QoS information is used by the AS to decide the radio configuration and transmission parameters for the discovery message. For example, the UE may set transmission parameters (e.g., transmit power) of the discovery message such that the UEs out of range of the targeted communication range will not receive the discovery message, as they will not be able to provide expected QoS for the subsequent V2X communication or V2X session. One or more of these QoS parameters may also be transmitted with the discovery message. Such information may assist, for example, with filtering and admission control in the receiver.

QoS Information of the discovery message may be used by the AS to decide the radio configuration and transmission parameters for the discovery message. For example, the UE may set transmission parameters (e.g., transmit power) of the discovery message such that the UEs out of range of the targeted communication range will not receive the discovery message. This information may also be used when deciding the number of retransmissions of the discovery message (e.g., number of automatic retransmissions without ACK).

An indication of whether the discovery message should be unicast, groupcast, or broadcast may be used by the AS to decide whether to use unicast, groupcast or broadcast for the transmission of the discovery message. This indication may also be included in the discovery announcement message.

A parameter indicating a service/platform capability and Radio Capability of the announcer UE and/or target receiver UEs may be used. The AS may use this information to set transmission parameters. This information may also be transmitted along with the discovery message and may be used to assist the receiver with filtering of the monitored discovery message, or to assist the receiver in performing admission control, and determining to which self-advertisement announcement message to respond to.

Parameters indicating one or more Destination Layer-2 ID(s) associated with the group(s) to which the announcing UE belongs may be used. One or more Destination Layer-2 ID(s) associated with the group(s) to which the monitoring UE belongs. The destination Layer-2-ID may be mapped to the V2X PSID or ITS-AID by the upper layer. This information may be transmitted along with the discovery message, and may assist the receiver in filtering received discovery messages or used in the receiver UE to perform admission control. It may also be used at the receiver to decide which announcing discovery message to respond to, or with which announcing UE or group(s) of UEs to establish V2X communication.

Parameters may include a Source Layer-2 ID (e.g., the announcing UE Layer-2 ID) may be used in subsequent link establishment. This parameter may be included into the discovery announcement message and may be used by the receiver as destination layer-2 ID in the response to the discovery announcement message.

Parameters may include one or more Discovery Group ID(s) associated with the discovery group(s) to which the announcing UE belongs. One or more Discovery Group ID(s) associated with the discovery groups to which the monitoring UE belongs. This may be a 3GPP network assigned ID (e.g., a Layer-2 ID which may be mapped to the V2X PSIDs or ITS-AIDs by the upper layer). This information may be transmitted along with the discovery message and may assist the receiver in filtering received discovery messages, or in admission control. It may also be used at the receiver to decide which announcing discovery message to respond to, or with which announcing UE or group(s) of UEs to establish V2X communication with.

Parameters may include a TX Profile (e.g., RATs and RAT versions of the receiver and/or the transmitter). For example, it may be in reference to a TX profile of the transmitter UE (e.g., the TX profile to use when the UE subsequently initiates V2X communication with the Transmitter). The TX profile may be used by the AS to configure the transmit radio and set the transmission parameter for the discovery message. This information may be transmitted along with the discovery message and may assist the receiver. For example, the discoveree UE in filtering received discovery messages or in admission control. The information may also be used at the receiver to decide which announcing discovery message to respond to, or with which announcing UE or group(s) of UEs to establish V2X communication. The TX profile may also be in reference to the TX profile the monitoring UE should use when initiating subsequent V2X communication.

Parameters may include authorized PLMN(s). This may be in reference to the PLMN(s) on which the UE is allowed to transmit V2X discovery messages. This parameter may be transmitted as part of the discovery message and may be used by the receiver UE to filter monitored discovery messages, which message to respond to, and/or which target search announcer to establish subsequent V2X communication.

Parameters may include radio parameters (e.g., frequency carriers, bandwidth). This parameter may be used to configure transmit radio for V2X discovery message transmission. The parameter may be transmitted as part of V2X discovery message and may be used by the receiver UE to filter monitored discovery messages, which message to respond to, and/or with which target search announcer to establish subsequent V2X communication.

Parameters may include discovery type (e.g., periodic or event based). This parameter may be used to configure the transmit radio for V2X discovery message transmission. The parameter may be used to identify the resources for discovery message transmission. It may also be transmitted as part of the discovery message and may be used in the receiver UE for filtering discovery messages.

Parameters may include other non-application layer related filtering information (e.g., AS or NAS level filtering information) to help the AS control the transmission of the discovery message. This information may be transmitted along with the discovery message and may assist the receiver in filtering received discovery messages. It may also be used at the receiver UE i.e. the discoveree UE to decide which announcing discovery message to respond to, or with which announcing UE or group(s) of UEs to establish V2X communication.

Target Search Discovery Message Parameters

Target search discovery messages may include a variety of parameters. For example, parameters may include QoS information of the session(s) or candidate session(s) to be established after discovery. The QoS information may include one or more of the following: payload (bytes); transmission rate (message/sec); maximum end-to-end latency (ms); Reliability (%); data rate (Mbps); minimum required communication range (meters); per packet priority (e.g., Prose Per Packet Priority (PPPP)); per packet reliability (e.g., Prose Per Packet Reliability (%)); QoS Flow ID; QoS Profile ID or equivalent 5QI. The QoS information is used by the AS to decide the radio configuration and transmission parameters for the discovery message. For example, the UE may set transmission parameters (e.g., transmit power) of the discovery message such that the UEs out of range of the targeted communication range will not receive the discovery message, as they will not be able to provide expected QoS for the subsequent V2X communication or V2X session. One or more of these QoS parameters may also be transmitted with the discovery message. Such information may assist, for example, filtering and admission control in the receiver.

Parameters may include QoS Information of the discovery message. This information may be used by the AS to decide the radio configuration and transmission parameters for the discovery message. For example, the UE may set transmission parameters (e.g., transmit power) of the discovery message such that the UEs out of range of the targeted communication range will not receive the discovery message. This information may also be used when deciding on the number of retransmissions of the discovery message (e.g., number of automatic retransmissions without ACK).

Parameters may include an indication of whether to transmit the discovery message as unicast message, and/or groupcast message, and/or broadcast message. This parameter may be used by the AS to decide whether to use unicast, groupcast or broadcast, for the transmission of the discovery message. The information may also be included in the discovery announcement message.

Parameters may include service/platform capability and Radio Capability of the transmitter UE and/or target receiver UEs. The AS may use this information to set transmission parameters. This information may also be transmitted along with the discovery message and may be used to assist the receiver with filtering of the monitored discovery message. The information may be used to assist the receiver in performing admission control and determining to which target search discovery message to respond to, or in determining with which announcing UE or group(s) of UEs to establish V2X communication.

Parameters may include one or more Destination Layer-2 ID(s) associated with the group(s) to which the target search announcing UE belongs. One or more Destination Layer-2 ID(s) associated with the group(s) to which the monitoring UE belongs. The destination Layer-2-ID may be mapped to the V2X PSID or ITS-AID by the upper layer. This information may assist the receiver in filtering received discovery messages. It may also be used at the receiver to decide which target search discovery message to respond to, or with which target search discovery UE or group or UE to establish V2X communication.

Parameters may include source Layer-2 ID (e.g., the target search announcing UE Layer-2 ID). This information may be used in subsequent link establishment.

Parameters may include one or more Discovery Group ID(s) associated with the discovery group(s) to which the target search announcing UE and/or the monitoring UE belong. One or more Discovery Group ID(s) associated with the discovery group(s) to which the monitoring UE belongs. This may be a 3GPP network assigned ID (e.g., a Layer-2 ID which may be mapped to the V2X PSIDs or ITS-AIDs by the upper layer). This information may be transmitted with the discovery message. The information may be used by the receiver UE for filtering of the monitored discovery messages or for performing admission control. The information may also be used to decide which discovery message to respond to, or with which target search UE or group or UE to establish V2X communication.

Parameters may include a TX Profile (e.g., RATs and RAT versions of the receiver and/or the transmitter). For example, it may be in reference to TX profile of the transmitter UE (e.g., the TX profile to use when the UE subsequently initiate V2X communication with the Transmitter). The TX profile may be used by the AS to configure the transmit radio and set the transmission parameter for the discovery message. The TX profile may also be in reference to the TX profile the monitoring UE should use when initiating subsequent V2X communication. This information may be transmitted with the discovery message and may assist the receiver in filtering received discovery messages. The information may also be used at the receiver i.e. the discoveree UE to decide which target search discovery message to respond to, or with which target search discovery UE or group or UE to establish V2X communication.

Parameters may include authorized PLMN(s). This may be in reference to the PLMN(s) on which the UE is allowed to transmit V2X discovery message. This parameter may be transmitted as part of the discovery message and may be used by the receiver UE to filter monitored discovery messages, which message to respond to, and/or with which target search announcer to establish subsequent V2X communication.

Parameters may include radio parameters (e.g., frequency carriers, bandwidth). This parameter may be used to configure transmit radio for V2X discovery message transmission. The parameter may be transmitted as part of the V2X discovery message and may be used by the receiver UE to filter monitored discovery messages, which message to respond to, and/or with which target search announcer to establish subsequent V2X communication with.

Parameters may include a discovery type (e.g., periodic or event based). This parameter may be used to configure the transmit radio for V2X discovery message transmission. The parameter may be used to identify the resources for discovery message transmission. It may also be transmitted as part of the discovery message and may be used in the receiver UE for filtering discovery messages.

Parameters may include other non-application layer related filtering information (e.g., AS or NAS level filtering information) to help the AS control the transmission of the discovery message.

Target Search Discovery Response Messages

Target search discovery response messages may include a variety of parameters.

Parameters may include QoS information of the session(s) or candidate session(s) that can be supported by the discoveree. The QoS information may include one or more of the following: payload (bytes); transmission rate (message/sec); maximum end-to-end latency (ms); Reliability (%); data rate (Mbps); minimum required communication range (meters); per packet priority (e.g., Prose Per Packet Priority (PPPP)); per packet reliability (e.g., Prose Per Packet Reliability (%)); QoS Flow ID; QoS Profile ID, or equivalent 5QI. The QoS information (e.g., QoS Profile ID) may be transmitted with the discovery message and may be used by the AS or NAS of the target search announcer UE (Discoverer) to filter discovery response messages, and/or to decide with which discoveree to establish V2X communication. The QoS information may be used by the AS of the target search announcer UE to decide the radio configuration and transmit parameters for subsequent V2X communication messages. It may also be used by the discoveree UE to decide on the radio configuration parameters for the transmission of the target search discovery response messages. For example, the UE may set the reception range of the transmitted response discovery messages such that discovery messages from UEs out of range will not be received, as these UEs may not be able to fulfill expected QoS requirement for the subsequent V2X communication of the V2X session; This information may be included in the discovery response message, e.g., in the response to the discovery announcement message. The information and may assist the transmitter UE (discoverer UE) in filtering received discovery response messages or may be used in the transmitter UE to perform admission control. The information may also be used by the transmitter UE to decide with which responding UE (discoveree UE or group(s) of discoveree UEs) to establish V2X communication.

Parameters may include QoS Information of the response discovery message. This information may be used by the AS to decide the radio configuration and transmission parameters for the response discovery messages. For example, the UE may set the transmission range of the monitored discovery messages such that UEs out of range will not be receive the response discovery message.

Parameters may include an indication of whether to transmit the response discovery message as unicast discovery message and/or groupcast message and/or broadcast message. This parameter may be used by the AS to decide on whether to use unicast, groupcast, or broadcast for the transmission of the discovery message.

Parameters may include a service/platform capability and Radio Capability of the UE transmitting the discovery response message. This information may be used by the receiver of the discovery response message to configure the transmission of subsequent V2X communication. It may also be used by the UE transmitting the response discovery message to configure transmit radio for the transmission of the discovery response message. It may also be used for filtering the response discovery message at the transmitter UE of the target search discovery message. Specifically, this information may be included in the discovery response message (the response to the discovery announcement message) and may assist the transmitter UE (discoverer UE) in filtering received discovery response messages. The information may be used in the transmitter UE to perform admission control. It may also be used by the transmitter UE to decide with which responding UE (discoveree UE or group(s) of discoveree UEs) to establish V2X communication.

Parameters may include one or more Destination Layer-2 ID(s) associated with the group(s) to which the responding UE belongs. The destination Layer-2-ID may be mapped to the V2X PSID or ITS-AID by the upper layer. This information may be used for filtering of the monitored response discovery message. It may also be used to decide with which responding UE or group(s) of UEs to establish V2X communication. Specifically, this information may be included in the discovery response message (the response to the discovery announcement message) and may assist the transmitter UE (discoverer UE) in filtering received discovery response messages. The information may be used in the transmitter UE to perform admission control. It may also be used by the transmitter UE to decide with which responding UE (discoveree UE or group(s) of discoveree UEs) to establish V2X communication.

Parameters may include a source Layer-2 ID (e.g., the responding UE Layer-2 ID). This information may be used in subsequent link establishment. This information may be included in the discovery response message (the response to the discovery announcement message) and may assist the transmitter UE in filtering received discovery response messages or may be used in the transmitter UE (the discoverer UE) to perform admission control. The information may also be used by the transmitter UE to decide with which responding UE (discoveree UE or group(s) of discoveree UEs) to establish V2X communication. The information may be used as the destination layer-2 ID in data packets send by the discoverer UE to the discoveree UE in subsequent V2X communication.

Parameters may include one or more Discovery Group ID(s) associated with the discovery group(s) to which the responding UE belongs. This may be a 3GPP network assigned ID (e.g., a Layer-2 ID which may be mapped to the V2X PSIDs or ITS-AIDs by the upper layer). This information may be used for filtering of the monitored response discovery messages. It may also be used to decide which discovery message to respond to, or with which responding UE or group or UE to establish V2X communication. Specifically, this information may be included in the discovery response message (the response to the discovery announcement message) and may assist the transmitter UE (the discoverer UE) in filtering received discovery response messages. The information may be used in the transmitter UE to perform admission control. The information may also be used by the transmitter UE to decide with which responding UE (discoveree UE or group(s) of discoveree UEs) to establish V2X communication.

Parameters may include TX Profile (e.g., RATs and RAT versions of the receiver and/or the transmitter). For example, it may be in reference to TX profile of the responding UE (e.g., the TX profile the responding UE should use to configure its transmit radio and set the transmit parameters of the response discovery message). It might also be in reference to the TX profile of the target search announcing UE (e.g., the TX profile to use when the target search announcing UE initiate V2X communication with the responding UE). Specifically, this information may be included in the discovery response message (the response to the discovery announcement message) and may assist the transmitter UE (the discoverer UE) in filtering received discovery response messages or may be used in the transmitter UE to perform admission control. It may also be used by the transmitter UE to decide with which responding UE (discoveree UE or group(s) of discoveree UEs) to establish V2X communication.

Parameters may include authorized PLMN(s). This may be in reference to the PLMN(s) in which the responding UE is allowed V2X communication. This parameter may be used by the target search announcer UE (discoverer) to filter monitored response discovery messages, and/or to decide with which responding UE to establish subsequent V2X communication. Specifically, this information may be included in the discovery response message (the response to the discovery announcement message) and may assist the transmitter UE (the discoverer UE) in filtering received discovery response messages or may be used in the transmitter UE to perform admission control. It may also be used by the transmitter UE (the discoverer UE) to decide with which responding UE (discoveree UE or group(s) of discoveree UEs) to establish V2X communication.

Parameters may include radio parameters (e.g., frequency carriers, bandwidth). This parameter may be used by the target search announcing UE (discoverer) to filter monitored response discovery message, and/or to decide with which responding UE to establish subsequent V2X communication.

Parameters may include a discovery type (e.g., periodic or event based). This parameter may be used to identify the resources for response discovery message transmission. It may also be used for filtering response discovery messages.

Parameters may include other non-application layer related filtering information (e.g., AS or NAS level filtering) information to help the AS control the transmission of the response discovery message.

Radio Configuration Decisions

The radio configuration may address a number of factors, such as whether to transmit the discovery message on the PSDCH resource pool(s), the PSSCH, or both in case of duplication as it might be dictated by the reliability requirement of the discovery message. For example, dedicated PSDCH resource pool may be assigned to periodic transmission of V2X discovery message. Similarly, a PSSCH resource pool may be configured to support transmission of aperiodic event-based discovery message. Such pool may or may not be shared with periodic discovery messages. Similarly, such resource pool may or may not be shared by other V2X data transmission.

Other factors may include whether to transmit the discovery message as broadcast, group cast, or unicast; for example, if the UE already joined a group, a discovery message may be intended for that specific group or that group may be prioritized for discovery of a specific service or application. In such a case, it may be beneficial to transmit the discovery message in group cast or unicast manner. In such a case, the QoS requirement of the message may also require some form of feedback (e.g., ARQ feedback), which lends itself to unicast of group cast transmission.

Other factors may include whether to set up specific bearer or use pre-configured specific bearers for the transfer of the discovery message versus using per packet QoS framework where each discovery message packet carries its own QoS requirement information for example, priority information (e.g., PPPP) and reliability information (e.g., PPPPR).

Other factors may include what mode of RLC to configure, RLC TM versus RLC UM versus RLC AM.

Other factors may include PDCP configuration (e.g., security protection and compression of the discovery message).

Other factors may include MAC configuration and mapping of discovery message to logical channel for multiplexing with other discovery messages or multiplexing with V2X transmissions over the PSSCH.

Other factors may include configuration of PHY (e.g., for PHY resource grant assignment).

The UE AS for example, RRC uses the information received from the upper layer, preconfigured or specified rules and measurements performed by the UE to decide on radio configuration for the discovery message transmission. Example of measurements may include channel load measurement, channel congestion measurement; Channel Busy Ratio (CBR), Channel Occupancy Radio (CR) measurement, LBT failure statistics (e.g., LBT failure rate), RSRP measurement, and RSSI measurement. Additional measurement may also be considered for example, the RSRQ measurement and the CSI measurement in the cases when the decision involved unicast or groupcast selection for the transmission of the discovery message.

Rules for PSSCH or PSDCH Transmission of Discovery Message

Rules may be specified for the use of PSSCH or PSDCH for the transmission of discovery message. Following example, a rule may be set that a fixed size discovery messages are always mapped to PSDCH while variable size discovery messages are always mapped to PSSCH. Rules may stipulate that periodic discovery messages are always transmitted on PSDCH while event based aperiodic discovery messages are always transmitted on PSSCH, or that periodic discovery messages are always transmitted on dedicated PSDCH resource pool while event based aperiodic discovery messaged are always transmitted on dedicated PSSCH resource pool. Similarly, a rule may require that discovery messages are always transmitted on dedicated PSSCH resource pool and not multiplexed with other V2X data transmissions.

Rules may be established that specify transmission on either PSSCH or PSDCH based on whether characteristics of the discovery message are above or below certain thresholds. For example, rules may be set that a discovery message with a size above (or below) a given threshold is transmitted on PSSCH (or on PSDCH.) Similarly, rules may be set that a discovery message with an allowed latency above or below some threshold is to be transmitted on PSSCH, or on PSDCH. Rules may establish that a discovery message with an allowed reliability above or below a given threshold is transmitted on PSSCH or on PSDCH. Similarly, rules may establish that a discovery message with allowed transmission range above or below a given threshold is transmitted on PSSCH or on PSDCH.

Receive Radio Configuration for Discovery

Figure 14:
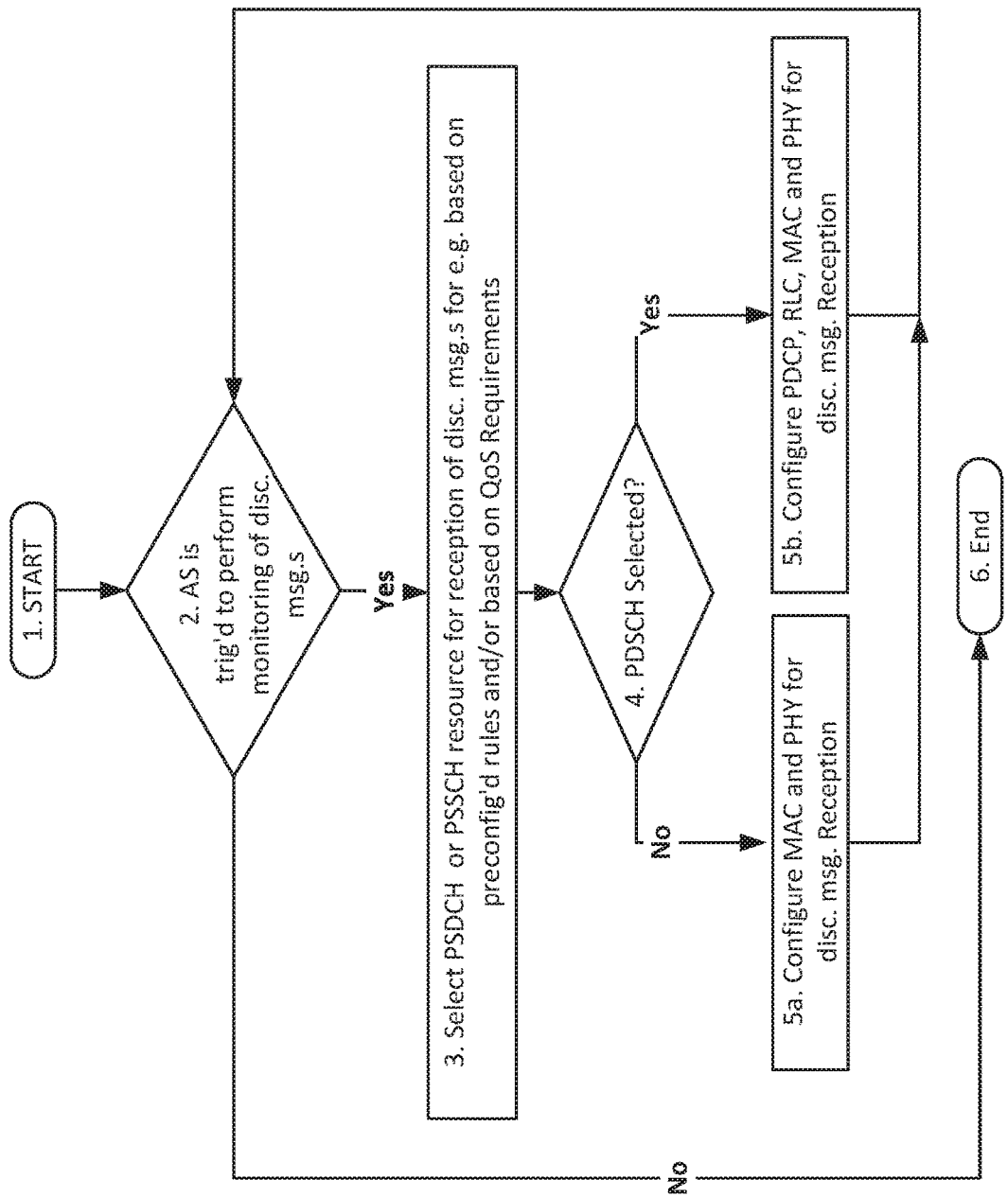
FIG. 14 is a flow diagram of an example overview of sidelink receive radio configuration for V2X discovery message reception.

A high-level illustration of the radio configuration steps for discovery message reception is provided in FIG. 14. The solutions described herein assume the following steps has been executed and the input information described below are available at the UEs involved in monitoring self-advertisement discovery announcement messages or monitoring target search discovery messages.

The UE is provisioned with V2X communication parameters including policy and configuration parameters for transmission of V2X discovery messages as described for discovery in in-coverage and in out-of-coverage (e.g., in relation to FIGS. 2 and 3). The UE has performed discovery authorization procedures for the specific instances of discovery procedure. The UE is about to engage for example, the discovery procedure, may be an LTE Model A like discovery procedure where the UE may be engaged in monitoring of self-advertising discovery messages from other UEs. As described in self-advertising procedure in relation to FIGS. 10A-B, the UE engaged in monitoring of self-advertisement discovery message may be a platoon lead or an RSU, a group member, or a UE monitoring self-advertisement from other UEs so it can discover group lead, platoon leads in its proximity, UE with specific application, or service capability in its vicinity. The discovery procedure may also be the LTE Model B like discovery procedure where the UE (discoveree) monitors target search discovery message announcements from other UEs (discoverer) or the UE (discoverer) monitors response to target search messages from other UEs (discoverees) as described in relation to FIGS. 11 and 12. In this procedure the UE engage in a discovery may by a UE or group of UEs monitoring target search announcement from other UEs.

In support of radio configuration in the Access Stratum (AS) for reception of the V2X discovery messages, the upper layer may provide information to the Access Stratum. The AS may be configured with separate set of parameters for Self-Advertising discovery message monitoring, for target search discovery message monitoring and/or for response to target search discovery message monitoring. This information may also be included in the response message transmitted by the discoveree UE to the discoverer UE.

Self-Advertising Discovery Monitoring

Self-Advertising discovery monitoring, a number of parameters may be used. For example, parameters may include QoS information of the session(s) or candidate sessions to be established after discovery. The QoS information may include one or more of the following: payload (bytes); transmission rate (message/sec); maximum end-to-end latency (ms); Reliability (%); data rate (Mbps); minimum required communication range (meters); per packet priority (e.g., Prose Per Packet Priority (PPPP)), per packet reliability (e.g., Prose Per Packet Reliability (%)); QoS Flow ID; and QoS profile ID or equivalently 5QI. The QoS information may be used by the AS or NAS to filter discovery message, to decide on admission control, and/or whether to respond to the discovery message. The QoS information, for example, the QoS profile ID, may be use by the AS to decide the radio configuration and reception parameters for the discovery message. The UE may set the reception range of the monitored discovery messages such that the discovery message from UEs out of range will not be received or listened to as it will not be able to fulfill expected QoS requirement for the subsequent V2X communication of the V2X session.

Parameters may include QoS information of the discovery messages. This information may be used by the AS to decide the radio configuration and reception parameters for the discovery messages. For example, the UE may set the reception range of the monitored discovery messages such that discovery messages from UEs out-of-range will not be received or listened to.

Parameters may include an indication of whether to monitor unicast discovery messages, groupcast message, and/or broadcast message.

Parameters may include service/platform capability, Radio Capability of the transmitter UE, and/or the receiver UE. This information may also be used by the receiver to configure reception parameters for discovery messages. It may also be used to perform admission control, filtering of monitored messages, and decide which monitored messages to respond to.

Parameters may include one or more Destination Layer-2 ID(s) associated with the groups that the announcing UE belongs to. One or more Destination Layer-2 ID(s) associated with the groups that the monitoring UE belongs to. The destination Layer-2-ID may be mapped to V2X, PSID, or ITS-AID by upper layer. This information may be used for filtering of the monitored discovery messages. It may also be used to decide in which discovery messages to respond to, discovered UE, group, or UE to establish V2X communication.

Parameters may include Source Layer-2 ID (e.g., the announcing UE Layer-2 ID). This information may be used in subsequent link establishment.

Parameters may include One or more Discovery Group ID(s) associated with the discovery groups that the announcing UE and or the monitoring UE belongs to. One or more Discovery Group ID(s) associated with the discovery groups that the monitoring UE belongs to. This may be a 3GPP network assigned ID (e.g., a Layer-2 ID), which may be mapped to the V2X, PSIDs, or ITS-AIDs by the upper layer. This information may be used for filtering of the monitored discovery messages. It may also be used to decide in which discovery messages to respond to, discovered UE, group, or UE to establish V2X communication.

Parameters may include a TX Profile for example, RAT(s) versions of the receiver and/or the transmitter. It may be in reference to TX profile of the monitoring UE (e.g., the TX profile) to use when the UE subsequently initiate V2X communication with the Transmitter. Or the TX profile may be in reference to the TX profile of the self-advertisement discovery messages.

Parameters may include authorized PLMN(s). This may be in reference to the PLMN(s) the UE receiver is allowed to monitor or in which to establish V2X communication. This parameter may be used by the receiver UE to filter monitored discovery messages, which messages to, respond to, and/or and which announcer to establish subsequent V2X communication.

Parameters may include radio parameters for example, frequency carriers, bandwidth. This parameter may be used by the receiver UE to filter monitored discovery messages, which message to respond to, and/or and which announcer to establish subsequent V2X communication.

Parameters may include discovery type, for example, periodic or event based. This parameter may be used to identify the resources for discovery message monitoring. It may also be used for filtering discovery messages.

Parameters may include other non-application layer related filtering information for example, the AS or NAS level filtering information to help AS control the transmission of the discovery messages.

For Target Search Discovery Messages:

Target search discovery messages. For example, parameters may include QoS information of the session(s) or candidate sessions to be established after discovery. The QoS information may include one or more of the following: payload (bytes); transmission rate (message/sec); maximum end-to-end latency (ms); Reliability (%); data rate (Mbps); minimum required communication range (meters); per packet priority (e.g., Prose Per Packet Priority (PPPP)); per packet reliability (e.g., Prose Per Packet Reliability (%)); QoS Flow ID; QoS Profile ID; or equivalently 5QI. The QoS information, for example QoS Profile ID may be used by the AS or NAS to filter discovery messages, to decide on admission control, and/or whether to respond to the discovery messages. The QoS information may be use by the AS to decide the radio configuration and reception parameters for the discovery messages. For example, the UE may set the reception range of the monitored discovery messages such that the discovery messages from UEs out of range will not be received or listened to as it will not be able to fulfill expected QoS requirement for the subsequent V2X communication of the V2X session.

Parameters may include QoS information of the discovery messages. This information may be used by the AS to decide the radio configuration and reception parameters for the discovery messages. For example, the UE may set the reception range of the monitored discovery messages such that the discovery messages from UEs out-of-range will not be received or listened to.

Parameters may include an indication of whether to monitor the unicast discovery messages, groupcast messages, and/or broadcast messages.

Parameters may include service/platform capability, Radio Capability of the transmitter UE, and/or the receiver UE. This information may also be used by the receiver to configure reception parameters for discovery messages. It may also be used to perform admission control, filtering of monitored messages, and decide which monitored messages to respond to.

Parameters may include one or more Destination Layer-2 ID(s) associated with the groups that the target search announcing UE belongs to. One or more Destination Layer-2 ID(s) associated with the groups that the monitoring UE belongs to. The destination Layer-2-ID may be mapped to V2X, PSID, or ITS-AID by upper layer. This information may be used for filtering of the monitored discovery messages. It may also be used to decide in which target search discovery messages to respond to or which target search announcing UE or group or UE to establish V2X communication.

Parameters may include a source Layer-2 ID (e.g., the target search announcing UE Layer-2 ID). This information may be used in subsequent link establishment.

Parameters may include one or more Discovery Group ID(s) associated with the discovery groups that the target search announcing UE and or the monitoring UE belongs to. One or more Discovery Group ID(s) associated with the discovery groups that the monitoring UE belongs to. This may be a 3GPP network assigned ID (e.g., a Layer-2 ID), which may be mapped to the V2X, PSIDs, or ITS-AIDs by the upper layer. This information may be used for filtering of the monitored discovery messages. It may also be used to decide in which discovery messages to respond to or which target search announcing UE or group or UE to establish V2X communication.

Parameters may include a TX Profile for example, RAT(s) versions of the receiver and/or the transmitter. It may be in reference to TX profile of the monitoring UE (e.g., the TX profile) to use when the UE subsequently initiate V2X communication with the Transmitter. Or the TX profile may be in reference to the TX profile of the target search announcer UE.

Parameters may include authorized PLMN(s). This may be in reference to the PLMN(s) the UE receiver is allowed to monitor or in which to establish V2X communication. This parameter may be used by the receiver UE to filter monitored discovery messages, which messages to respond to, and/or and which target search announcer to establish subsequent V2X communication.

Parameters may include radio parameters for example, the frequency carriers, bandwidth. This parameter may be used by the receiver UE to filter monitored discovery messages, which message to, respond to and/or and which target search announcer to establish subsequent V2X communication.

Parameters may include discovery type for example, periodic or event based. This parameter may be used to identify the resources for discovery message monitoring. It may also be used for filtering discovery messages.

Parameters may include other non-application layer related filtering information for example, the AS or NAS level filtering information to help AS control the transmission of the discovery messages.

Receiver Radio Configuration Considerations

The receiver radio configuration may address many factors. For example, aspects addressed in the configuration may include whether to only receive the discovery messages on the PSDCH resource pool(s), the PSSCH or both in case of duplication as it might be dictated by the reliability requirement of the discovery message. For example, dedicated PSDCH resource pool may be assigned to reception of periodic transmission of V2X discovery messages. Similarly, the PSSCH resource pool may be configured to support reception of aperiodic event-based discovery messages. Such pool may or may not be shared with periodic discovery messages. Similarly, such resource pool may or may not be shared for the reception of other V2X data.

Aspects determined may further include whether to receive broadcast discovery messages, groupcast discovery messages, and/or unicast discovery messages. For example, if the UE already join a group, a discovery message may be intended for that specific group or that group may be prioritized for reception of discovery of a specific service or application. In such a case, it may be beneficial to receive the discovery messages in group cast or unicast manner and monitor other broadcasted discovery messages. In such a case, the QoS requirement of the message may also require some form of feedback (e.g., ARQ feedback), which lends itself to unicast of group cast transmission.

Aspects determined may include whether to set up specific bearer or use pre-configured specific bearers for the reception of the discovery messages versus receiving discovery messages based on per packet QoS framework where each discovery message packet carries its own QoS requirement information for example, priority information (e.g., PPPP) and reliability information (e.g., PPPPR).

Aspects determined may include what mode of RLC to configure; RLC TM versus RLC UM versus RLC AM.

Aspects determined may include PDCP configuration for example, security protection and compression of the discovery messages.

Aspects determined may include MAC configuration for received discovery de-multiplexing.

Aspects determined may include configuration of PHY for discovery messages reception.

For the UE AS for example, the RRC uses the information received from the upper layer, preconfigured, or specified rules and measurements performed by the UE to decide on radio configuration for the discovery messages reception. Examples of measurements may include channel load measurement, channel congestion measurement (e.g., Channel Busy Ratio (CBR)), Channel Occupancy Radio (CR) measurement, LBT failure statistics (e.g., LBT failure rate), RSRP measurement, and RSSI measurement. Additional measurement may also be considered for example, the RSRQ measurement and CSI measurement in cases when the decision involved unicast or groupcast selection for the transmission of the discovery messages.

Optional Rules for the Use of PSSCH or PSDCH for the Reception of Discovery Message One or more rules may be specified for the use of PSSCH or PSDCH for the reception of discovery message. For example, a rule may stipulate that fixed size discovery messages are always mapped to PSDCH while variable size discovery messages are always mapped to PSSCH. Similarly, a rule may require that periodic discovery messages are always transmitted on PSDCH while event based aperiodic discovery messages are always transmitted on PSSCH, or that periodic discovery messages are always transmitted on dedicated PSDCH resource pool while event based aperiodic discovery messages are always transmitted on dedicated PSSCH resource pool, or yet that discovery messages are always received on dedicated PSSCH resource pool and not multiplexed with other V2X data transmissions;

Rules may be set, for example, that discovery messages with a size above (or below) a given threshold are always monitored on the PSSCH, or on the PSDCH, or yet on the PSDCH. Similar rules may be devised where the latency, reliability, or reception range are compared to a threshold.

MAC Sublayer Configuration for Discovery

MAC Architecture

For V2X, we propose the discovery messages may be transmitted via the PSDCH, PSSCH, or PSMCH. Which physical channel to use for the transmission of the discovery messages may be predetermined for example, per the standards, semi-statically configured via high layers, based on preconfigured rules, based on rules that were obtained from the PCF/V2XCF via NAS messaging, based on rules that were obtained from the V2XCF via an IP based protocol such as ANDSF, QoS requirements, and measurements.

Figure 15:
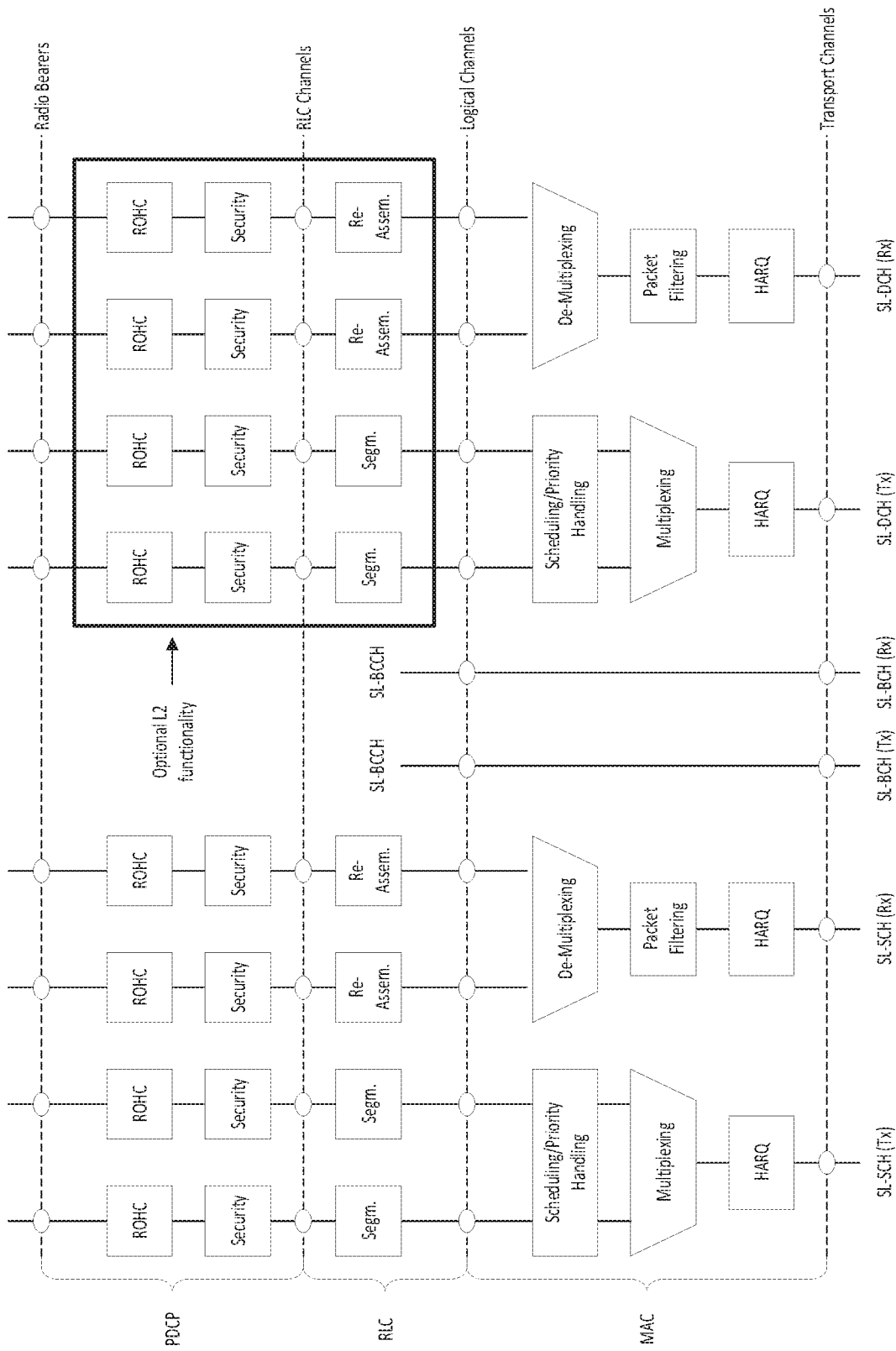
FIG. 15 illustrates an example MAC Structure Overview for Sidelink (SDCCH Mapped to SL-DCH).
Figure 16:
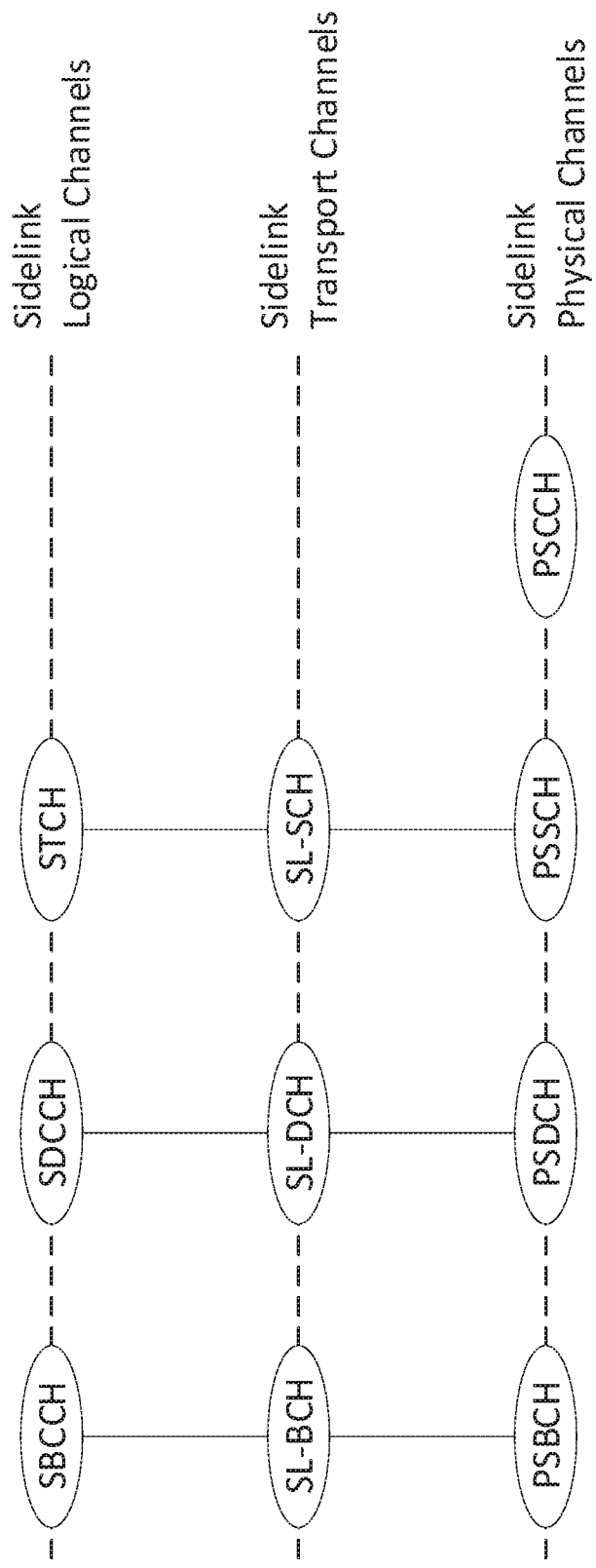
FIG. 16 illustrates an example Sidelink Channel Mapping (SL-DCH Mapped to PSDCH).

In one example, the discovery messages is mapped to the SL-DCH, which is then mapped to the PSDCH. The discovery messages may first be mapped to a separate logical channel (e.g., Sidelink Discovery Control Channel (SDCCH)). The MAC structure may support (de-)multiplexing of multiple discovery messages, in which case LCP and (de-) multiplexing functions are included in the SL-DCH processing path. In this embodiment, the discovery messages mapped to SDCCH are not multiplexed together with V2X messages mapped to the Sidelink Traffic Channel (STCH). Filtering of received SL-DCH PDUs may also be performed by the receiving the UE. For example, filtering may be based on source address, destination address, service/platform capabilities, and QoS. HARQ processing may also be performed for retransmission of the SL-DCH PDUs. A possible MAC structure and channel mapping for this example is shown in FIG. 15 and FIG. 16 respectively.

Figure 17:
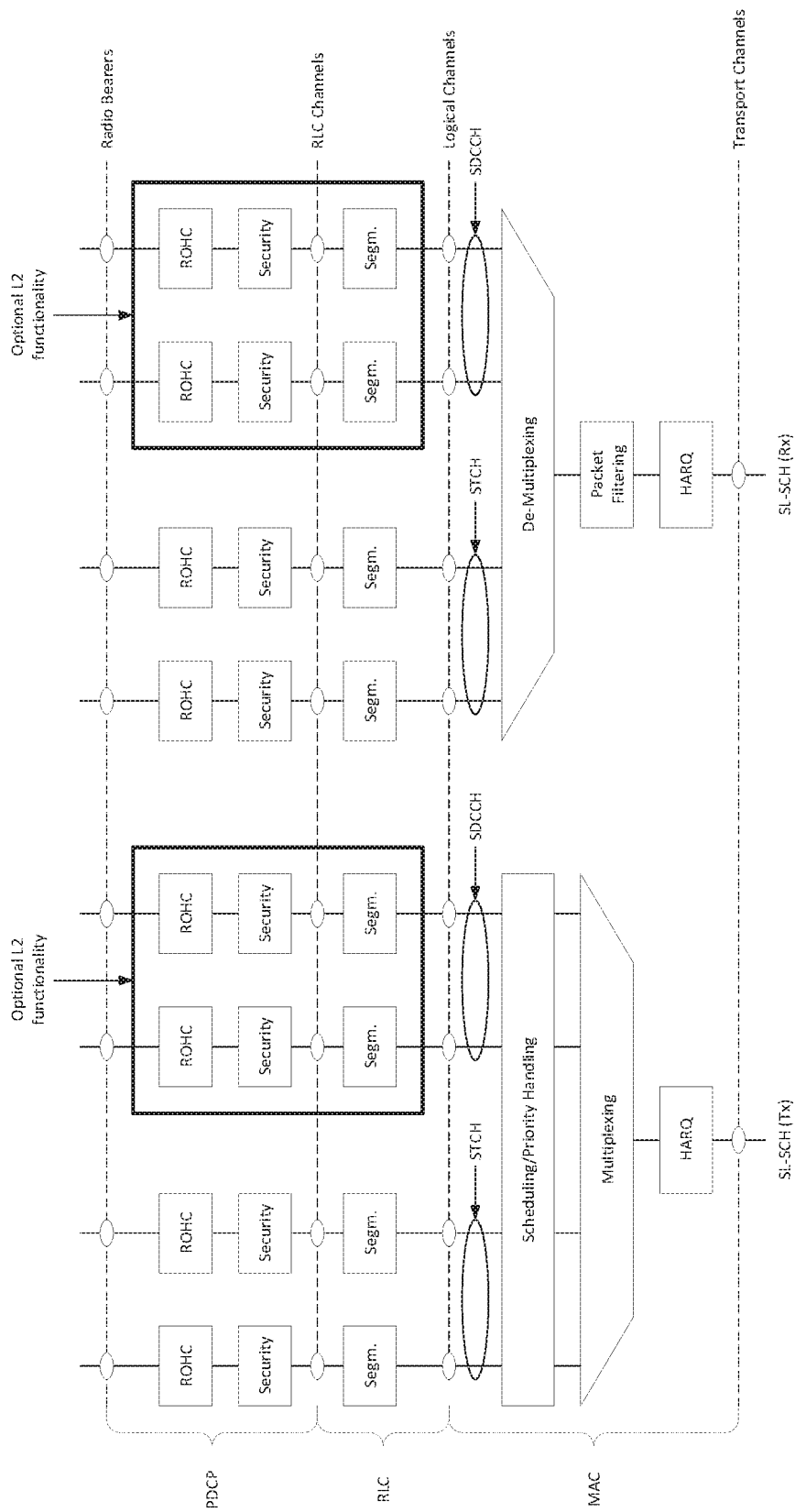
FIG. 17 illustrates an example MAC Structure Overview for Sidelink (SDCCH Mapped to SL-SCH).
Figure 18:
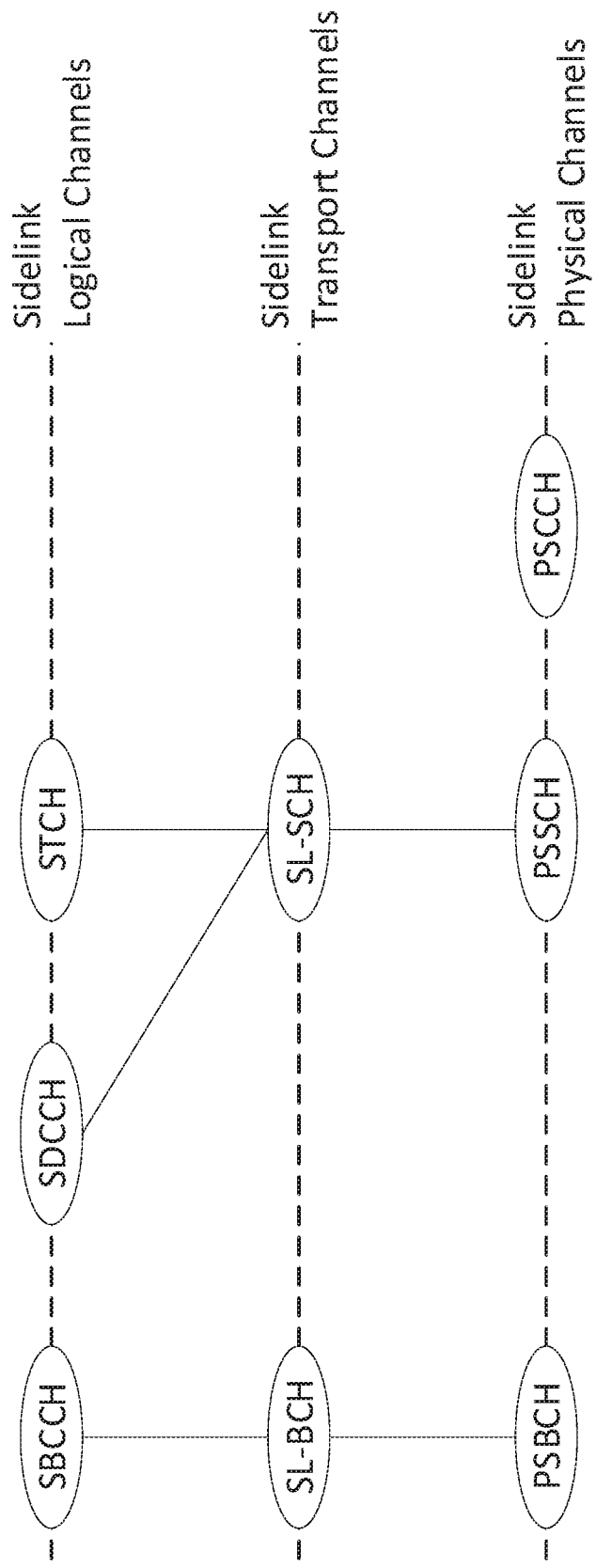
FIG. 18 illustrates an example Sidelink Channel Mapping (SL-SCH Mapped to PSSCH).
Figure 19:
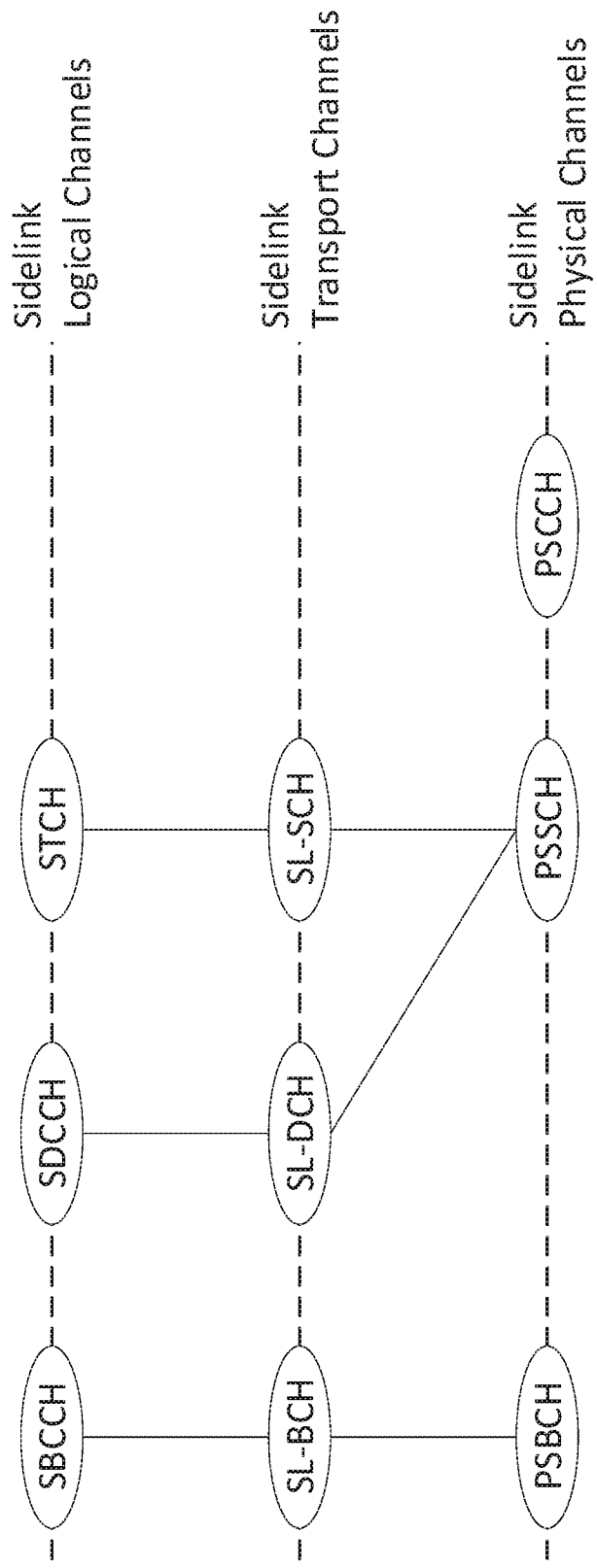
FIG. 19 illustrates an example Sidelink Channel Mapping (SL-DCH Mapped to PSSCH).

In another example, the discovery messages is mapped to the SL-SCH, which is then mapped to PSSCH. The discovery messages may first be mapped to a separate logical channel (e.g., SDCCH). The SDCCH messages may then be multiplexed with other V2X messages carried via the Sidelink Traffic Channel (STCH). Alternatively, the MAC structure may be defined such that a SL-SCH PDU is comprised of only one or more SDCCH logical channels or only one or more STCH logical channels. LCP and (de-)multiplexing functions are included in the SL-SCH processing path. For example, filtering of received SL-SCH PDUs may also be performed by the receiving UE. Filtering may be based on source address, destination address, service/platform capabilities, and QoS. HARQ processing may also be performed for retransmission of the SL-SCH PDUs. A possible MAC structure and channel mapping for this example is shown in FIG. 17 and FIG. 18 respectively.

In another example, the discovery messages is mapped to the SL-DCH, which is then mapped to PSSCH. For some scenarios, for example, where the UE is only capable of transmitting one transport block on the sidelink at a time, the MAC decides for which transport channel (e.g., SL-DCH or SL-SCH), a transport block is generated. How the MAC makes this decision may be rule based (e.g., traffic on the SL-DCH is prioritized over the SL-SCH). Alternatively, the decision may be more dynamic (e.g., based on the relative priority of the SDCCH and STCH traffic).

In another set of examples, transparent MAC may be used for the SL-DCH, where the SL-DCH may be mapped to PSDCH or the PSSCH.

Figure 20:
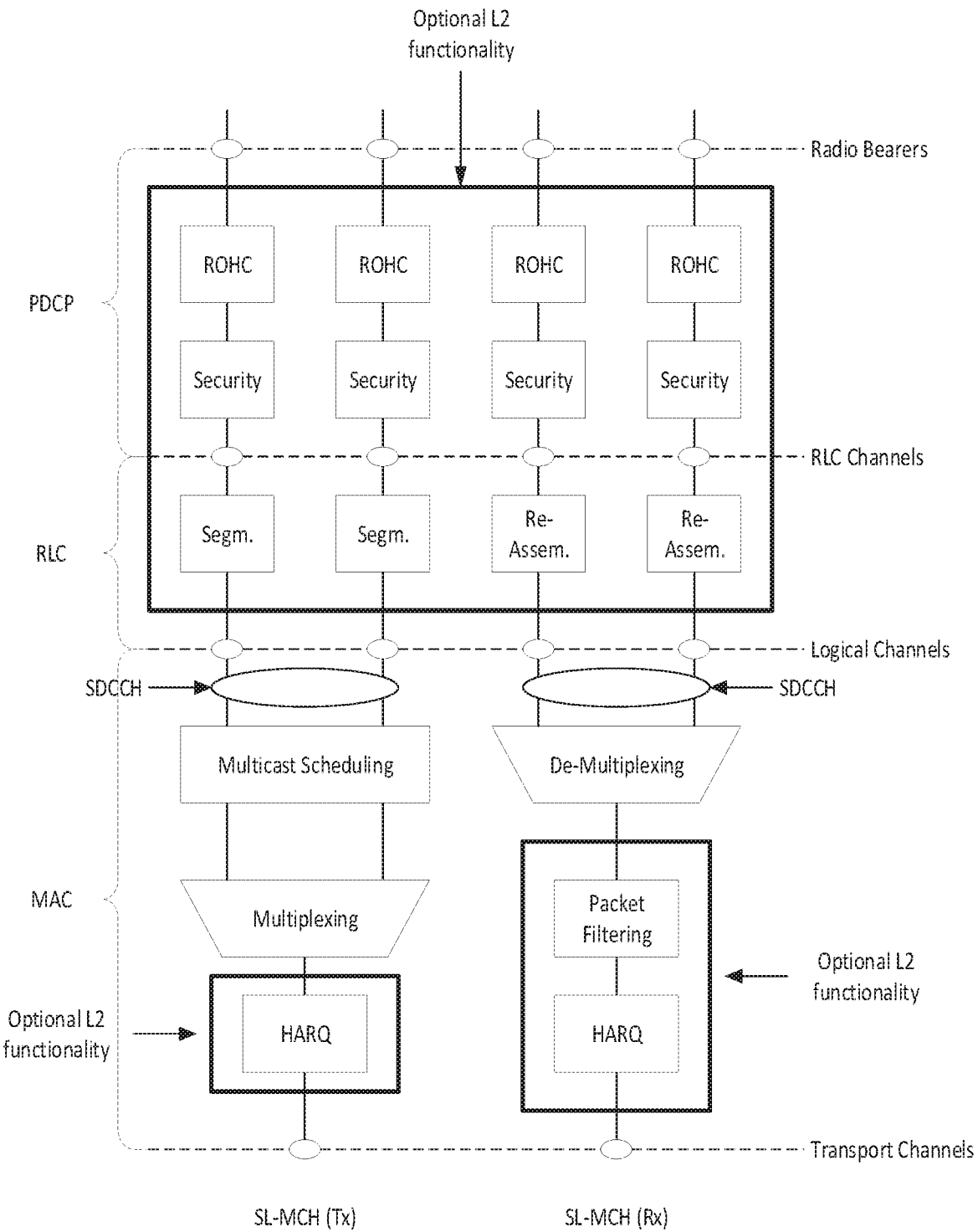
FIG. 20 illustrates an example MAC Structure Overview for Sidelink (SDCCH Mapped to SL-MCH).
Figure 21:
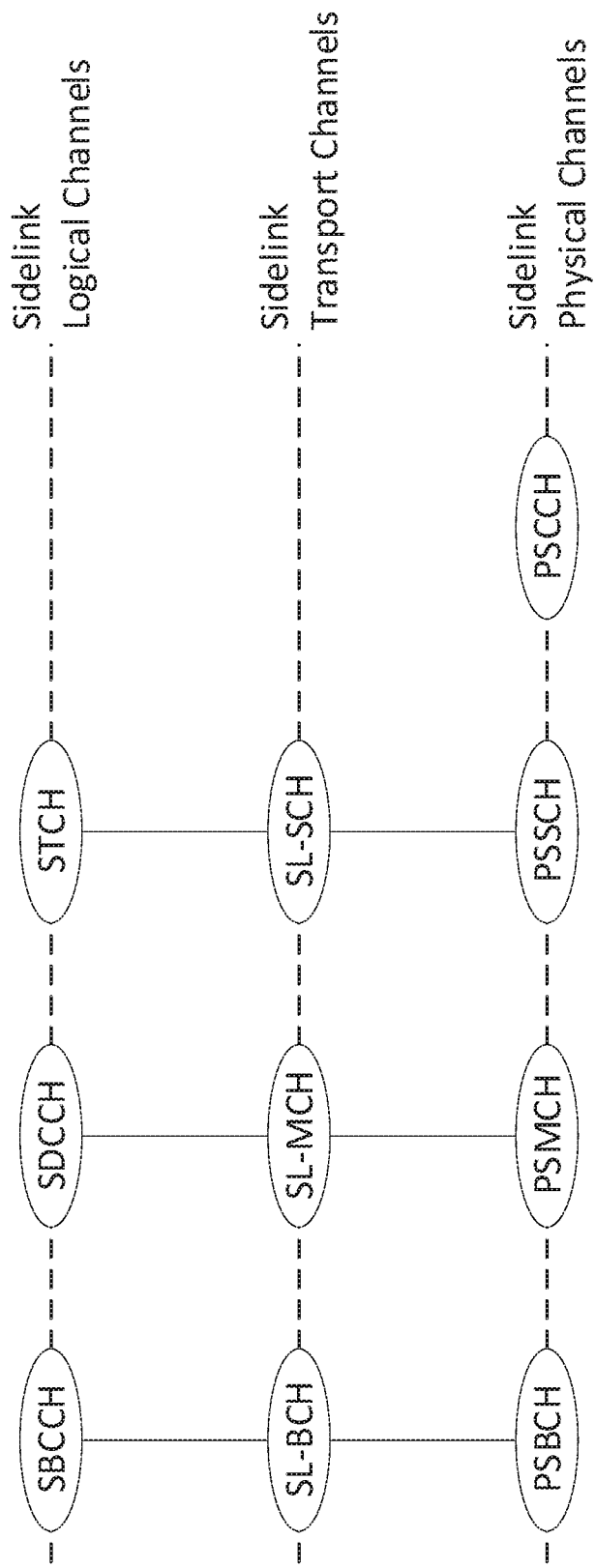
FIG. 21 illustrates an example MAC Structure Overview for Sidelink (SL-MCH Mapped to PSMCH).

In another example, the discovery messages is mapped to the SL-MCH, which is then mapped to the PSMCH. A possible MAC structure and channel mapping for this example is shown in FIG. 20 and FIG. 21 respectively.
Protocol Data Units
MAC PDU (SL-DCH)

For embodiments where a discovery messages is transmitted via the SL-DCH, a MAC PDU may be comprised of a MAC header, one or more MAC Service Data Units (MAC SDU), and optionally padding. Both the MAC header and the MAC SDUs may be of variable sizes.

For example, a MAC PDU header may consist of one SL-DCH subheader and one or more MAC PDU subheaders; where each subheader except SL-DCH subheader corresponds to either a MAC SDU or padding.

Figure 22:
FIG. 22 illustrates an example SL-DCH MAC Subheader with Different DST Field Lengths.

The SL-DCH subheader may include SRC and DST fields. A version field may also be included if support for different SL-DCH subheader formats is required. For example, different formats made be defined for versions with different DST field lengths. FIG. 22 is an illustration of example of SL-DCH subheaders that may be used for SL-DCH formats with different DST field lengths.

Figure 23:
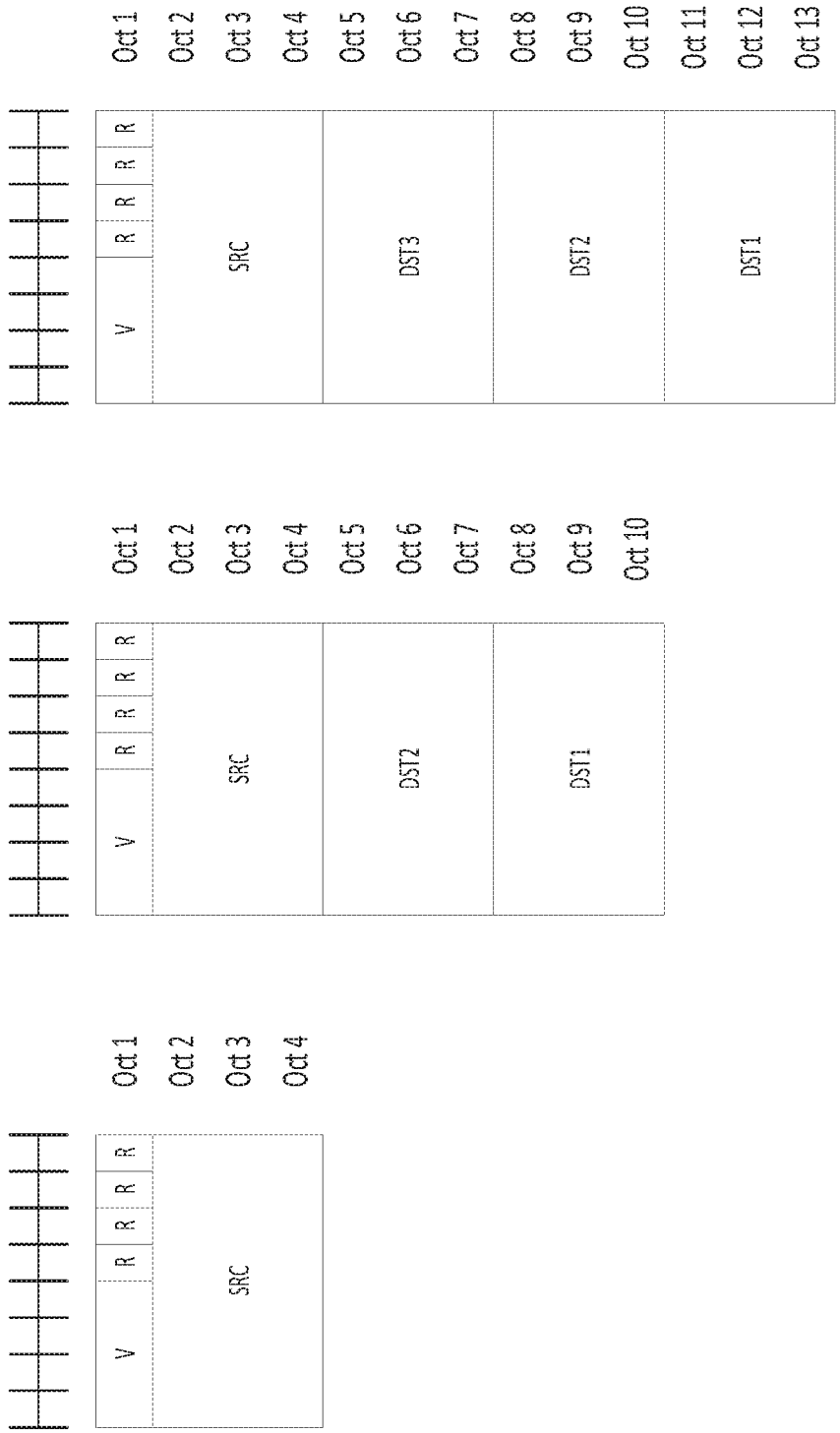
FIG. 23 illustrates an example SL-DCH MAC Subheader with Different Number of DST Fields.

In another example, different formats made be defined for versions with a different number of DST fields in the SL-DCH subheader. Such formats may be used for scenarios where SDUs with different DST fields are multiplexed in the PDU. Alternatively, the DST field associated with each MAC SDU may be included in the MAC PDU subheaders, in which case the SL-DCH MAC subheader may only include a SRC field. FIG. 23 is an illustration of example of SL-DCH subheaders that may be used for SL-DCH formats with a different number of DST fields.

The MAC PDU subheader may include fields with SDU specific info (e.g., LCID, length, QoS, and platform/radio capabilities. An Extension field to indicate if more fields are present in the MAC header or not may also be included.

Figure 24:
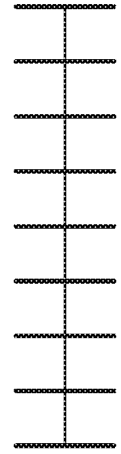
FIG. 24 illustrates an example of R/R/E/LCID/F/L MAC Subheaders.

FIG. 24 is an illustration of example of MAC PDU subheaders that may be used to indicate LCID, length, and the presence/absence of additional MAC subheaders.

Figure 25:
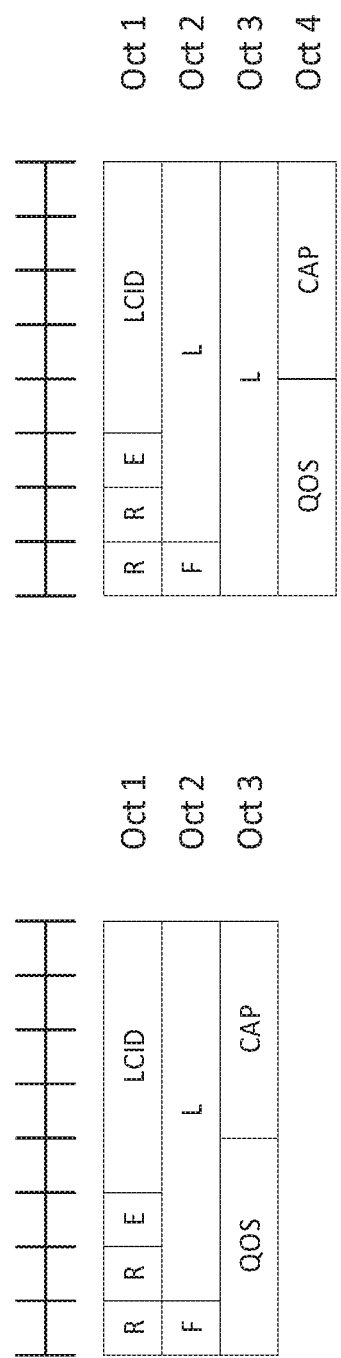
FIG. 25 illustrates an example of R/R/E/LCID/F/L/QOS/CAP MAC Subheaders.

FIG. 25 is an illustration of example MAC PDU subheaders that also indicate QoS and capability information.

Figure 26:
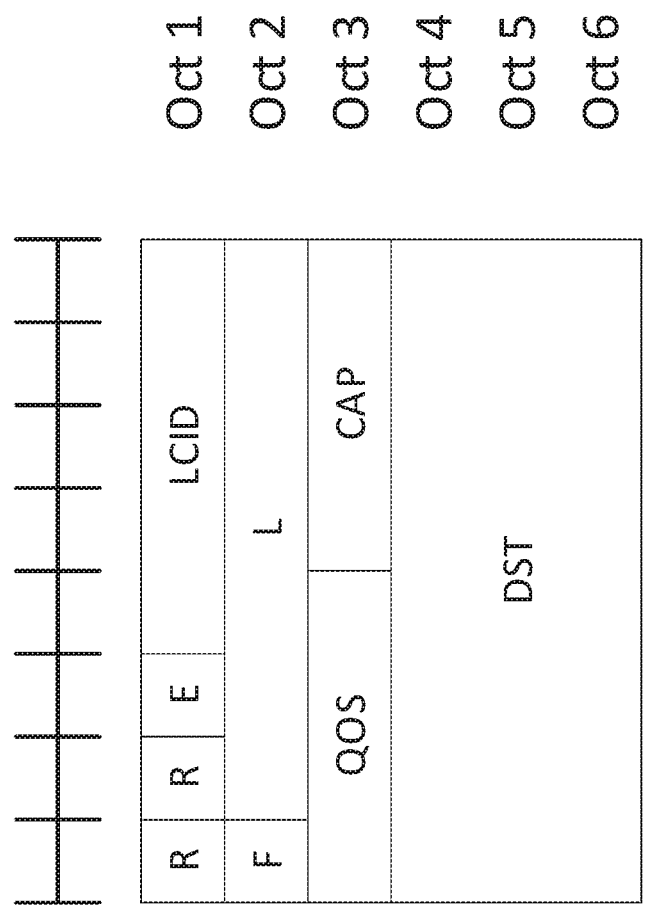
FIG. 26 illustrates an example of R/R/E/LCID/F/L/QOS/CAP/DST MAC Subheaders.

FIG. 26 is an illustration of example MAC PDU subheaders that also indicates the DST address.

The last subheader in the MAC PDU subheader may exclude the length and format fields, since the length of the last SDU can be determined from the other info that is provided. The last MAC PDU subheader may correspond to a padding, if padding is necessary.

The MAC PDU may be structured such that the MAC subheaders are grouped together at the beginning of the MAC PDU. In one example, the MAC PDU subheaders have the same order as the corresponding MAC SDUs and padding.

Figure 27:
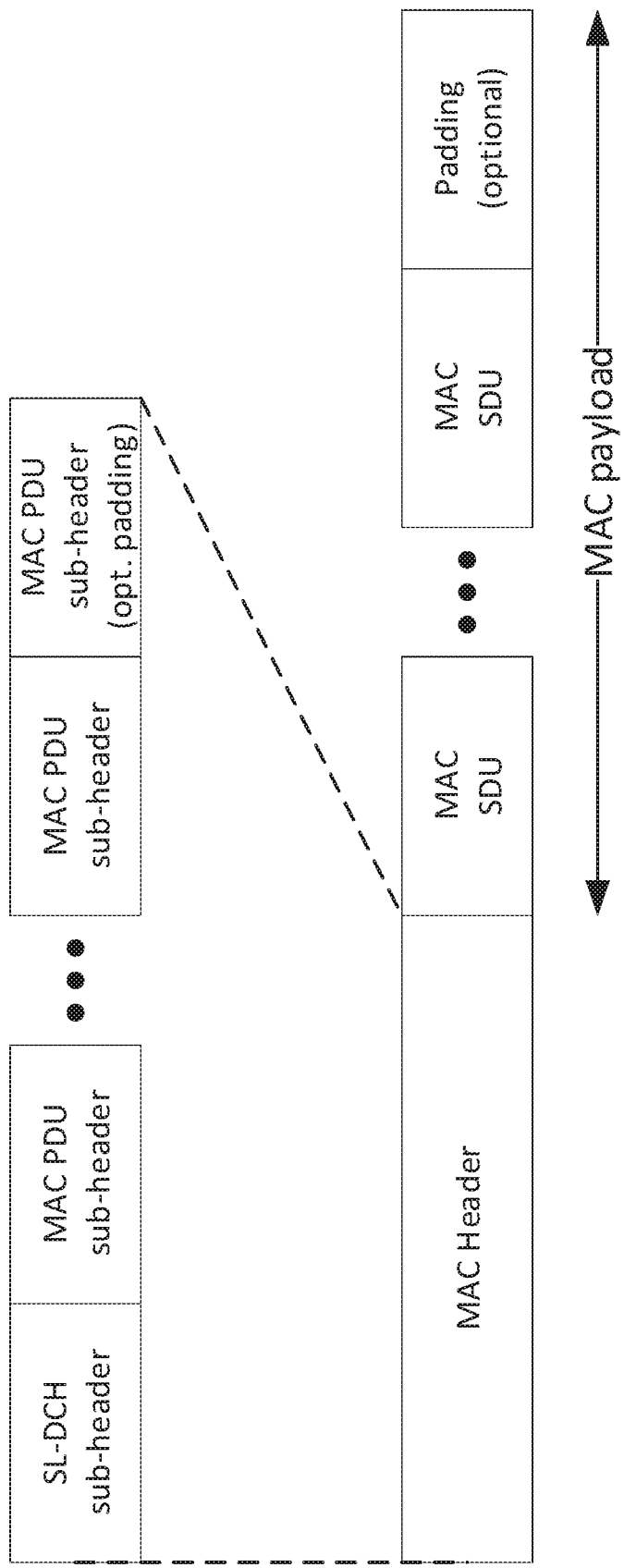
FIG. 27 illustrates an example MAC PDU Consisting of MAC Header, MAC SDUs and Optional Padding (Option 1).

Padding may occur at the end of the MAC PDU and may have any value that is ignored by the MAC entity. When padding is performed at the end of the MAC PDU, zero or more padding bytes may be allowed. Alternatively, when single-byte or two-byte padding is required, one or two MAC PDU subheaders corresponding to padding may be placed after the SL-DCH subheader and before any other MAC PDU subheader. An example of the MAC PDU is shown in FIG. 27.

Figure 28:
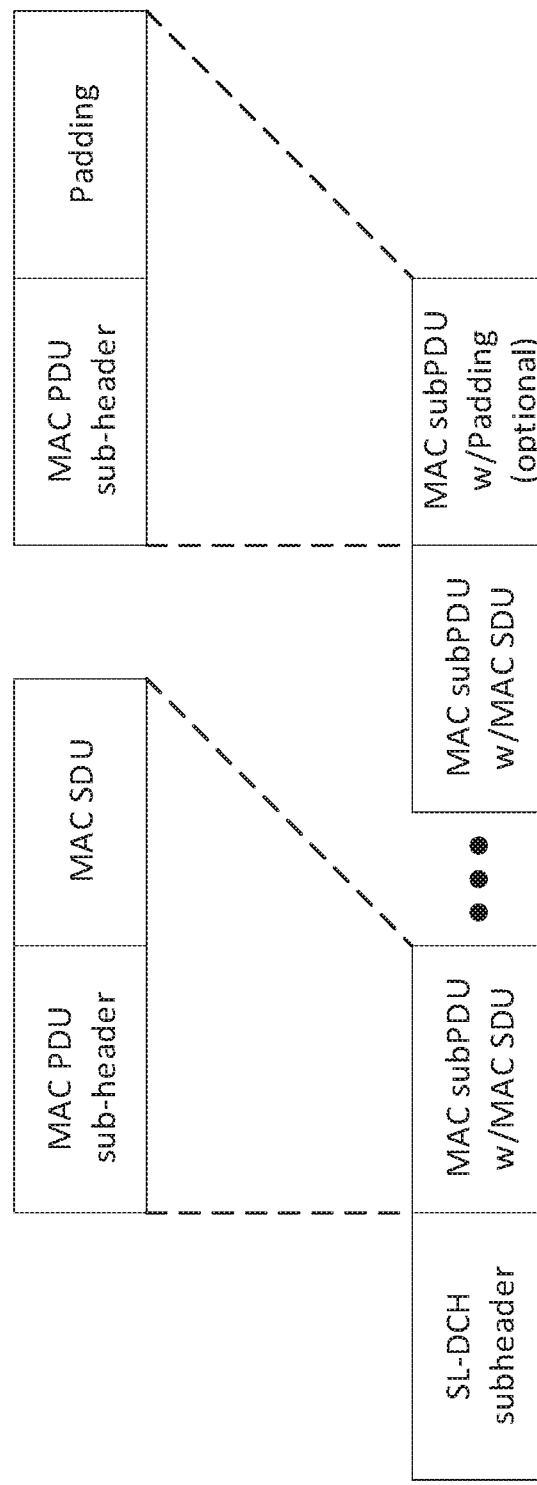
FIG. 28 illustrates another example MAC PDU Consisting of MAC Header, MAC SDUs and Optional Padding (Option 2.)

In another alternative, the MAC sub-headers may be placed immediately in front of the corresponding the MAC SDUs and padding as shown in FIG. 28.

For embodiments where the MAC CEs are included in the SL MAC PDU, the MAC CEs may be grouped together and placed before the MAC SDUs or after the MAC SDUs. The MAC subheaders that correspond to the MAC CEs may be included in the MAC header, as described in FIG. 27 or immediately in front of the corresponding MAC CE as described in FIG. 28.
MAC PDU (SL-SCH)

The solutions described in this disclosure for the SL-DCH MAC PDU may also apply for the SL-SCH MAC PDU.
Formats and Parameters
MAC Header (SL-DCH)

The MAC header may be of fixed or variable sizes and may consist of some or all of following fields. The receiving UE may use one or more of the following fields, or their equivalents, in the MAC header for filtering to perform PDU: V, SRC, DST, LCID, L, F, E, QoS, CAP, and R. These fields are described below.

V: The format version number field indicates which version of the SL-DCH subheader is used. Different versions may be comprised of different fields, different field lengths. The V field size may be a fixed size (e.g., 4 bits). For embodiments where only one format is supported, the format version number field may be excluded.

SRC: The Source Layer-2 ID field carries the identity of the source. This may correspond to the Discovery Group ID. The SRC field may be a fixed sizes (e.g., 24 bits). For scenarios where the UE belongs to multiple discovery groups, multiple SRC fields may be included in the MAC header. An additional field may be used to indicate the number SRC fields in the MAC header. Alternatively, different versions may be defined for formats comprised of a different number of SRC fields.

DST: The DST field may be of different fixed sizes (e.g., 16 bits or 24 bits). If it is 16 bits, it carries the 16 most significant bits of the Destination Layer-2 ID. If it is 24 bits, it is set to the Destination Layer-2 ID. The Destination Layer-2 ID may be set to a value provided by higher layers which may correspond to the Discovery Group ID, ProSe Layer-2 Group ID, and Prose UE ID.

LCID: The Logical Channel ID field uniquely identifies the logical channel instance within the scope of one Source Layer-2 ID and Destination Layer-2 ID pair of the corresponding MAC SDU or padding as described in Table 2 of the Appendix. There is one LCID field for each MAC SDU or padding included in the MAC PDU. In addition to that, one or two additional LCID fields are included in the MAC PDU, when single-byte or two-byte padding is required but cannot be achieved by padding at the end of the MAC PDU. The LCID field may be a fixed size (e.g., 5 bits).

L: The Length field indicates the length of the corresponding MAC SDU in bytes. There is one L field per MAC PDU subheader except for the last subheader. The size of the L field may be indicated by the F field or of a fixed size (e.g., 5 bits). For embodiments where the MAC SDUs are a fixed size, the Length field may be excluded.

F: The Format field indicates the size of the Length field. Exemplary lengths are indicated in Table 3 of the Appendix. There is one F field per MAC PDU subheader except for the last subheader. The F field may be a fixed size (e.g., 1 bit).

If the size of the MAC SDU is less than a specific size (e.g., 128 bytes), the value of the F field is set to zero, otherwise it is set to one. For embodiments where the Length field is excluded from the message or is of a fixed size, the Format field may be excluded.

E: The Extension field is a flag indicating if more fields are present in the MAC header or not. The E field is set to "one" to indicate another set of fields are present. The E field is set to "zero" to indicate that either a MAC SDU or padding starts at the next byte. For embodiments where the MAC PDU is comprised of a single MAC SDU, the Extension field may be excluded.

QoS: The QoS field may be used to indicate the QoS of the session(s) or candidate session(s) to be established after discovery. The QoS field may be a fixed size (e.g., 4 bits). The set(s) of QoS's mat be standardized or provided by higher layers in a preconfigured list. In one embodiment, the QoS field corresponds to an index that may be used to determine the QoS information of the session(s) or candidate session(s) to be established after discovery as described herein.

CAP: The Capability field may be used to indicate the service/platform capabilities and/or the radio capabilities of the announcer UE and/or target receiver UE. The set(s) of capabilities may be standardized or provided by higher layers in a preconfigured list. The CAP field may be a fixed size (e.g., 4 bits).

R: Reserved bit, set to "zero".

Note: The field descriptions include exemplary fields lengths. Other lengths are also contemplated and may be used for the solutions proposed herein. The MAC header and subheaders are octet aligned. See Table 2 and Table 3 of the Appendix.

MAC Header (SL-SCH)

The solutions described in this disclosure for the SL-DCH MAC header may also apply for the SL-SCH MAC header.

Solutions for V2X Radio Configuration for Unicast, Groupcast, or Broadcast V2X Data Communication The solutions described in this disclosure for the configuration of the transmit radio and receive radio for the case of discovery messages also apply for the transmission and reception of V2X sidelink data other than the discovery messages.

Example Solutions

It will be appreciated that the techniques described herein may be applied in a variety of ways. For example, a user equipment may act as a discoverer by sending discovery announcement via a sidelink service which describes criteria for one or more services sought by the discoverer user equipment. The discoverer user equipment may accordingly configure its communications circuitry to monitor responses to the announcement coming from one or more discoveree user equipment apparatuses. Like the announcement, the responses may include criteria for one or more services provided by the responding discoveree apparatuses. The discovery announcement may be a target search discovery announcement, for example, or a self-advertisement discovery announcement. The discovery announcement may be transmitted in unicast, groupcast, or broadcast manner.

The discovery announcement may include information about the discoverer user equipment, such as service capabilities, service platform capabilities, radio capabilities, one or more source identifiers, driving information (e.g., driving intention information, positioning information, or environment information) radio measurements, one or more identifiers of one or more groups the first apparatus belongs to, and protocol configuration parameters for V2X communication. Similarly, the discovery announcement may include such information about discoveree user equipment, either instead of or in addition to information about the discoverer.

Criteria for the service sought by the discoverer, include in an announcement or a response to an announcement may include, for example: a service or type service of interest; QoS requirements for a service, a TX profile, or authorized PLMN for the service.

The discoverer user equipment may include a mobile termination unit that implements radio transmission/reception and related functions and may include a terminal equipment unit that implements application functions. For example, the mobile termination unit may perform filtering or admission control of the discoveree user equipment apparatuses based on in addition to the information included in the discovery announcement, information included, in the responses to the announcement, such as the supported services, service capability, service platform capabilities, radio capabilities, driving information, source identifier of the second apparatus, supported QoS requirements for the service, TX profile of one or more supported services or of interest to the second apparatus, radio carrier frequency parameters for the service, or authorized PLMNs. The mobile termination unit may then provide the result of the filtering to the terminal equipment.

A discovery announcement may be transmitted by a discoverer user equipment apparatus or received by a discoveree user equipment apparatus on a logical channel, for example, using a logical channel identity that is predefined in a protocol specification. Similarly, a response to the discovery announcement by a responding discoveree user equipment apparatus may be transmitted by a discoveree user equipment apparatus or received by a discoverer user equipment apparatus on a logical channel, for example, using a logical channel identity that is predefined in a protocol specification.

The discoverer user equipment may perform synchronization prior to engaging in V2X communication including transmission of discovery announcement or reception of response to discovery announcement.

The discoverer and discoveree user equipment apparatuses may collect driving information pertaining to a vehicle associated with the respective apparatuses. The driving information may be shared, for example, in a discovery announcement or in a response to a discovery announcement and may further be used to evaluate or filter a received discovery announcement or response, or may further be used to performed admission control of the responding discoveree user equipment apparatuses by the discoverer user equipment apparatus, or may further be used to perform admission control of the discoverer user equipment apparatuses by the discoveree user equipment apparatus. Again, driving information may include such information as driving intentions, positioning, and driving environment information.

A discoverer user equipment may send a request for authorization for a discovery announcement and may include driving information in the request for authorization.

A discoveree user apparatus may receive authorization for sidelink V2X communication including authorization for specific V2X communication service and monitoring and response to related discovery announcement, may receive vehicle communications sidelink service parameters, and configure the communications circuitry to monitor discovery announcements from one or more discoverer user equipment apparatuses. The discoveree user apparatus may then receive, via a sidelink service, a discovery announcement, the discovery announcement comprising one or more criteria for a service sought by a discoverer user equipment apparatus and evaluate the discovery announcement. If the discoveree user equipment may provide the service sought by the first apparatus, then the discoveree user equipment may send, via the sidelink service, a discovery response to the discoverer user equipment. Again, the discovery announcement may be a target search discovery announcement or self-advertisement discovery announcement, and may be received in a unicast, groupcast, or broadcast manner. The discoveree user equipment may perform synchronization of the sidelink service. And again, the discovery announcement and the response to the discovery announcement may include the kinds of information described in connection with operations of the discoverer user equipment, and the discoveree may evaluate whether to respond to a discovery announcement accordingly. Specifically, the response to the discovery announcement may include information about the discoveree user equipment such as service capabilities, service platform capabilities, radio capabilities, one or more identifiers of one or more groups the discoveree user equipment belongs to, driving information that comprises one or more of driving intention information, positioning information, environment information, and radio measurement. Similarly, the response to the discovery announcement may include information about the supported services or services of interest to the discoveree user equipment. Such information may include QoS requirements, TX profile, radio carrier frequency parameters, one or more authorized PLMNs. The discoveree user equipment may collect driving information regarding a vehicle with which the discoveree is associated (intentions, positioning, environment, etc.) and in addition to including such driving information in the response message to discovery announcement, may use such driving information in evaluating the discovery announcement or include such driving information in the response to the discovery announcement.

A discoverer user equipment and a discoveree user equipment may receive vehicle sidelink communication parameters or authorizations from a third apparatus. For example, the third apparatus may provide, to one or more discoverer user equipments and one or more discoveree user equipments, vehicle communications sidelink service parameters. The third apparatus may then send an authorization for a discovery announcement to a discoverer user equipment and an authorization for a response to a discovery announcement to a discoveree user equipment.

A discoverer user equipment or a discoveree user equipment may be a vehicle group lead, a platoon lead, or be capable of acting as a group lead or a platoon lead, and may indicate such service capabilities in a discovery announcement or response to a discovery announcement.

Example Solution Frameworks

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for (e.g., indoor applications and hotspots). In particular, the ultra-mobile broadband is expected to share a common design framework with the flexible radio access below 6 GHz, with cmWave and mmWave specific design optimizations.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access (e.g., indoor applications and hotspots). In particular, the ultra-mobile broadband is expected to share a common design framework with the flexible radio access below 6 GHz, with cmWave and mmWave specific design optimizations.

3GPP has identified a variety of used cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, and energy savings), and enhanced Vehicle-to-Everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and Vehicle Communications with other entities. Specific service and applications in these categories include: monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 29A:
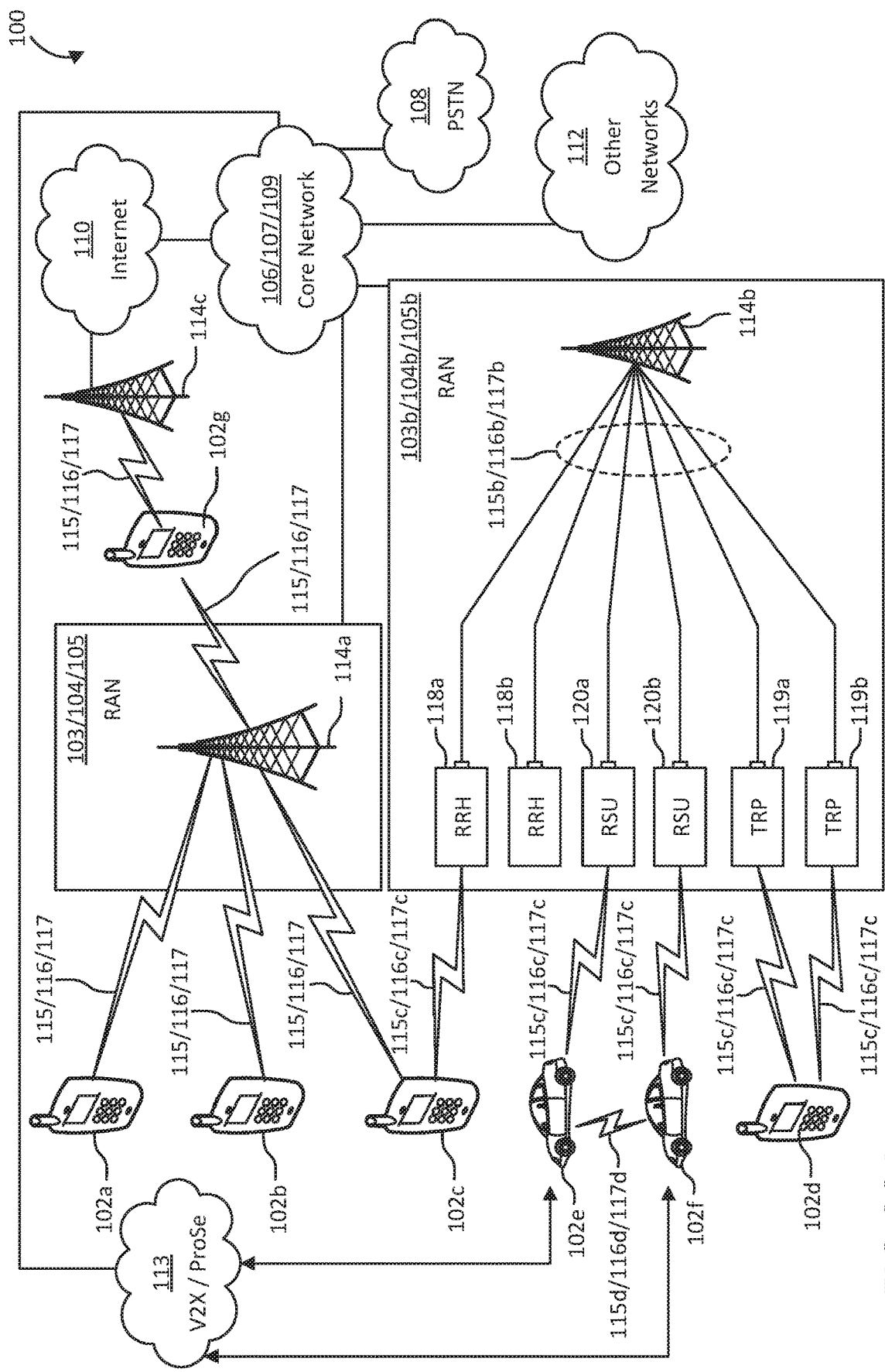
FIG. 29A illustrates an example communications system 100 in which the methods and apparatuses described and claimed herein may be embodied.

FIG. 29A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of the WTRUs, base stations, networks, and/or network elements. Each of the WTRUs 102a, 102b, 102c, 102d, 102e, 102f, and 102g may be any type of apparatus or device configured to operate and/or communicate in a wireless environment. Although each WTRU 102a, 102b, 102c, 102d, 102e, 102f, and 102g is depicted in FIGS. 29A-29E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane.

The communications system 100 may also include a base station 114a and a base station 114b. Base stations 114a may be any type of device configured to wirelessly interface with at least one of the WTRUs 102a, 102b, and 102c to facilitate access to one or more communication networks, such as the core network 106/107/109, the Internet 110, and/or the other networks 112. Base stations 114b may be any type of device configured to wired and/or wireless interface with at least one of the RRHs (Remote Radio Heads) 118a, 118b, TRPs (Transmission and Reception Points) 119a, 119b, and/or the RSUs (Roadside Units) 120a, 120b to facilitate access to one or more communication networks, such as the core network 106/107/109, the Internet 110, the other networks 112, and/or the V2X server (or the ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a, 120b, may be any type of device configured to wirelessly interface with at least one of the WTRU 102e or 102f, to facilitate access to one or more communication networks, such as the core network 106/107/109, the Internet 110, the other networks 112, and/or the V2X server (or ProSe function and server) 113. By way of example, the base stations 114a, 114b may be a base transceiver station (BTS), a Node-B, an eNode B, a Home Node B, a Home eNode B, a site controller, an access point (AP), and a wireless router. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), and relay nodes. The base station 114b may be part of the RAN 103b/104b/105b, which may also include other base stations and/or network elements (not shown), such as a base station controller (BSC), a radio network controller (RNC), and relay nodes. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers (e.g., one for each sector of the cell). In an embodiment, the base station 114a may employ multiple-input and multiple-output (MIMO) technology and, therefore, may utilize multiple transceivers for each sector of the cell.

The base stations 114a may communicate with one or more of the WTRUs 102a, 102b, and 102c over an air interface 115/116/117, which may be any suitable wireless communication link (e.g., radio frequency (RF), microwave, infrared (IR), ultraviolet (UV), visible light, cmWave, and mmWave). The air interface 115/116/117 may be established using any suitable radio access technology (RAT).

The base stations 114b may communicate with one or more of the RRHs 118a, 118b, TRPs 119a, 119b, and/or RSUs 120a, 120b, over a wired or air interface 129B/116b/117b, which may be any suitable wired (e.g., cable and optical fiber) or wireless communication link (e.g., radio frequency (RF), microwave, infrared (IR), ultraviolet (UV), visible light, cmWave, and mmWave). The air interface 129B/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 129C/116c/117c, which may be any suitable wireless communication link (e.g., radio frequency (RF), microwave, infrared (IR), ultraviolet (UV), visible light, cmWave, and mmWave). The air interface 129C/116c/117c may be established using any suitable radio access technology (RAT).

The WTRUs 102a, 102b, 102c, 102d, 102e, 102f, and/or 102g may communicate with one another over an air interface 129D/116d/117d (not shown in the figures), which may be any suitable wireless communication link (e.g., radio frequency (RF), microwave, infrared (IR), ultraviolet (UV), visible light, cmWave, and mmWave). The air interface 129D/116d/117d may be established using any suitable radio access technology (RAT).

More specifically, as noted above, the communications system 100 may be a multiple access system and may employ one or more channel access schemes, such as the CDMA, TDMA, FDMA, OFDMA, and SC-FDMA. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 129C/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or the RRHs 118a, 118b, TRPs 119a, 119b, and/or the RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 129C/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications). The 3GPP NR technology includes NR V2X technologies and interface (such as Sidelink communications).

In an embodiment, the base station 114a in the RAN 103/104/105 and the WTRUs 102a, 102b, 102c, or RRHs 118a, 118b, TRPs 119a, 119b and/or the RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), and GSM EDGE (GERAN).

The base station 114c in FIG. 29A may be a wireless router, Home Node B, Home eNode B, or access point, for example, and may utilize any suitable RAT for facilitating wireless connectivity in a localized area, such as a place of business, a home, a vehicle, or a campus. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, and LTE-A) to establish a picocell or femtocell. As shown in FIG. 29A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, and 102d. For example, the core network 106/107/109 may provide call control, billing services, mobile location-based services, pre-paid calling, Internet connectivity, and video distribution, and/or perform high-level security functions, such as user authentication.

Although not shown in FIG. 29A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, and 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, and 102d in the communications system 100 may include multi-mode capabilities (e.g., the WTRUs 102a, 102b, 102c, 102d, and 102e) may include multiple transceivers for communicating with different wireless networks over different wireless links. For example, the WTRU 102e shown in FIG. 29A may be configured to communicate with the base station 114a, which may employ a cellular-based radio technology, and with the base station 114c, which may employ an IEEE 802 radio technology.

Figure 29B:
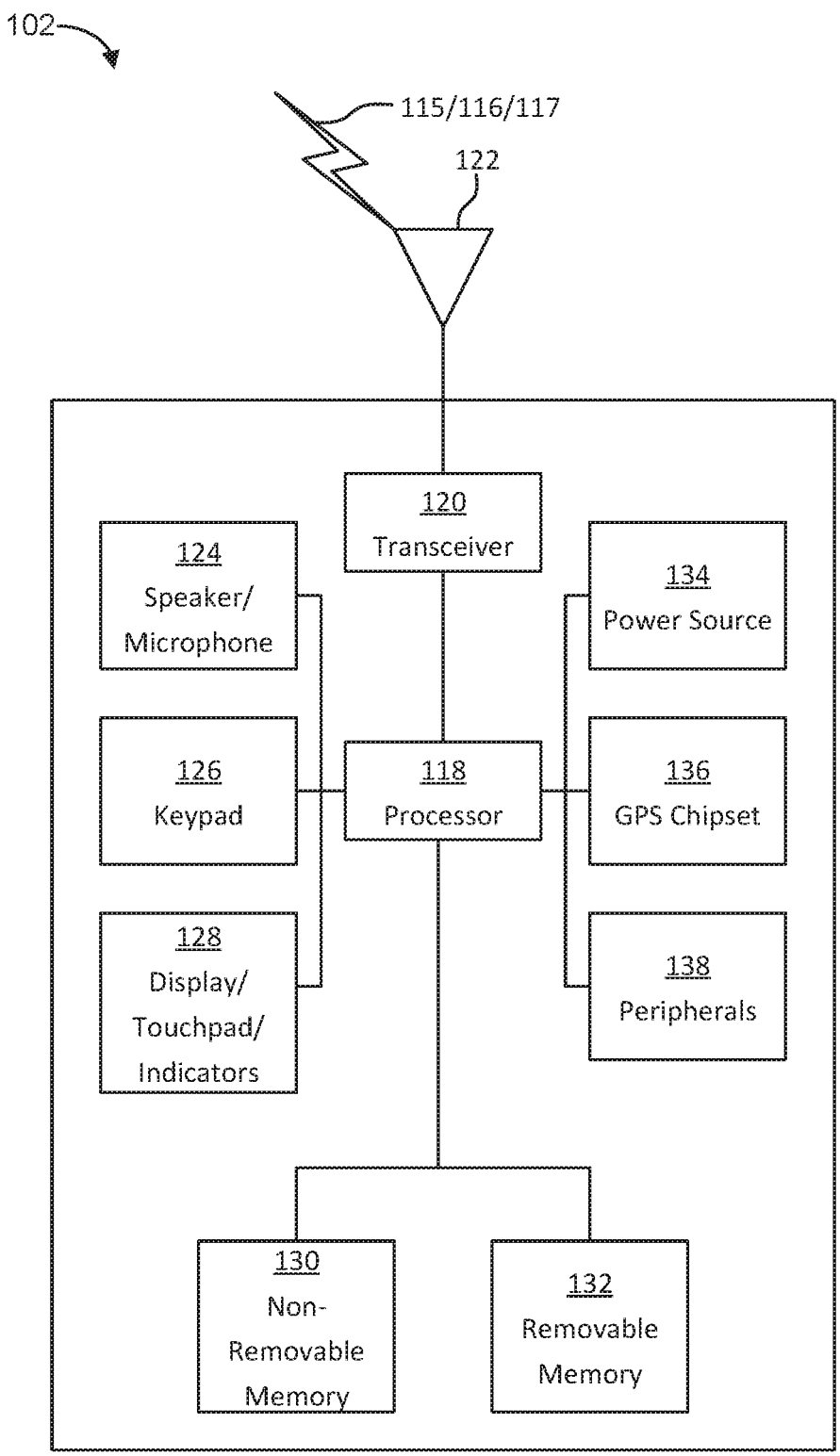
FIG. 29B is a block diagram of an example apparatus or device configured for wireless communications in accordance with the embodiments illustrated herein.

FIG. 29B is a block diagram of an example apparatus or device configured for wireless communications in accordance with the embodiments illustrated herein, such as for example, a WTRU 102. As shown in FIG. 29B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 29B described herein.

The processor 118 may be a general purpose processor, a special purpose processor, a conventional processor, a digital signal processor (DSP), a plurality of microprocessors, and/or one or more microprocessors in association with a DSP core, a controller, a microcontroller, Application Specific Integrated Circuits (ASICs), Field Programmable Gate Array (FPGAs) circuits, any other type of integrated circuit (IC), and a state machine. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 29B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. For example, in an embodiment, the transmit/receive element 122 may be an emitter/detector configured to transmit and/or receive IR, UV, or visible light signals. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 29B as a single element, the WTRU 102 may include any number of transmit/receive elements 122. More specifically, the WTRU 102 may employ the MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11.

The processor 118 of the WTRU 102 may be coupled to, may receive user input data from, the speaker/microphone 124, the keypad 126, the display/touchpad/indicators 128 (e.g., a liquid crystal display (LCD) display unit, or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, the non-removable memory 130, and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, and a secure digital (SD) memory card. In an embodiment, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, and fuel cells.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a and 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, or an Internet browser.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 29C:
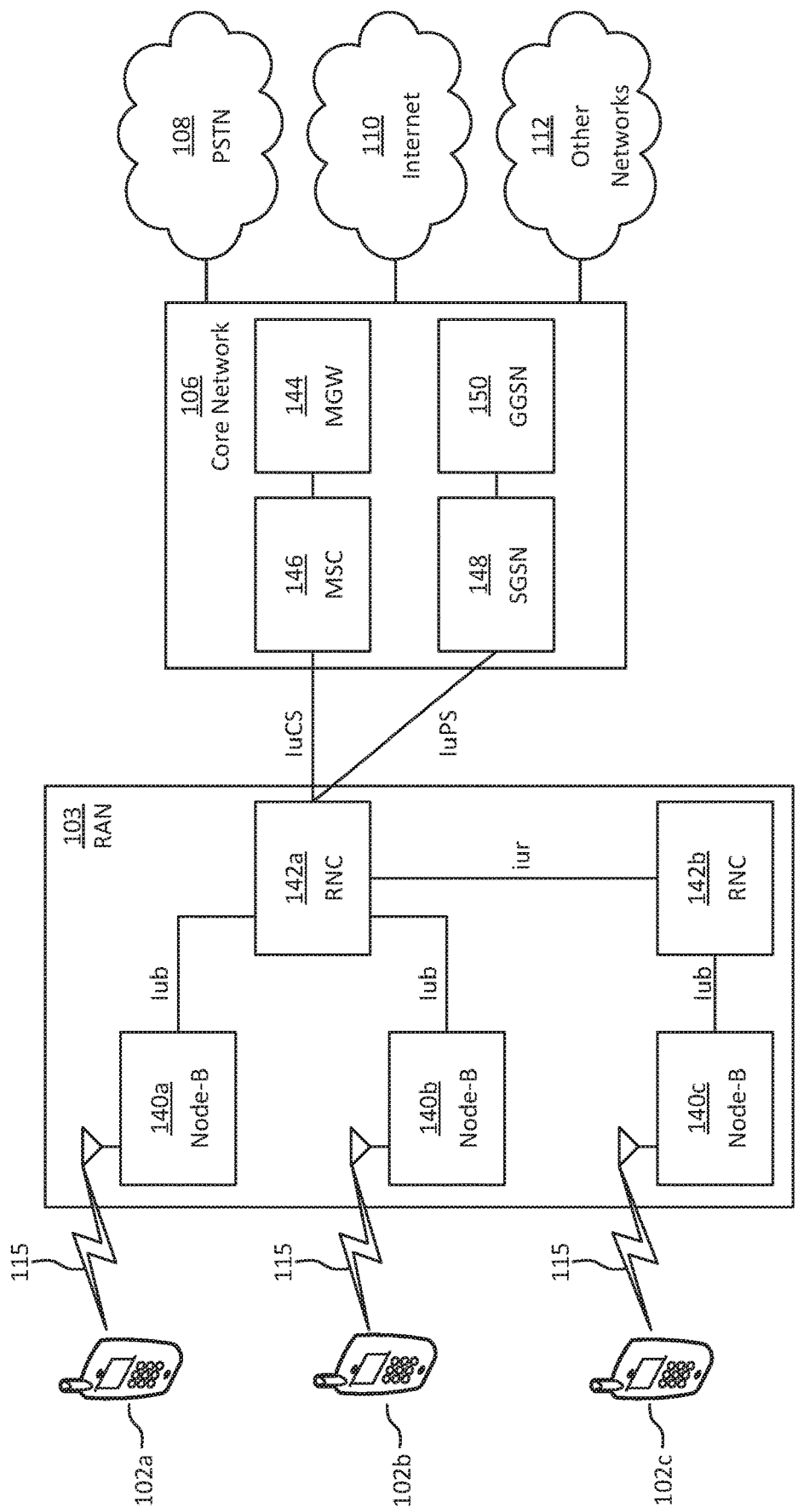
FIG. 29C is a system diagram of an example the radio access network and core network.

FIG. 29C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 29C, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include the RNCs 142a and 142b. It will be appreciated that the RAN 103 may include any number of the Node-Bs and the RNCs while remaining consistent with an embodiment.

As shown in FIG. 29C, the Node-Bs 140a and 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, and data encryption.

The core network 106 shown in FIG. 29C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 29D:
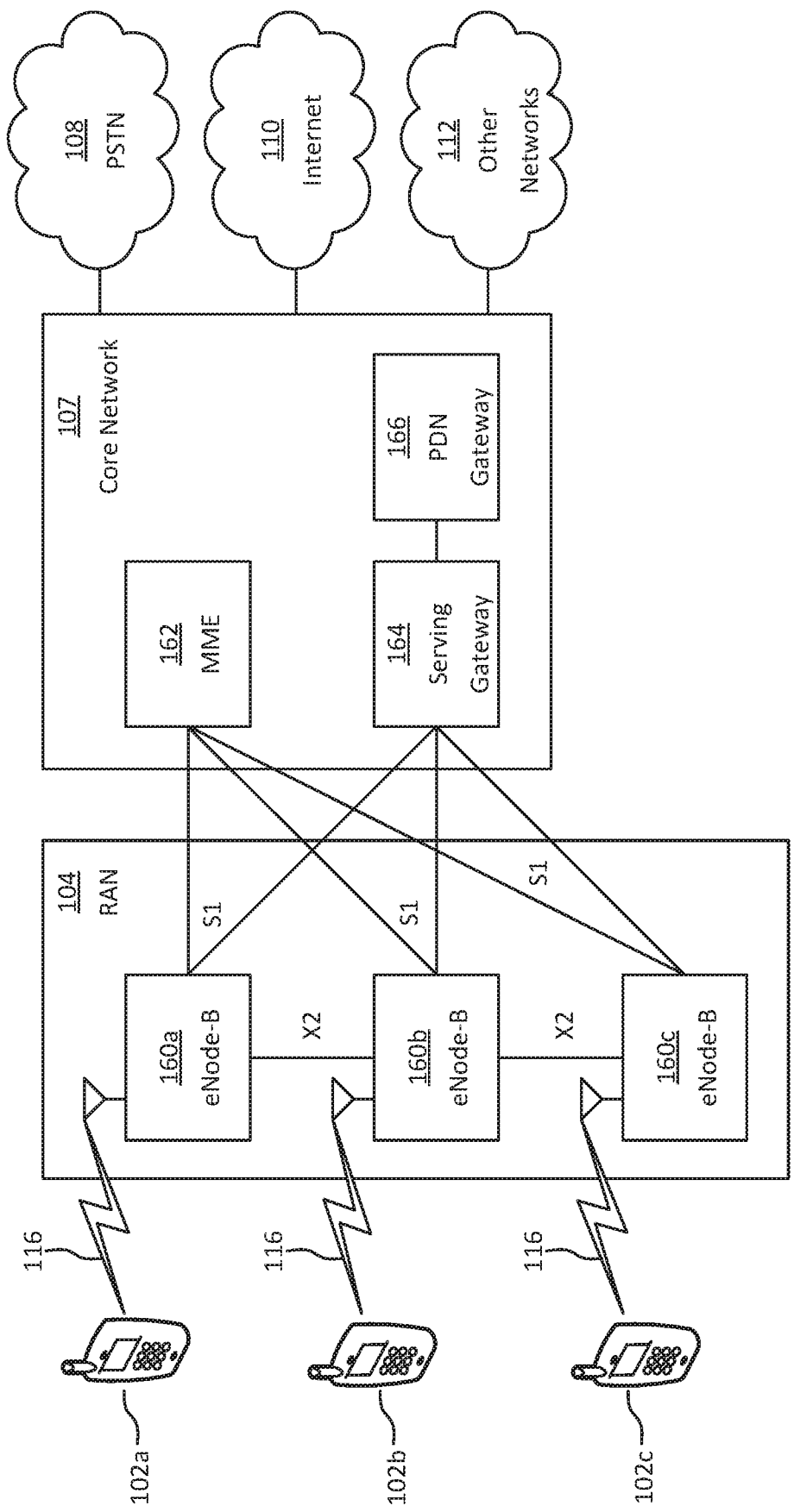
FIG. 29D is a system diagram of another example the radio access network and core network.

FIG. 29D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs while remaining consistent with an embodiment. The eNode-Bs 160a, 160b, and 160c may each include one or more transceivers for communicating with the WTRUs 102a, 102b, and 102c over the air interface 116. In an embodiment, the eNode-Bs 160a, 160b, and 160c may implement the MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 29D, the eNode-Bs 160a, 160b, and 160c may communicate with one another over an X2 interface.

The core network 107 shown in FIG. 29D, may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, and 102c. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 29E:
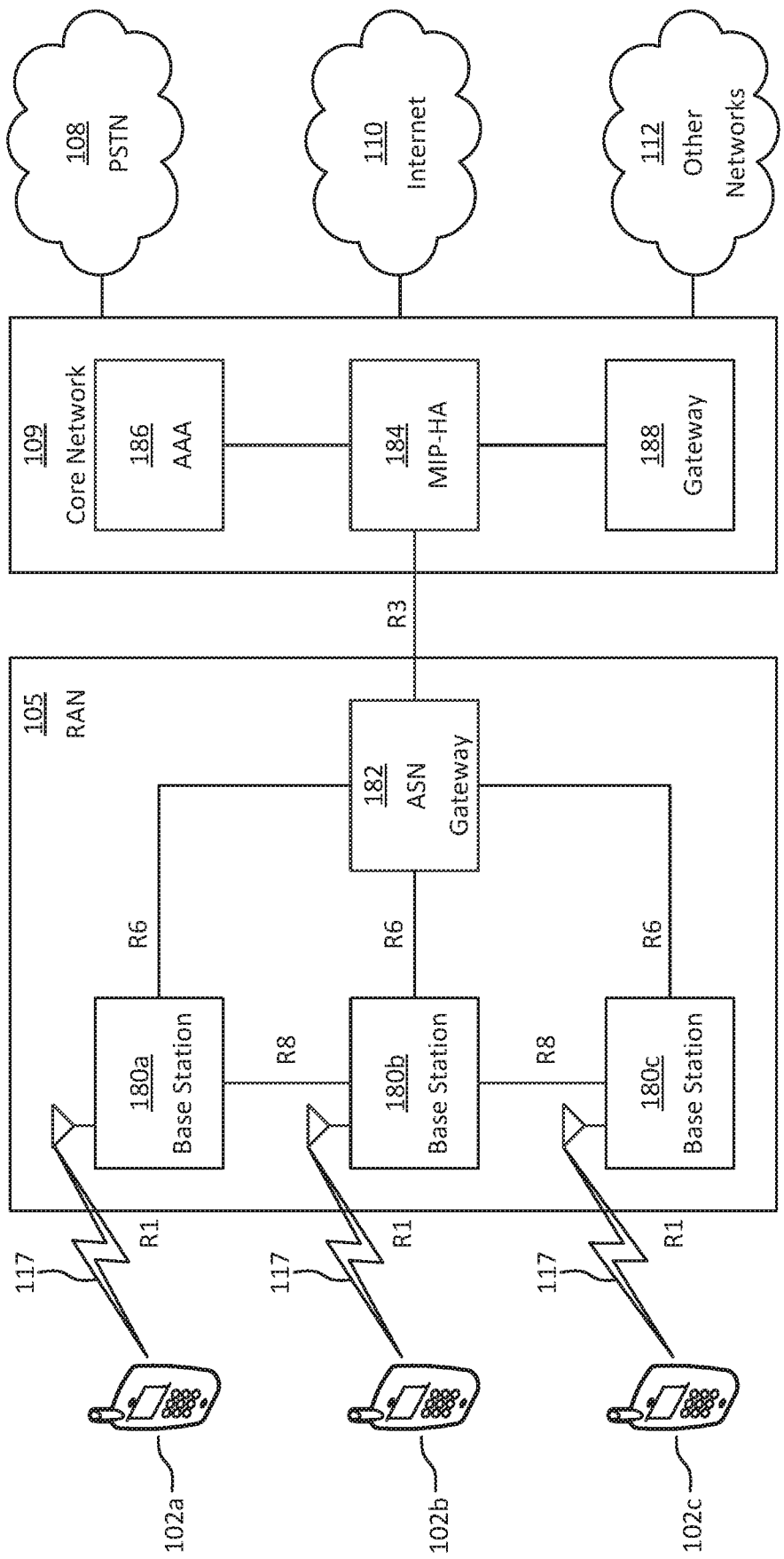
FIG. 29E is a system diagram of a third example radio access network and core network.

FIG. 29E is a system diagram of the RAN 105 and the core network 109 according to an embodiment. The RAN 105 may be an access service network (ASN) that employs the IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 29E, the RAN 105 may include base stations 180a, 180b, 180c, and an ASN gateway 182, though it will be appreciated that the RAN 105 may include any number of base stations and the ASN gateways while remaining consistent with an embodiment. The base stations 180a, 180b, 180c may each be associated with a particular cell in the RAN 105 and may include one or more transceivers for communicating with the WTRUs 102a, 102b, and 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, and 180c may also provide mobility management functions, such as handoff triggering, tunnel establishment, radio resource management, traffic classification, and quality of service (QoS) policy enforcement. The ASN gateway 182 may serve as a traffic aggregation point and may be responsible for paging, caching of subscriber profiles, and routing to the core network 109.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, and 102c.

As shown in FIG. 29E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, and 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, and 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, and 102c with access to the networks 112, which may include other wired or wireless networks that are owned and/or operated by other service providers.

Although not shown in FIG. 29E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 29A, 29C, 29D, and 29E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 29A, 29B, 29C, 29D, and 29E are provided by way of example only, and it is understood that the subject matter disclosed and claimed herein may be embodied or implemented in any similar communication system, whether presently defined or defined in the future.

Figure 29F:
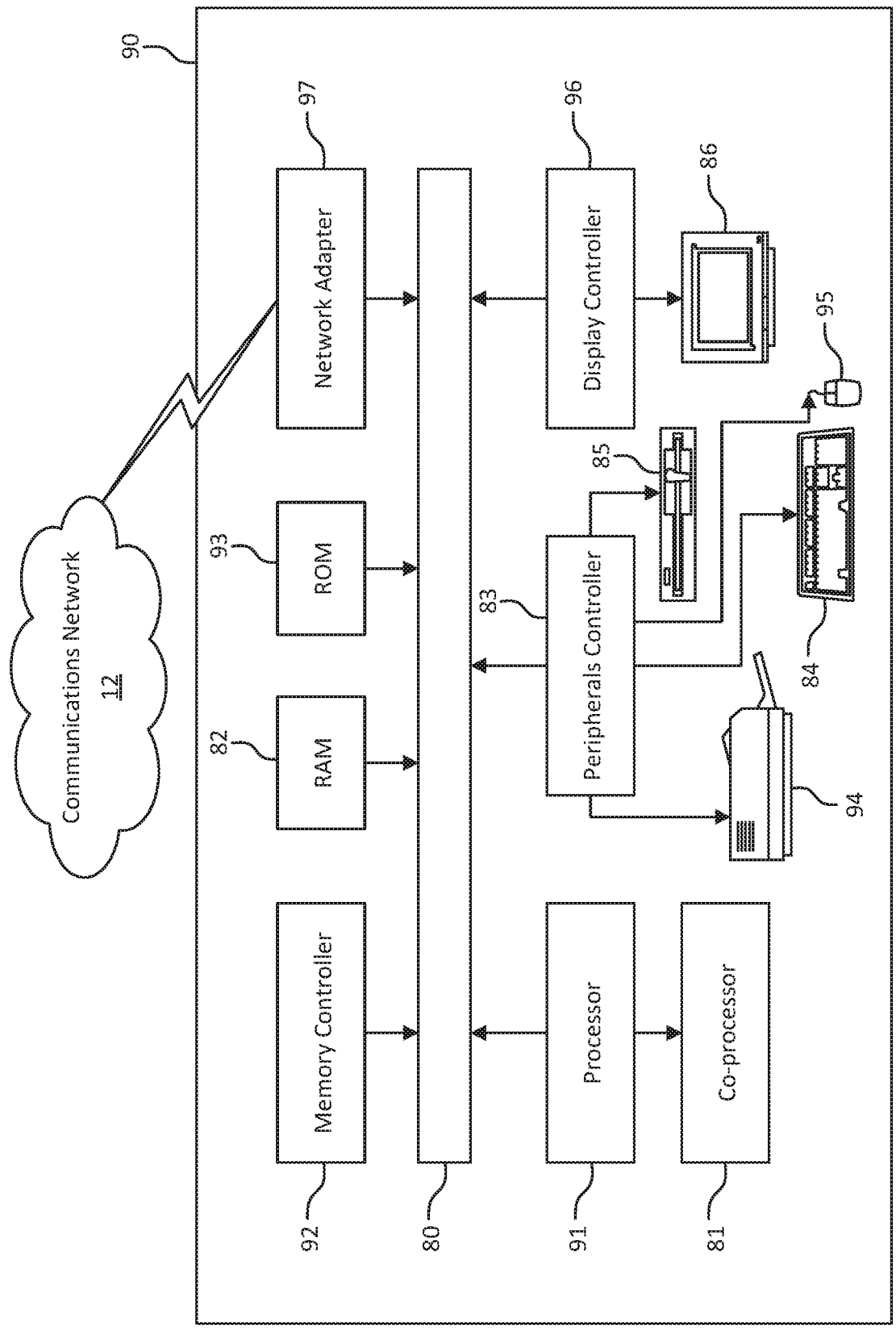
FIG. 29F is a block diagram of an exemplary computing system in which one or more apparatuses of the communications networks illustrated in FIGS. 29A-29E may be embodied.

FIG. 29F is a block diagram of an exemplary computing system 90 in which one or more apparatuses of the communications networks illustrated in FIGS. 29A, 29C, 29D and 29E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, or one or more microprocessors in association with a DSP core, a controller, a microcontroller, Application Specific Integrated Circuits (ASICs), Field Programmable Gate Array (FPGAs) circuits, any other type of integrated circuit (IC), and/or a state machine. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in the RAM 82 may be read or changed by processor 91 or other hardware devices. Access to the RAM 82 and/or the ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 29A, 29B, 29C, 29D, and 29E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 29G:
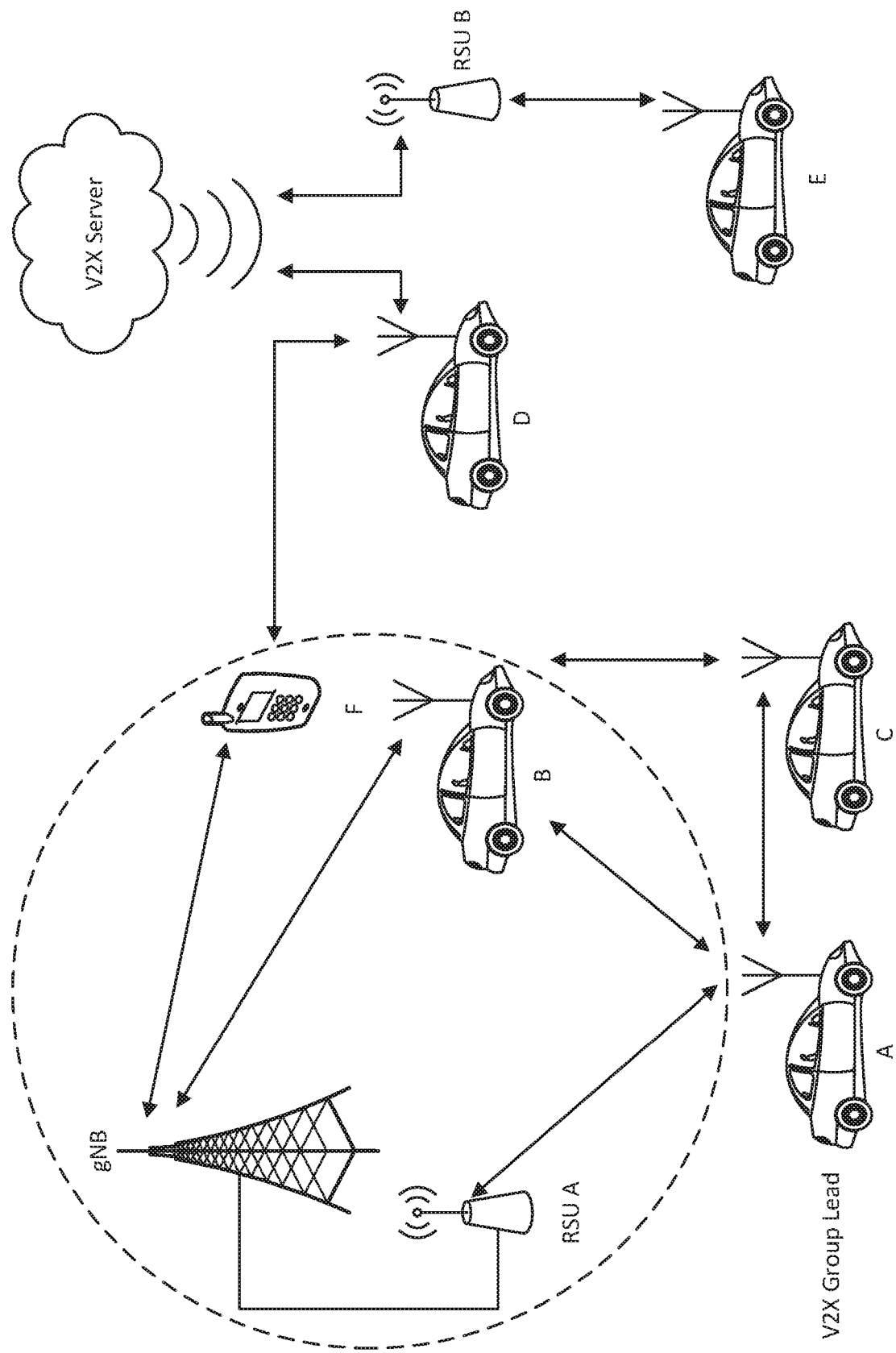
FIG. 29G illustrates an example communications system in which the methods and apparatuses described and claimed herein may be embodied.

FIG. 29G illustrates one embodiment of an example communications system 111 in which the methods and apparatuses described and claimed herein may be embodied. As shown, the example communications system 111 may include wireless transmit/receive units (WTRUs) A, B, C, D, E, and F, a base station, a V2X server, and a RSUs A and B. Though it will be appreciated that the disclosed embodiments contemplate any number of the WTRUs, base stations, networks, and/or network elements. One or several or all of the WTRUs A, B, C, D, and E can be out of range of the network (e.g., in the figure out of the cell coverage boundary shown as the dash line). WTRUs A, B, and C form a V2X group, among which the WTRU A is the group lead and the WTRUs B and C are group members. WTRUs A, B, C, D, E, and F may communicate over Uu interface or Sidelink (PC5) interface.

It is understood that any or all of the apparatuses, systems, methods, and processes described herein may be embodied in the form of computer executable instructions (e.g., program code) stored on a computer-readable storage medium with instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media include volatile and nonvolatile, removable, and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

APPENDIX

TABLE 1

| Acronyms | |
| --- | --- |
| 3GPP | 3rd Generation Partnership Project |
| 5QI | 5G QoS identifier |
| ACK | ACKnowledgement |
| AM | Acknowledged Mode |
| AMF | Access and Mobility Function |
| ANDSF | Access Network Discovery and Selection Function |
| APP | Application |
| ARQ | Automatic Repeat Request |
| AS | Access Stratum |
| ASN | Access Service Network |
| BWP | Bandwidth Part |
| CAG | Closed Access Group |
| CAG-ID | Closed Access Group Identifier |
| CBR | Channel Busy Ratio |
| CR | Channel occupancy Ratio |

TABLE 1-continued

| Acronyms | |
| --- | --- |
| D2D | Device to Device Communication |
| DST | Destination |
| eNB | Evolved Node B |
| E-UTRA | Evolved UMTS Terrestrial Radio Access |
| E-UTRAN | Evolved UMTS Terrestrial Radio Access Network |
| FDMA | Frequency Division Multiple Access |
| eV2X | Enhanced Vehicle-to-X Communication |
| gNB | NR NodeB |
| GGSN | Gateway GPRS Support Node |
| GSM | Global System for Mobile communication |
| GUI | Graphical User Interface |
| HARQ | Hybrid ARQ |
| HSPA | High-Speed Packet Access |
| HSDPA | High-Speed Downlink Packet Access |
| HSUPA | High-Speed Uplink Packet Access |
| ID | Identity or Identifier |
| IP | Internet Protocol |
| ITS | Intelligent Transport System |
| ITS-AID | ITS Application Identifier |
| LBT | Listen Before Talk |
| LCH | Logical Channel |
| LCID | Logical Channel Identity |
| LCP | Logical Channel Prioritization |
| LTE | Long Term Evolution |
| LTE-A | Long Term Evolution Advanced |
| MAC | Medium Access Control |
| MGW | Media Gateway |
| MIMO | Multiple-Input and Multiple-Output |
| MIP-HA | Mobile IP Home Agent |
| MO | Management Object |
| MSB | Most Significant Bit |
| MSC | Mobile Switching Center |
| NAS | Non-Access Stratum |
| NB | NodeB |
| NPN | Non-Public Network |
| NPN-ID | Non-Public Network Identifier. |
| NR | New Radio |
| NSSAI | Network Slice Selection Assistance Information |
| OFDMA | Orthogonal Frequency-Division Multiple Access |
| PC3 | The reference point between the UE and the ProSe Function |
| PC5 | The reference point between ProSe-enabled UEs used for control and user plane for ProSe Direct Discovery, ProSe Direct Communication and ProSe UE-to-Network Relay |
| PCF | Policy Control Function |
| PDCP | Packet Data Convergence Protocol |
| PDU | Protocol Data Unit |
| PHY | Physical layer |
| PLMN | Public Land Mobile Network |
| PPPP | ProSe Per Packet Priority |
| PPPR | ProSe Per Packet Reliability |
| ProSe | Proximity-Based Services |
| PSBCH | Physical Sidelink Broadcast Channel |
| PSCCH | Physical Sidelink Control Channel |
| PSDCH | Physical Sidelink Discovery Channel |
| PSID | Provider Service Identifier |
| PSMCH | Physical Sidelink Multicast Channel |
| PSSCH | Physical Sidelink Shared Channel |
| QoS | Quality of Service |
| RAM | Random Access Memory |
| RAN | Radio Access Network |
| RAT | Radio Access Technology |
| RLC | Radio Link Control |
| RNC | Radio Network Controller |
| ROM | Read Only Memory |
| ROHC | Robust Header Compression |
| RRC | Radio Resource Control |
| RRH | Remote Radio Head |
| RSRP | Reference Signal Received Power |
| RSRQ | Reference Signal Received Quality |
| RSSI | Received Signal Strength Indicator |
| RSU | Road Side Unit |
| SA1 | System Architecture Working Group 1 |
| SBCCH | Sidelink Broadcast Control Channel |
| SC-FDMA | Single-Carrier Frequency Division Multiple Access |
| SDCCH | Sidelink Discovery Control Channel |
| SDU | Service Data Unit |

TABLE 1-continued

Acronyms

| | |
|---|---|
| SGSN | Serving GPRS Support Node |
| SIB | System Information Block |
| SL | Sidelink |
| SL-BCH | Sidelink Broadcast Channel |
| SL-DCH | Sidelink Discovery Channel |
| SL-SCH | Sidelink Shared Channel |
| S-NSSAI | Single NSSAI |
| SR | Scheduling Request |
| SRC | Source |
| SST | Slice/Service Type |
| STCH | Sidelink Traffic Channel |
| TCP | Transmission Control Protocol |
| TDMA | Time Division Multiple Access |
| TM | Transparent Mode |
| UE | User Equipment |
| UL | Uplink |
| UM | Unacknowledged Mode |
| UMTS | Universal Mobile Telecommunications System |
| USIM | Universal Subscriber Identify Module |
| UV | Ultraviolet |
| V2V | Vehicle-to-Vehicle Communication |
| V2X | Vehicle-to-X Communication |
| WCDMA | Wideband Code Division Multiple Access |
| WTRU | Wireless Transmit/Receive Unit |

TABLE 2

Values of LCID for SL-DCH

| Index | LCID values |
|---|---|
| 0000 | Reserved |
| Range #1 | Identity of the logical channel |
| Range #2 | Reserved |
| 11111 | Padding |

TABLE 3

Values of F Field

| Index | Size of Length Field (bits) |
|---|---|
| 0 | 7 |
| 1 | 15 |

We claim:

1. A discoverer user equipment apparatus, comprising a processor, a memory, communication circuitry, and computer-executable instructions stored in the memory which, when executed by the processor, cause the discoverer user equipment apparatus to:
send, via a sidelink communication channel, a sidelink transmission comprising a discovery announcement comprising a logical channel identity of a sidelink communication logical channel, the discovery announcement further comprising one or more criteria for one or more services sought by the discoverer user equipment apparatus;
configure the communications circuitry to monitor for a response to the discovery announcement, wherein the response to the discovery announcement is associated with the sidelink communication logical channel; and;
receive, from a discoveree user equipment apparatus, the response, the response comprising a discovery response pertaining to the discovery announcement and comprising the logical channel identity of the sidelink communication logical channel, the discovery response further comprising one or more criteria for one or more services provided by the discoveree user equipment apparatus.

2. The discoverer user equipment apparatus of claim 1, wherein the discovery announcement comprises discoverer information, the discoverer information comprising one or more of the following data pertaining to the discoverer user equipment apparatus: service capabilities; service platform capabilities; radio capabilities; one or more source identifiers; driving information comprising one or more of driving intention information, positioning information, environment information; radio measurements; one or more identifiers of one or more groups the discoverer user equipment apparatus belongs to; and protocol configuration parameters for future V2X communication.

3. The discoverer user equipment apparatus of claim 1, wherein the one or more criteria for one or more services comprise one or more of the following: one or more services of interest, QoS requirements for the one or more service of interest, a TX profile for the one or more service of interest, radio carrier frequency parameters for the one or more services of interest, and one or more authorized PLMN for one or more services of interest.

4. The discoverer user equipment apparatus of claim 3, wherein the discovery announcement comprises discoveree information, the discoveree information pertaining to the one or more discoveree user equipment apparatuses and comprising one or more of: service capabilities; service platform capabilities; radio capabilities; one or more identifiers of one or more groups to which the one or more discoveree user equipment apparatuses belong; and, protocol configuration parameters for future V2X communication.

5. The discoverer user equipment apparatus of claim 1, further comprising a mobile termination unit that implements radio transmission/reception and related functions, wherein the mobile termination unit is adapted to:
perform filtering or admission control of the one or more discoveree user equipment apparatuses, the filtering or the admission control being based at least in part on information in the discovery announcement and information in the discovery response; and
provide, to terminal equipment, one or more of results of the filtering or admission control.

6. The discoverer user equipment apparatus of claim 1, wherein the logical channel identity is predefined in a protocol specification.

7. The discoverer user equipment apparatus of claim 1, wherein the sidelink communication logical channel is a separate logical channel, specific to the transmission of the discovery announcement.

8. The discoverer user equipment apparatus of claim 1, wherein the sidelink communication logical channel is a Sidelink Discovery Control Channel (SDCCH), and wherein the SDCCH is multiplexed with a Sidelink Traffic Channel (STCH).

9. The discoverer user equipment apparatus of claim 1, wherein a sidelink communication specific radio bearer is used for the transmission of the response.

10. The discoverer user equipment apparatus of claim 1, wherein a discovery sidelink communication specific preconfigured radio bearer is used for the transmission of the discovery announcement.

11. A discoveree user equipment apparatus, comprising a processor, a memory, communication circuitry, and computer-executable instructions stored in the memory which, when executed by the processor, cause the discoveree user equipment apparatus to:

configure the communications circuitry to monitor discovery announcements;

receive, via a sidelink communication channel, a sidelink transmission comprising a discovery announcement, and comprising a logical channel identity of a sidelink communication logical channel, the discovery announcement further comprising one or more criteria for one or more services sought by a discoverer user equipment apparatus;

evaluate the discovery announcement wherein a response to the discovery announcement is associated with the sidelink logical communication channel; and if the discoveree user equipment apparatus may provide the service sought by the discoverer user equipment apparatus, send, to the discoverer user equipment apparatus via the sidelink communication logical channel, the response, the response comprising a discovery response pertaining to the discovery announcement and comprising the logical channel identity of the sidelink communication logical channel, the discovery response further comprising one or more criteria for one or more services provided by the discoveree user equipment apparatus.

12. The discoveree user equipment apparatus of claim 11, wherein:

the discovery announcement further comprises discoverer information and discoveree information;

the discoverer information pertains to the discoverer apparatus and comprises one or more: service capabilities; service platform capabilities; radio capabilities; one or more source identifiers; driving information comprising one or more of driving intention information, positioning information, environment information; radio measurements; one or more identifiers of one or more groups the discoverer user equipment apparatus belongs to; and protocol configuration parameters for future V2X communication;

the discoveree information pertains to the one or more discoveree user equipment apparatuses and comprises one or more of: service capabilities; service platform capabilities; radio capabilities; one or more identifiers of one or more groups to which the one or more discoveree user equipment apparatuses belong; and, protocol configuration parameters for future V2X communication; and evaluating the discovery announcement comprises comparing the discoverer information, the discoveree information, and the one or more criteria for a service sought by the discoverer user equipment apparatus to information regarding services provided by the discoveree user equipment apparatus.

13. The discoveree user equipment apparatus of claim 11, wherein the discovery response comprises one or more of a request for V2X communication establishment, V2X protocol configuration parameters for future V2X communications, and a V2X communication traffic data packet.

14. The discoveree user equipment apparatus of claim 11, wherein the discovery response comprises information pertaining to the discover apparatus comprising one or more of: service capabilities; service platform capabilities; radio capabilities; one or more source identifiers; one or more identifiers of one or more groups the discoveree user equipment apparatus belongs to; radio measurements; QoS requirements, a TX profile, radio carrier frequency parameters, one or more authorized PLMNs discoveree perspective; and driving information, the driving information comprises one or more of driving intention information, positioning information, and environment information.

15. The discoveree user equipment apparatus of claim 11, wherein the sidelink communication logical channel is a separate logical channel, specific to the receiving of the discovery announcement.

16. The discoveree user equipment apparatus of claim 11, wherein the sidelink communication logical channel is a Sidelink Discovery Control Channel (SDCCH), and wherein the SDCCH is demultiplexed from a Sidelink Traffic Channel (STCH).

17. The discoveree user equipment apparatus of claim 11, wherein a sidelink communication specific radio bearer is used for the receiving of the discovery announcement.

18. The discoveree user equipment apparatus of claim 11, wherein a discovery sidelink communication specific preconfigured radio bearer is used for the receiving of the discovery announcement.

* * * * *